United States Patent
Webber et al.

(10) Patent No.: US 11,103,330 B2
(45) Date of Patent: *Aug. 31, 2021

(54) DENTAL ATTACHMENT PLACEMENT STRUCTURE

(71) Applicant: Align Technology, Inc., San Jose, CA (US)

(72) Inventors: Peter Webber, Lafayette, CA (US); Siobhan O'Leary, San Jose, CA (US)

(73) Assignee: Align Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/623,263

(22) Filed: Jun. 14, 2017

(65) Prior Publication Data
US 2017/0319296 A1 Nov. 9, 2017

Related U.S. Application Data

(63) Continuation-in-part of application No. 14/963,527, filed on Dec. 9, 2015.

(51) Int. Cl.
*A61C 7/14* (2006.01)
*A61C 7/08* (2006.01)
(Continued)

(52) U.S. Cl.
CPC ............. *A61C 7/146* (2013.01); *A61C 7/002* (2013.01); *A61C 7/08* (2013.01); *B29C 64/386* (2017.08);
(Continued)

(58) Field of Classification Search
CPC ........... A61C 7/146; A61C 7/002; A61C 7/08; A61C 13/0013; B33Y 10/00; B33Y 50/00;
(Continued)

(56) References Cited

U.S. PATENT DOCUMENTS 2,171,695 A 9/1939 Harper
2,194,790 A 3/1940 Gluck
(Continued)

FOREIGN PATENT DOCUMENTS

AU 517102 B 11/1977
AU 3031677 A 11/1977
(Continued)

OTHER PUBLICATIONS

US 8,553,966 B1, 10/2013, Alpern et al. (withdrawn)
International Search Report and Written Opinion from related PCT Application No. PCT/IB2016/057371, dated Mar. 7, 2017, 14 pp.
International Search Report and Written Opinion from related PCT Application No. PCT/US2018/037530, dated Sep. 7, 2018, 16 pages.
beautyworlds.com; Virtual plastic surgery—beautysurge.com announces launch of cosmetic surgery digital imaging services; 5 pages; retrieved from the internet (http://www.beautyworlds.com/cosmossurgdigitalimagning.htm); Mar. 2004.
(Continued)

*Primary Examiner* — Heidi M Eide
(74) *Attorney, Agent, or Firm* — Shay Glenn LLP

(57) ABSTRACT

The present disclosure provides methods, computing device readable medium, devices, and systems having a dental attachment placement structure. One dental attachment placement apparatus includes a body having an attachment placement surface that is to be placed on an attachment affixing surface of a tooth and wherein the attachment placement surface includes a portion that is shaped to allow placement of an attachment at a particular position on the affixing surface of the tooth and a portion of the body having a contour that is shaped to correspond with a contour of an alignment surface of a tooth and when the contour of the body and the corresponding contour is aligned, the attachment is located at the particular position and can be secured to the affixing surface of the tooth.

20 Claims, 15 Drawing Sheets

(51) Int. Cl.
*A61C 7/00* (2006.01)
*B33Y 10/00* (2015.01)
*B33Y 80/00* (2015.01)
*B33Y 50/00* (2015.01)
*B29C 64/386* (2017.01)
*B33Y 50/02* (2015.01)
*B29L 31/00* (2006.01)
*A61C 13/00* (2006.01)

(52) U.S. Cl.
CPC .............. *B33Y 10/00* (2014.12); *B33Y 50/00* (2014.12); *B33Y 50/02* (2014.12); *B33Y 80/00* (2014.12); *A61C 13/0013* (2013.01); *B29L 2031/7536* (2013.01)

(58) Field of Classification Search
CPC ................... B33Y 80/00; B29C 64/386; B29L 2031/7536
See application file for complete search history.

(56) References Cited

U.S. PATENT DOCUMENTS

| | | | |
|---|---|---|---|
| 2,467,432 A | 4/1949 | Kesling | |
| 2,531,222 A | 11/1950 | Kesling | |
| 2,835,628 A | 5/1958 | Saffir | |
| 3,089,487 A | 5/1963 | Enicks et al. | |
| 3,092,907 A | 6/1963 | Traiger | |
| 3,178,820 A | 4/1965 | Kesling | |
| 3,211,143 A | 10/1965 | Grossberg | |
| 3,379,193 A | 4/1968 | Monsghan | |
| 3,385,291 A | 5/1968 | Martin | |
| 3,407,500 A | 10/1968 | Kesling | |
| 3,478,742 A | 11/1969 | Bohlmann | |
| 3,496,936 A | 2/1970 | Gores | |
| 3,503,127 A | 3/1970 | Kasdin et al. | |
| 3,521,355 A | 7/1970 | Pearlman | |
| 3,533,163 A | 10/1970 | Kirschenbaum | |
| 3,556,093 A | 1/1971 | Quick | |
| 3,600,808 A | 8/1971 | Reeve | |
| 3,660,900 A | 5/1972 | Andrews | |
| 3,683,502 A | 8/1972 | Wallshein | |
| 3,724,075 A | 4/1973 | Kesling | |
| 3,738,005 A | 6/1973 | Cohen et al. | |
| 3,797,115 A | 3/1974 | Cohen et al. | |
| 3,813,781 A | 6/1974 | Forgione et al. | |
| 3,860,803 A | 1/1975 | Levine | |
| 3,885,310 A | 5/1975 | Northcutt | |
| 3,916,526 A | 11/1975 | Schudy | |
| 3,922,786 A | 12/1975 | Lavin | |
| 3,949,477 A | 4/1976 | Cohen et al. | |
| 3,950,851 A | 4/1976 | Bergersen | |
| 3,955,282 A | 5/1976 | McNall | |
| 3,983,628 A | 10/1976 | Acevedo | |
| 4,014,096 A | 3/1977 | Dellinger | |
| 4,039,653 A | 8/1977 | Defoney et al. | |
| 4,055,895 A | 11/1977 | Huge | |
| 4,094,068 A | 6/1978 | Schinhammer | |
| 4,117,596 A * | 10/1978 | Wallshein | A61C 7/12 433/9 |
| 4,129,946 A | 12/1978 | Kennedy | |
| 4,134,208 A * | 1/1979 | Pearlman | A61C 7/146 433/8 |
| 4,139,944 A | 2/1979 | Bergersen | |
| 4,179,811 A | 12/1979 | Hinz | |
| 4,179,812 A | 12/1979 | White | |
| 4,183,141 A | 1/1980 | Dellinger et al. | |
| 4,195,046 A | 3/1980 | Kesling | |
| 4,204,325 A | 5/1980 | Kaelble | |
| 4,253,828 A | 3/1981 | Coles et al. | |
| 4,255,138 A | 3/1981 | Frohn | |
| 4,278,087 A | 7/1981 | Theeuwes | |
| 4,299,568 A | 11/1981 | Crowley | |
| 4,324,546 A | 4/1982 | Heitlinger et al. | |
| 4,324,547 A | 4/1982 | Arcan et al. | |
| 4,348,178 A | 9/1982 | Kurz | |
| 4,368,040 A | 1/1983 | Weissman | |
| 4,419,992 A | 12/1983 | Chorbajian | |
| 4,433,956 A | 2/1984 | Witzig | |
| 4,433,960 A | 2/1984 | Garito et al. | |
| 4,439,154 A | 3/1984 | Mayclin | |
| 4,449,928 A | 5/1984 | von Weissenfluh | |
| 4,450,150 A | 5/1984 | Sidman | |
| 4,478,580 A | 10/1984 | Barrut | |
| 4,500,294 A | 2/1985 | Lewis | |
| 4,505,672 A | 3/1985 | Kurz | |
| 4,505,673 A | 3/1985 | Yoshii | |
| 4,519,386 A | 5/1985 | Sullivan | |
| 4,523,908 A | 6/1985 | Drisaldi et al. | |
| 4,526,540 A | 7/1985 | Dellinger | |
| 4,553,936 A | 11/1985 | Wang | |
| 4,575,330 A | 3/1986 | Hull | |
| 4,575,805 A | 3/1986 | Moermann et al. | |
| 4,591,341 A | 5/1986 | Andrews | |
| 4,608,021 A | 8/1986 | Barrett | |
| 4,609,349 A | 9/1986 | Cain | |
| 4,611,288 A | 9/1986 | Duret et al. | |
| 4,629,424 A | 12/1986 | Lauks et al. | |
| 4,638,145 A | 1/1987 | Sakuma et al. | |
| 4,656,860 A | 4/1987 | Orthuber et al. | |
| 4,663,720 A | 5/1987 | Duret et al. | |
| 4,664,626 A | 5/1987 | Kesling | |
| 4,665,621 A | 5/1987 | Ackerman et al. | |
| 4,676,747 A | 6/1987 | Kesling | |
| 4,741,700 A | 5/1988 | Barabe | |
| 4,755,139 A | 7/1988 | Abbatte et al. | |
| 4,757,824 A | 7/1988 | Chaumet | |
| 4,763,791 A | 8/1988 | Halverson et al. | |
| 4,764,111 A | 8/1988 | Knierim | |
| 4,790,752 A | 12/1988 | Cheslak | |
| 4,793,803 A * | 12/1988 | Martz | A61C 7/08 433/6 |
| 4,798,534 A | 1/1989 | Breads | |
| 4,818,542 A | 4/1989 | Deluca et al. | |
| 4,830,612 A | 5/1989 | Bergersen | |
| 4,836,778 A | 6/1989 | Baumrind et al. | |
| 4,837,732 A | 6/1989 | Brandestini et al. | |
| 4,850,864 A | 7/1989 | Diamond | |
| 4,850,865 A | 7/1989 | Napolitano | |
| 4,856,991 A * | 8/1989 | Breads | A61C 7/08 433/6 |
| 4,861,268 A | 8/1989 | Garay et al. | |
| 4,877,398 A | 10/1989 | Kesling | |
| 4,880,380 A | 11/1989 | Martz | |
| 4,886,451 A | 12/1989 | Cetlin | |
| 4,889,238 A | 12/1989 | Batchelor | |
| 4,890,608 A | 1/1990 | Steer | |
| 4,932,866 A | 6/1990 | Guis | |
| 4,935,635 A | 6/1990 | O'Harra | |
| 4,936,862 A | 6/1990 | Walker et al. | |
| 4,937,928 A | 7/1990 | van der Zel | |
| 4,941,826 A | 7/1990 | Loran et al. | |
| 4,952,928 A | 8/1990 | Carroll et al. | |
| 4,964,770 A | 10/1990 | Steinbichler et al. | |
| 4,968,251 A | 11/1990 | Darnell | |
| 4,971,557 A | 11/1990 | Martin | |
| 4,975,052 A | 12/1990 | Spencer et al. | |
| 4,983,334 A | 1/1991 | Adell | |
| 4,997,369 A | 3/1991 | Shafir | |
| 5,002,485 A | 3/1991 | Aagesen | |
| 5,011,405 A | 4/1991 | Lemchen | |
| 5,015,183 A | 5/1991 | Fenick | |
| 5,017,133 A | 5/1991 | Miura | |
| 5,018,969 A | 5/1991 | Andreiko et al. | |
| 5,027,281 A | 6/1991 | Rekow et al. | |
| 5,035,613 A | 7/1991 | Breads et al. | |
| 5,037,295 A | 8/1991 | Bergersen | |
| 5,049,077 A | 9/1991 | Goldin et al. | |
| 5,055,039 A | 10/1991 | Abbatte et al. | |
| 5,061,839 A | 10/1991 | Matsuno et al. | |
| 5,083,919 A | 1/1992 | Quachi | |
| 5,094,614 A | 3/1992 | Wildman | |
| 5,100,316 A | 3/1992 | Wildman | |
| 5,103,838 A | 4/1992 | Yousif | |

(56) References Cited

U.S. PATENT DOCUMENTS

| | | | |
|---|---|---|---|
| 5,114,339 A | 5/1992 | Guis |
| 5,121,333 A | 6/1992 | Riley et al. |
| 5,123,425 A | 6/1992 | Shannon et al. |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax |
| 5,194,003 A | 3/1993 | Garay et al. |
| 5,204,670 A | 4/1993 | Stinton |
| 5,222,499 A | 6/1993 | Allen et al. |
| 5,224,049 A | 6/1993 | Mushabac |
| 5,238,404 A | 8/1993 | Andreiko |
| 5,242,304 A | 9/1993 | Truax et al. |
| 5,245,592 A | 9/1993 | Kuemmel et al. |
| 5,273,429 A | 12/1993 | Rekow et al. |
| 5,278,756 A | 1/1994 | Lemchen et al. |
| 5,306,144 A | 4/1994 | Hibst et al. |
| 5,314,335 A | 5/1994 | Fung |
| 5,324,186 A | 6/1994 | Bakanowski |
| 5,328,362 A | 7/1994 | Watson et al. |
| 5,335,657 A | 8/1994 | Terry et al. |
| 5,338,198 A | 8/1994 | Wu et al. |
| 5,340,309 A | 8/1994 | Robertson |
| 5,342,202 A | 8/1994 | Deshayes |
| 5,344,315 A | 9/1994 | Hanson |
| 5,368,478 A | 11/1994 | Andreiko et al. |
| 5,372,502 A | 12/1994 | Massen et al. |
| D354,355 S | 1/1995 | Hilgers |
| 5,382,164 A | 1/1995 | Stern |
| 5,395,238 A | 3/1995 | Andreiko et al. |
| 5,415,542 A | 5/1995 | Kesling |
| 5,431,562 A | 7/1995 | Andreiko et al. |
| 5,440,326 A | 8/1995 | Quinn |
| 5,440,496 A | 8/1995 | Andersson et al. |
| 5,447,432 A | 9/1995 | Andreiko et al. |
| 5,449,703 A | 9/1995 | Mitra et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| 5,487,662 A | 1/1996 | Kipke et al. |
| RE35,169 E | 3/1996 | Lemchen et al. |
| 5,499,633 A | 3/1996 | Fenton |
| 5,522,725 A | 6/1996 | Jordan et al. |
| 5,528,735 A | 6/1996 | Strasnick et al. |
| 5,533,895 A | 7/1996 | Andreiko et al. |
| 5,540,732 A | 7/1996 | Testerman |
| 5,542,842 A | 8/1996 | Andreiko et al. |
| 5,543,780 A | 8/1996 | McAuley et al. |
| 5,549,476 A | 8/1996 | Stern |
| 5,562,448 A | 10/1996 | Mushabac |
| 5,570,182 A | 10/1996 | Nathel et al. |
| 5,575,655 A | 11/1996 | Darnell |
| 5,583,977 A | 12/1996 | Seidl |
| 5,587,912 A | 12/1996 | Andersson et al. |
| 5,588,098 A | 12/1996 | Chen et al. |
| 5,605,459 A | 2/1997 | Kuroda et al. |
| 5,607,305 A | 3/1997 | Andersson et al. |
| 5,614,075 A | 3/1997 | Andre |
| 5,621,648 A | 4/1997 | Crump |
| 5,626,537 A | 5/1997 | Danyo et al. |
| 5,636,736 A | 6/1997 | Jacobs et al. |
| 5,645,420 A | 7/1997 | Bergersen |
| 5,645,421 A | 7/1997 | Slootsky |
| 5,651,671 A | 7/1997 | Seay et al. |
| 5,655,653 A | 8/1997 | Chester |
| 5,659,420 A | 8/1997 | Wakai et al. |
| 5,683,243 A | 11/1997 | Andreiko et al. |
| 5,683,244 A | 11/1997 | Truax |
| 5,691,539 A | 11/1997 | Pfeiffer |
| 5,692,894 A | 12/1997 | Schwartz et al. |
| 5,711,665 A | 1/1998 | Adam et al. |
| 5,711,666 A | 1/1998 | Hanson |
| 5,725,376 A | 3/1998 | Poirier |
| 5,725,378 A | 3/1998 | Wang |
| 5,730,151 A | 3/1998 | Summer et al. |
| 5,737,084 A | 4/1998 | Ishihara |
| 5,740,267 A | 4/1998 | Echerer et al. |
| 5,742,700 A | 4/1998 | Yoon et al. |
| 5,769,631 A | 6/1998 | Williams |
| 5,774,425 A | 6/1998 | Ivanov et al. |
| 5,790,242 A | 8/1998 | Stern et al. |
| 5,799,100 A | 8/1998 | Clarke et al. |
| 5,800,162 A | 9/1998 | Shimodaira et al. |
| 5,800,174 A | 9/1998 | Andersson |
| 5,813,854 A | 9/1998 | Nikodem |
| 5,816,800 A | 10/1998 | Brehm et al. |
| 5,818,587 A | 10/1998 | Devaraj et al. |
| 5,823,778 A | 10/1998 | Schmitt et al. |
| 5,848,115 A | 12/1998 | Little et al. |
| 5,857,853 A | 1/1999 | van Nifterick et al. |
| 5,866,058 A | 2/1999 | Batchelder et al. |
| 5,876,199 A | 3/1999 | Bergersen |
| 5,879,158 A | 3/1999 | Doyle et al. |
| 5,880,961 A | 3/1999 | Crump |
| 5,880,962 A | 3/1999 | Andersson et al. |
| 5,882,192 A | 3/1999 | Bergersen |
| 5,886,702 A | 3/1999 | Migdal et al. |
| 5,890,896 A | 4/1999 | Padial |
| 5,904,479 A | 5/1999 | Staples |
| 5,911,576 A | 6/1999 | Ulrich et al. |
| 5,934,288 A | 8/1999 | Avila et al. |
| 5,957,686 A | 9/1999 | Anthony |
| 5,964,587 A | 10/1999 | Sato |
| 5,971,754 A | 10/1999 | Sondhi et al. |
| 5,975,893 A | 11/1999 | Chishti et al. |
| 5,975,906 A | 11/1999 | Knutson |
| 5,980,246 A | 11/1999 | Ramsay et al. |
| 5,989,023 A | 11/1999 | Summer et al. |
| 5,993,413 A | 11/1999 | Aaltonen et al. |
| 6,002,706 A | 12/1999 | Staver et al. |
| 6,018,713 A | 1/2000 | Coli et al. |
| 6,044,309 A | 3/2000 | Honda |
| 6,049,743 A | 4/2000 | Baba |
| 6,053,731 A | 4/2000 | Heckenberger |
| 6,068,482 A | 5/2000 | Snow |
| 6,070,140 A | 5/2000 | Tran |
| 6,099,303 A | 8/2000 | Gibbs et al. |
| 6,099,314 A | 8/2000 | Kopelman et al. |
| 6,102,701 A | 8/2000 | Engeron |
| 6,120,287 A | 9/2000 | Chen |
| 6,123,544 A | 9/2000 | Cleary |
| 6,152,731 A | 11/2000 | Jordan et al. |
| 6,154,676 A | 11/2000 | Levine |
| 6,183,248 B1 | 2/2001 | Chishti et al. |
| 6,183,249 B1 * | 2/2001 | Brennan ............ A61C 7/16 206/369 |
| 6,186,780 B1 | 2/2001 | Hibst et al. |
| 6,190,165 B1 | 2/2001 | Andreiko et al. |
| 6,200,133 B1 | 3/2001 | Kittelsen |
| 6,201,880 B1 | 3/2001 | Elbaum et al. |
| 6,210,162 B1 | 4/2001 | Chishti et al. |
| 6,212,435 B1 | 4/2001 | Lattner et al. |
| 6,213,767 B1 | 4/2001 | Dixon et al. |
| 6,217,334 B1 | 4/2001 | Hultgren |
| 6,227,850 B1 | 5/2001 | Chishti et al. |
| 6,230,142 B1 | 5/2001 | Benigno et al. |
| 6,231,338 B1 | 5/2001 | de Josselin de Jong et al. |
| 6,239,705 B1 | 5/2001 | Glen |
| 6,243,601 B1 | 6/2001 | Wist |
| 6,263,234 B1 | 7/2001 | Engelhardt et al. |
| 6,283,761 B1 | 9/2001 | Joao |
| 6,288,138 B1 | 9/2001 | Yamamoto |
| 6,299,438 B1 | 10/2001 | Sahagian et al. |
| 6,309,215 B1 | 10/2001 | Phan et al. |
| 6,313,432 B1 | 11/2001 | Nagata et al. |
| 6,315,553 B1 | 11/2001 | Sachdeva et al. |
| 6,328,745 B1 | 12/2001 | Ascherman |
| 6,332,774 B1 | 12/2001 | Chikami |
| 6,334,073 B1 | 12/2001 | Levine |
| 6,350,120 B1 | 2/2002 | Sachdeva et al. |

(56) References Cited

U.S. PATENT DOCUMENTS

| | | |
|---|---|---|
| 6,364,660 B1 | 4/2002 | Durbin et al. |
| 6,382,975 B1 | 5/2002 | Poirier |
| 6,386,878 B1 | 5/2002 | Pavlovskaia et al. |
| 6,394,802 B1 | 5/2002 | Hahn |
| 6,402,510 B1 | 6/2002 | Williams |
| 6,402,707 B1 | 6/2002 | Ernst |
| 6,405,729 B1 | 6/2002 | Thornton |
| 6,406,292 B1 | 6/2002 | Chishti et al. |
| 6,409,504 B1 | 6/2002 | Jones et al. |
| 6,413,086 B1 | 7/2002 | Womack |
| 6,414,264 B1 | 7/2002 | von Falkenhausen |
| 6,414,708 B1 | 7/2002 | Carmeli et al. |
| 6,435,871 B1 | 8/2002 | Inman |
| 6,436,058 B1 | 8/2002 | Krahner et al. |
| 6,441,354 B1 | 8/2002 | Seghatol et al. |
| 6,450,167 B1 | 9/2002 | David et al. |
| 6,450,807 B1 | 9/2002 | Chishti et al. |
| 6,462,301 B1 | 10/2002 | Scott et al. |
| 6,470,338 B1 | 10/2002 | Rizzo et al. |
| 6,471,511 B1 | 10/2002 | Chishti et al. |
| 6,471,512 B1 | 10/2002 | Sachdeva et al. |
| 6,471,970 B1 | 10/2002 | Fanara et al. |
| 6,482,002 B2 | 11/2002 | Jordan et al. |
| 6,482,298 B1 | 11/2002 | Bhatnagar |
| 6,496,814 B1 | 12/2002 | Busche |
| 6,496,816 B1 | 12/2002 | Thiesson et al. |
| 6,499,026 B1 | 12/2002 | Rivette et al. |
| 6,499,995 B1 | 12/2002 | Schwartz |
| 6,507,832 B1 | 1/2003 | Evans et al. |
| 6,514,074 B1 | 2/2003 | Chishti et al. |
| 6,515,593 B1 | 2/2003 | Stark et al. |
| 6,516,288 B2 | 2/2003 | Bagne |
| 6,516,805 B1 | 2/2003 | Thornton |
| 6,520,772 B2 | 2/2003 | Williams |
| 6,523,009 B1 | 2/2003 | Wilkins |
| 6,523,019 B1 | 2/2003 | Borthwick |
| 6,524,101 B1 | 2/2003 | Phan et al. |
| 6,526,168 B1 | 2/2003 | Ornes et al. |
| 6,526,982 B1 | 3/2003 | Strong |
| 6,529,891 B1 | 3/2003 | Heckerman |
| 6,529,902 B1 | 3/2003 | Kanevsky et al. |
| 6,532,455 B1 | 3/2003 | Martin et al. |
| 6,535,865 B1 | 3/2003 | Skaaning et al. |
| 6,540,512 B1 | 4/2003 | Sachdeva et al. |
| 6,540,707 B1 | 4/2003 | Stark et al. |
| 6,542,593 B1 | 4/2003 | Bowman Amuah |
| 6,542,881 B1 | 4/2003 | Meidan et al. |
| 6,542,894 B1 | 4/2003 | Lee et al. |
| 6,542,903 B2 | 4/2003 | Hull et al. |
| 6,551,243 B2 | 4/2003 | Bocionek et al. |
| 6,554,837 B1 | 4/2003 | Hauri et al. |
| 6,556,659 B1 | 4/2003 | Bowman Amuah |
| 6,556,977 B1 | 4/2003 | Lapointe et al. |
| 6,560,592 B1 | 5/2003 | Reid et al. |
| 6,564,209 B1 | 5/2003 | Dempski et al. |
| 6,567,814 B1 | 5/2003 | Bankier et al. |
| 6,571,227 B1 | 5/2003 | Agrafiotis et al. |
| 6,572,372 B1 | 6/2003 | Phan et al. |
| 6,573,998 B2 | 6/2003 | Cohen Sabban |
| 6,574,561 B2 | 6/2003 | Alexander et al. |
| 6,578,003 B1 | 6/2003 | Camarda et al. |
| 6,580,948 B2 | 6/2003 | Haupert et al. |
| 6,587,529 B1 | 7/2003 | Staszewski et al. |
| 6,587,828 B1 | 7/2003 | Sachdeva |
| 6,592,368 B1 | 7/2003 | Weathers |
| 6,594,539 B1 | 7/2003 | Geng |
| 6,595,342 B1 | 7/2003 | Maritzen et al. |
| 6,597,934 B1 | 7/2003 | de Jong et al. |
| 6,598,043 B1 | 7/2003 | Baclawski |
| 6,599,250 B2 | 7/2003 | Webb et al. |
| 6,602,070 B2 | 8/2003 | Miller et al. |
| 6,604,527 B1 | 8/2003 | Palmisano |
| 6,606,744 B1 | 8/2003 | Mikurak |
| 6,607,382 B1 | 8/2003 | Kuo et al. |
| 6,611,783 B2 | 8/2003 | Kelly et al. |
| 6,611,867 B1 | 8/2003 | Bowman-Amuah |
| 6,613,001 B1 | 9/2003 | Dworkin |
| 6,615,158 B2 | 9/2003 | Wenzel et al. |
| 6,616,447 B1 | 9/2003 | Rizoiu et al. |
| 6,616,579 B1 | 9/2003 | Reinbold et al. |
| 6,621,491 B1 | 9/2003 | Baumrind et al. |
| 6,623,698 B2 | 9/2003 | Kuo |
| 6,624,752 B2 | 9/2003 | Klitsgaard et al. |
| 6,626,180 B1 | 9/2003 | Kittelsen et al. |
| 6,626,569 B2 | 9/2003 | Reinstein et al. |
| 6,626,669 B2 | 9/2003 | Zegarelli |
| 6,633,772 B2 | 10/2003 | Ford et al. |
| 6,640,128 B2 | 10/2003 | Vilsmeier et al. |
| 6,643,646 B2 | 11/2003 | Su et al. |
| 6,647,383 B1 | 11/2003 | August et al. |
| 6,650,944 B2 | 11/2003 | Goedeke et al. |
| 6,671,818 B1 | 12/2003 | Mikurak |
| 6,675,104 B2 | 1/2004 | Gavin et al. |
| 6,678,669 B2 | 1/2004 | Lapointe et al. |
| 6,682,346 B2 | 1/2004 | Chishti et al. |
| 6,685,469 B2 | 2/2004 | Chishti et al. |
| 6,689,055 B1 | 2/2004 | Mullen et al. |
| 6,690,761 B2 | 2/2004 | Lang et al. |
| 6,691,110 B2 | 2/2004 | Wang et al. |
| 6,694,234 B2 | 2/2004 | Lockwood et al. |
| 6,697,164 B1 | 2/2004 | Babayoff et al. |
| 6,697,793 B2 | 2/2004 | McGreevy |
| 6,702,765 B2 | 3/2004 | Robbins et al. |
| 6,702,804 B1 | 3/2004 | Ritter et al. |
| 6,705,863 B2 | 3/2004 | Phan et al. |
| 6,729,876 B2 | 5/2004 | Chishti et al. |
| 6,733,289 B2 | 5/2004 | Manemann et al. |
| 6,736,638 B1 | 5/2004 | Sachdeva et al. |
| 6,739,869 B1 | 5/2004 | Taub et al. |
| 6,744,932 B1 | 6/2004 | Rubbert et al. |
| 6,749,414 B1 | 6/2004 | Hanson et al. |
| 6,769,913 B2 | 8/2004 | Hurson |
| 6,772,026 B2 | 8/2004 | Bradbury et al. |
| 6,790,036 B2 | 9/2004 | Graham |
| 6,802,713 B1 | 10/2004 | Chishti et al. |
| 6,814,574 B2 | 11/2004 | Abolfathi et al. |
| 6,830,450 B2 | 12/2004 | Knopp et al. |
| 6,832,912 B2 | 12/2004 | Mao |
| 6,832,914 B1 | 12/2004 | Bonnet et al. |
| 6,843,370 B2 | 1/2005 | Tuneberg |
| 6,845,175 B2 | 1/2005 | Kopelman et al. |
| 6,885,464 B1 | 4/2005 | Pfeiffer et al. |
| 6,890,285 B2 | 5/2005 | Rahman et al. |
| 6,951,254 B2 | 10/2005 | Morrison |
| 6,976,841 B1 | 12/2005 | Osterwalder |
| 6,978,268 B2 | 12/2005 | Thomas et al. |
| 6,983,752 B2 | 1/2006 | Garabadian |
| 6,984,128 B2 | 1/2006 | Breining et al. |
| 6,988,893 B2 | 1/2006 | Haywood |
| 7,016,952 B2 | 3/2006 | Mullen et al. |
| 7,020,963 B2 | 4/2006 | Cleary et al. |
| 7,036,514 B2 | 5/2006 | Heck |
| 7,040,896 B2 | 5/2006 | Pavlovskaia et al. |
| 7,106,233 B2 | 9/2006 | Schroeder et al. |
| 7,112,065 B2 | 9/2006 | Kopelman et al. |
| 7,121,825 B2 | 10/2006 | Chishti et al. |
| 7,134,874 B2 | 11/2006 | Chishti et al. |
| 7,137,812 B2 | 11/2006 | Cleary et al. |
| 7,138,640 B1 | 11/2006 | Delgado et al. |
| 7,140,877 B2 | 11/2006 | Kaza |
| 7,142,312 B2 | 11/2006 | Quadling et al. |
| 7,155,373 B2 | 12/2006 | Jordan et al. |
| 7,156,655 B2 | 1/2007 | Sachdeva et al. |
| 7,156,661 B2 | 1/2007 | Choi et al. |
| 7,166,063 B2 | 1/2007 | Rahman et al. |
| 7,184,150 B2 | 2/2007 | Quadling et al. |
| 7,191,451 B2 | 3/2007 | Nakagawa |
| 7,192,273 B2 | 3/2007 | McSurdy |
| 7,194,781 B1 | 3/2007 | Orjela |
| 7,217,131 B2 | 5/2007 | Vuillemot |
| 7,220,122 B2 | 5/2007 | Chishti |
| 7,220,124 B2 | 5/2007 | Taub et al. |
| 7,229,282 B2 | 6/2007 | Andreiko et al. |
| 7,234,937 B2 | 6/2007 | Sachdeva et al. |

(56) References Cited

U.S. PATENT DOCUMENTS

| | | |
|---|---|---|
| 7,241,142 B2 | 7/2007 | Abolfathi et al. |
| 7,244,230 B2 | 7/2007 | Duggirala et al. |
| 7,245,753 B2 | 7/2007 | Squilla et al. |
| 7,257,136 B2 | 8/2007 | Mori et al. |
| 7,286,954 B2 | 10/2007 | Kopelman et al. |
| 7,292,759 B2 | 11/2007 | Boutoussov et al. |
| 7,294,141 B2 | 11/2007 | Bergersen |
| 7,302,842 B2 | 12/2007 | Biester et al. |
| 7,320,592 B2 | 1/2008 | Chishti et al. |
| 7,328,706 B2 | 2/2008 | Barach et al. |
| 7,329,122 B1 | 2/2008 | Scott |
| 7,338,327 B2 | 3/2008 | Sticker et al. |
| D565,509 S | 4/2008 | Fechner et al. |
| 7,351,116 B2 | 4/2008 | Dold |
| 7,354,270 B2 | 4/2008 | Abolfathi et al. |
| 7,357,637 B2 | 4/2008 | Liechtung |
| 7,435,083 B2 | 10/2008 | Chishti et al. |
| 7,450,231 B2 | 11/2008 | Johs et al. |
| 7,458,810 B2 | 12/2008 | Bergersen |
| 7,460,230 B2 | 12/2008 | Johs et al. |
| 7,462,076 B2 | 12/2008 | Walter et al. |
| 7,463,929 B2 | 12/2008 | Simmons |
| 7,476,100 B2 | 1/2009 | Kuo |
| 7,500,851 B2 | 3/2009 | Williams |
| D594,413 S | 6/2009 | Palka et al. |
| 7,543,511 B2 | 6/2009 | Kimura et al. |
| 7,544,103 B2 | 6/2009 | Walter et al. |
| 7,553,157 B2 | 6/2009 | Abolfathi et al. |
| 7,561,273 B2 | 7/2009 | Stautmeister et al. |
| 7,577,284 B2 | 8/2009 | Wong et al. |
| 7,596,253 B2 | 9/2009 | Wong et al. |
| 7,597,594 B2 | 10/2009 | Stadler et al. |
| 7,609,875 B2 | 10/2009 | Liu et al. |
| D603,796 S | 11/2009 | Sticker et al. |
| 7,616,319 B1 | 11/2009 | Woollam et al. |
| 7,626,705 B2 | 12/2009 | Altendorf |
| 7,632,216 B2 | 12/2009 | Rahman et al. |
| 7,633,625 B1 | 12/2009 | Woollam et al. |
| 7,637,262 B2 | 12/2009 | Bailey |
| 7,637,740 B2 | 12/2009 | Knopp |
| 7,641,473 B2 | 1/2010 | Sporbert et al. |
| 7,668,355 B2 | 2/2010 | Wong et al. |
| 7,670,179 B2 | 3/2010 | Müller |
| 7,695,327 B2 | 4/2010 | Bäuerle et al. |
| 7,698,068 B2 | 4/2010 | Babayoff |
| 7,711,447 B2 | 5/2010 | Lu et al. |
| 7,724,378 B2 | 5/2010 | Babayoff |
| D618,619 S | 6/2010 | Walter |
| 7,728,848 B2 | 6/2010 | Petrov et al. |
| 7,731,508 B2 | 6/2010 | Borst |
| 7,735,217 B2 | 6/2010 | Borst |
| 7,740,476 B2 | 6/2010 | Rubbert et al. |
| 7,744,369 B2 | 6/2010 | Imgrund et al. |
| 7,746,339 B2 | 6/2010 | Matov et al. |
| 7,780,460 B2 | 8/2010 | Walter |
| 7,787,132 B2 | 8/2010 | Körner et al. |
| 7,791,810 B2 | 9/2010 | Powell |
| 7,796,243 B2 | 9/2010 | Choo-Smith et al. |
| 7,806,687 B2 | 10/2010 | Minagi et al. |
| 7,806,727 B2 | 10/2010 | Dold et al. |
| 7,813,787 B2 | 10/2010 | de Josselin de Jong et al. |
| 7,824,180 B2 | 11/2010 | Abolfathi et al. |
| 7,828,601 B2 | 11/2010 | Pyczak |
| 7,841,464 B2 | 11/2010 | Cinader, Jr. et al. |
| 7,845,969 B2 | 12/2010 | Stadler et al. |
| 7,854,609 B2 | 12/2010 | Chen et al. |
| 7,862,336 B2 | 1/2011 | Kopelman et al. |
| 7,869,983 B2 | 1/2011 | Raby et al. |
| 7,872,760 B2 | 1/2011 | Ertl |
| 7,874,836 B2 | 1/2011 | McSurdy |
| 7,874,837 B2 | 1/2011 | Chishti et al. |
| 7,874,849 B2 | 1/2011 | Sticker et al. |
| 7,878,801 B2 | 2/2011 | Abolfathi et al. |
| 7,878,805 B2 | 2/2011 | Moss et al. |
| 7,880,751 B2 | 2/2011 | Kuo et al. |
| 7,892,474 B2 | 2/2011 | Shkolnik et al. |
| 7,904,308 B2 | 3/2011 | Arnone et al. |
| 7,907,280 B2 | 3/2011 | Johs et al. |
| 7,929,151 B2 | 4/2011 | Liang et al. |
| 7,930,189 B2 | 4/2011 | Kuo |
| 7,947,508 B2 | 5/2011 | Tricca et al. |
| 7,959,308 B2 | 6/2011 | Freeman et al. |
| 7,963,766 B2 | 6/2011 | Cronauer |
| 7,970,627 B2 | 6/2011 | Kuo et al. |
| 7,985,414 B2 | 7/2011 | Knaack et al. |
| 7,986,415 B2 | 7/2011 | Thiel et al. |
| 7,987,099 B2 | 7/2011 | Kuo et al. |
| 7,991,485 B2 | 8/2011 | Zakim |
| 8,017,891 B2 | 9/2011 | Nevin |
| 8,026,916 B2 | 9/2011 | Wen |
| 8,027,709 B2 | 9/2011 | Arnone et al. |
| 8,029,277 B2 | 10/2011 | Imgrund et al. |
| 8,038,444 B2 | 10/2011 | Kitching et al. |
| 8,045,772 B2 | 10/2011 | Kosuge et al. |
| 8,054,556 B2 | 11/2011 | Chen et al. |
| 8,070,490 B1 | 12/2011 | Roetzer et al. |
| 8,075,306 B2 | 12/2011 | Kitching et al. |
| 8,077,949 B2 | 12/2011 | Liang et al. |
| 8,083,556 B2 | 12/2011 | Stadler et al. |
| D652,799 S | 1/2012 | Mueller |
| 8,092,215 B2 | 1/2012 | Stone-Collonge et al. |
| 8,095,383 B2 | 1/2012 | Arnone et al. |
| 8,099,268 B2 | 1/2012 | Kitching et al. |
| 8,099,305 B2 | 1/2012 | Kuo et al. |
| 8,108,189 B2 | 1/2012 | Chelnokov et al. |
| 8,118,592 B2 | 2/2012 | Tortorici |
| 8,126,025 B2 | 2/2012 | Takeda |
| 8,136,529 B2 | 3/2012 | Kelly |
| 8,144,954 B2 | 3/2012 | Quadling et al. |
| 8,152,518 B2 | 4/2012 | Kuo |
| 8,160,334 B2 | 4/2012 | Thiel et al. |
| 8,172,569 B2 | 5/2012 | Matty et al. |
| 8,197,252 B1 | 6/2012 | Harrison, III |
| 8,201,560 B2 | 6/2012 | Dembro |
| 8,215,312 B2 | 7/2012 | Garabadian et al. |
| 8,240,018 B2 | 8/2012 | Walter et al. |
| 8,275,180 B2 | 9/2012 | Kuo |
| 8,279,450 B2 | 10/2012 | Oota et al. |
| 8,292,617 B2 | 10/2012 | Brandt et al. |
| 8,294,657 B2 | 10/2012 | Kim et al. |
| 8,296,952 B2 | 10/2012 | Greenberg |
| 8,297,286 B2 | 10/2012 | Smernoff |
| 8,306,608 B2 | 11/2012 | Mandelis et al. |
| 8,314,764 B2 | 11/2012 | Kim et al. |
| 8,332,015 B2 | 12/2012 | Ertl |
| 8,354,588 B2 | 1/2013 | Sticker et al. |
| 8,366,479 B2 | 2/2013 | Borst et al. |
| 8,401,826 B2 | 3/2013 | Cheng et al. |
| 8,419,428 B2 | 4/2013 | Lawrence |
| 8,433,083 B2 | 4/2013 | Abolfathi et al. |
| 8,439,672 B2 | 5/2013 | Matov et al. |
| 8,465,280 B2 | 6/2013 | Sachdeva et al. |
| 8,477,320 B2 | 7/2013 | Stock et al. |
| 8,488,113 B2 | 7/2013 | Thiel et al. |
| 8,517,726 B2 | 8/2013 | Kakavand et al. |
| 8,520,922 B2 | 8/2013 | Wang et al. |
| 8,520,925 B2 | 8/2013 | Duret et al. |
| 8,523,565 B2 | 9/2013 | Matty et al. |
| 8,545,221 B2 | 10/2013 | Stone-Collonge et al. |
| 8,556,625 B2 | 10/2013 | Lovely |
| 8,570,530 B2 | 10/2013 | Liang |
| 8,573,224 B2 | 11/2013 | Thornton |
| 8,577,212 B2 | 11/2013 | Thiel |
| 8,601,925 B1 | 12/2013 | Coto |
| 8,639,477 B2 | 1/2014 | Chelnokov et al. |
| 8,650,586 B2 | 2/2014 | Lee et al. |
| 8,675,706 B2 | 3/2014 | Seurin et al. |
| 8,723,029 B2 | 5/2014 | Pyczak et al. |
| 8,738,394 B2 | 5/2014 | Kuo |
| 8,743,923 B2 | 6/2014 | Geske et al. |
| 8,753,114 B2 | 6/2014 | Vuillemot |
| 8,767,270 B2 | 7/2014 | Curry et al. |
| 8,768,016 B2 | 7/2014 | Pan et al. |
| 8,771,149 B2 | 7/2014 | Rahman et al. |

(56) References Cited

U.S. PATENT DOCUMENTS

| | | |
|---|---|---|
| 8,839,476 B2 | 9/2014 | Adachi |
| 8,843,381 B2 | 9/2014 | Kuo et al. |
| 8,856,053 B2 | 10/2014 | Mah |
| 8,870,566 B2 | 10/2014 | Bergersen |
| 8,874,452 B2 | 10/2014 | Kuo |
| 8,878,905 B2 | 11/2014 | Fisker et al. |
| 8,899,976 B2 | 12/2014 | Chen et al. |
| 8,936,463 B2 | 1/2015 | Mason et al. |
| 8,944,812 B2 | 2/2015 | Kou |
| 8,948,482 B2 | 2/2015 | Levin |
| 8,956,058 B2 | 2/2015 | Rösch |
| 8,992,216 B2 | 3/2015 | Karazivan |
| 9,004,915 B2 | 4/2015 | Moss et al. |
| 9,022,792 B2 | 5/2015 | Sticker et al. |
| 9,039,418 B1 | 5/2015 | Rubbert |
| 9,084,535 B2 | 7/2015 | Girkin et al. |
| 9,084,657 B2 | 7/2015 | Matty et al. |
| 9,108,338 B2 | 8/2015 | Sirovskiy et al. |
| 9,144,512 B2 | 9/2015 | Wagner |
| 9,192,305 B2 | 11/2015 | Levin |
| 9,204,952 B2 | 12/2015 | Lampalzer |
| 9,211,166 B2 | 12/2015 | Kuo et al. |
| 9,214,014 B2 | 12/2015 | Levin |
| 9,220,580 B2 | 12/2015 | Borovinskih et al. |
| 9,241,774 B2 | 1/2016 | Li et al. |
| 9,242,118 B2 | 1/2016 | Brawn |
| 9,261,358 B2 | 2/2016 | Atiya et al. |
| 9,277,972 B2 | 3/2016 | Brandt et al. |
| 9,336,336 B2 | 5/2016 | Deichmann et al. |
| 9,351,810 B2 | 5/2016 | Moon |
| 9,375,300 B2 | 6/2016 | Matov et al. |
| 9,403,238 B2 | 8/2016 | Culp |
| 9,408,743 B1 | 8/2016 | Wagner |
| 9,414,897 B2 | 8/2016 | Wu et al. |
| 9,433,476 B2 | 9/2016 | Khardekar et al. |
| 9,439,568 B2 | 9/2016 | Atiya et al. |
| 9,444,981 B2 | 9/2016 | Bellis et al. |
| 9,463,287 B1 | 10/2016 | Lorberbaum et al. |
| 9,492,243 B2 | 11/2016 | Kuo |
| 9,500,635 B2 | 11/2016 | Islam |
| 9,506,808 B2 | 11/2016 | Jeon et al. |
| 9,510,918 B2 | 12/2016 | Sanchez |
| 9,545,331 B2 | 1/2017 | Ingemarsson-Matzen |
| 9,566,132 B2 | 2/2017 | Stone-Collonge et al. |
| 9,584,771 B2 | 2/2017 | Mandelis et al. |
| 9,589,329 B2 | 3/2017 | Levin |
| 9,675,427 B2 | 6/2017 | Kopelman |
| 9,675,430 B2 | 6/2017 | Verker et al. |
| 9,693,839 B2 | 7/2017 | Atiya et al. |
| 9,730,769 B2 | 8/2017 | Chen et al. |
| 9,744,006 B2 | 8/2017 | Ross |
| 9,820,829 B2 | 11/2017 | Kuo |
| 9,830,688 B2 | 11/2017 | Levin |
| 9,844,421 B2 | 12/2017 | Moss et al. |
| 9,848,985 B2 | 12/2017 | Yang et al. |
| 9,861,451 B1 | 1/2018 | Davis |
| 9,936,186 B2 | 4/2018 | Jesenko et al. |
| 10,123,706 B2 | 11/2018 | Elbaz et al. |
| 10,123,853 B2 | 11/2018 | Moss et al. |
| 10,154,889 B2 | 12/2018 | Chen et al. |
| 10,159,541 B2 | 12/2018 | Bindayel |
| 10,172,693 B2 | 1/2019 | Brandt et al. |
| 10,195,690 B2 | 2/2019 | Culp |
| 10,231,801 B2 | 3/2019 | Korytov et al. |
| 10,238,472 B2 | 3/2019 | Levin |
| 10,248,883 B2 | 4/2019 | Borovinskih et al. |
| 10,258,432 B2 | 4/2019 | Webber |
| 10,561,416 B2 | 2/2020 | Williams et al. |
| 2001/0002310 A1 | 5/2001 | Chishti et al. |
| 2001/0032100 A1 | 10/2001 | Mahmud et al. |
| 2001/0038705 A1 | 11/2001 | Rubbert et al. |
| 2001/0041320 A1 | 11/2001 | Phan et al. |
| 2002/0004727 A1 | 1/2002 | Knaus et al. |
| 2002/0007284 A1 | 1/2002 | Schurenberg et al. |
| 2002/0010568 A1 | 1/2002 | Rubbert et al. |
| 2002/0015934 A1 | 2/2002 | Rubbert et al. |
| 2002/0025503 A1 | 2/2002 | Chapoulaud et al. |
| 2002/0026105 A1 | 2/2002 | Drazen |
| 2002/0028417 A1 | 3/2002 | Chapoulaud et al. |
| 2002/0035572 A1 | 3/2002 | Takatori et al. |
| 2002/0064752 A1 | 5/2002 | Durbin et al. |
| 2002/0064759 A1 | 5/2002 | Durbin et al. |
| 2002/0087551 A1 | 7/2002 | Hickey et al. |
| 2002/0107853 A1 | 8/2002 | Hofmann et al. |
| 2002/0188478 A1 | 12/2002 | Breeland et al. |
| 2002/0192617 A1 | 12/2002 | Phan et al. |
| 2003/0000927 A1 | 1/2003 | Kanaya et al. |
| 2003/0008259 A1 | 1/2003 | Kuo et al. |
| 2003/0009252 A1 | 1/2003 | Pavlovskaia et al. |
| 2003/0019848 A1 | 1/2003 | Nicholas et al. |
| 2003/0021453 A1 | 1/2003 | Weise et al. |
| 2003/0035061 A1 | 2/2003 | Iwaki et al. |
| 2003/0049581 A1 | 3/2003 | Deluke |
| 2003/0057192 A1 | 3/2003 | Patel |
| 2003/0059736 A1 | 3/2003 | Lai et al. |
| 2003/0060532 A1 | 3/2003 | Subelka et al. |
| 2003/0068598 A1 | 4/2003 | Vallittu et al. |
| 2003/0095697 A1 | 5/2003 | Wood et al. |
| 2003/0101079 A1 | 5/2003 | McLaughlin |
| 2003/0103060 A1 | 6/2003 | Anderson et al. |
| 2003/0120517 A1 | 6/2003 | Eida et al. |
| 2003/0139834 A1 | 7/2003 | Nikolskiy et al. |
| 2003/0144886 A1 | 7/2003 | Taira |
| 2003/0172043 A1 | 9/2003 | Guyon et al. |
| 2003/0190575 A1 | 10/2003 | Hilliard |
| 2003/0192867 A1 | 10/2003 | Yamazaki et al. |
| 2003/0207224 A1 | 11/2003 | Lotte |
| 2003/0215764 A1 | 11/2003 | Kopelman et al. |
| 2003/0224311 A1 | 12/2003 | Cronauer |
| 2003/0224313 A1 | 12/2003 | Bergersen |
| 2003/0224314 A1 | 12/2003 | Bergersen |
| 2004/0000287 A1 | 1/2004 | Sachdeva |
| 2004/0009449 A1 | 1/2004 | Mah et al. |
| 2004/0013994 A1 | 1/2004 | Goldberg et al. |
| 2004/0019262 A1 | 1/2004 | Perelgut |
| 2004/0029078 A1 | 2/2004 | Marshall |
| 2004/0038168 A1 | 2/2004 | Choi et al. |
| 2004/0054304 A1 | 3/2004 | Raby |
| 2004/0054358 A1 | 3/2004 | Cox et al. |
| 2004/0058295 A1 | 3/2004 | Bergersen |
| 2004/0068199 A1 | 4/2004 | Echauz et al. |
| 2004/0078222 A1 | 4/2004 | Khan et al. |
| 2004/0080621 A1 | 4/2004 | Fisher et al. |
| 2004/0094165 A1 | 5/2004 | Cook |
| 2004/0107118 A1 | 6/2004 | Harnsberger et al. |
| 2004/0133083 A1 | 7/2004 | Comaniciu et al. |
| 2004/0152036 A1 | 8/2004 | Abolfathi |
| 2004/0158194 A1 | 8/2004 | Wolff et al. |
| 2004/0166463 A1 | 8/2004 | Wen et al. |
| 2004/0167646 A1 | 8/2004 | Jelonek et al. |
| 2004/0170941 A1 | 9/2004 | Phan et al. |
| 2004/0193036 A1 | 9/2004 | Zhou et al. |
| 2004/0197728 A1 | 10/2004 | Abolfathi et al. |
| 2004/0214128 A1 | 10/2004 | Sachdeva et al. |
| 2004/0219479 A1 | 11/2004 | Malin et al. |
| 2004/0220691 A1 | 11/2004 | Hofmeister et al. |
| 2004/0229185 A1* | 11/2004 | Knopp ............... A61C 7/146 433/24 |
| 2004/0259049 A1 | 12/2004 | Kopelman et al. |
| 2005/0003318 A1 | 1/2005 | Choi et al. |
| 2005/0023356 A1 | 2/2005 | Wiklof et al. |
| 2005/0031196 A1 | 2/2005 | Moghaddam et al. |
| 2005/0037312 A1 | 2/2005 | Uchida |
| 2005/0038669 A1 | 2/2005 | Sachdeva et al. |
| 2005/0040551 A1 | 2/2005 | Biegler et al. |
| 2005/0042569 A1 | 2/2005 | Plan et al. |
| 2005/0042577 A1 | 2/2005 | Kvitrud et al. |
| 2005/0048433 A1 | 3/2005 | Hilliard |
| 2005/0074717 A1 | 4/2005 | Cleary et al. |
| 2005/0089822 A1 | 4/2005 | Geng |
| 2005/0100333 A1 | 5/2005 | Kerschbaumer et al. |
| 2005/0108052 A1 | 5/2005 | Omaboe |
| 2005/0131738 A1 | 6/2005 | Morris |
| 2005/0144150 A1 | 6/2005 | Ramamurthy et al. |

(56) References Cited

U.S. PATENT DOCUMENTS

| | | |
|---|---|---|
| 2005/0171594 A1 | 8/2005 | MacHan et al. |
| 2005/0171630 A1 | 8/2005 | Dinauer et al. |
| 2005/0181333 A1 | 8/2005 | Karazivan et al. |
| 2005/0186524 A1 | 8/2005 | Abolfathi et al. |
| 2005/0186526 A1 | 8/2005 | Stewart et al. |
| 2005/0216314 A1 | 9/2005 | Secor |
| 2005/0233276 A1* | 10/2005 | Kopelman ............... A61C 7/08 433/3 |
| 2005/0239013 A1 | 10/2005 | Sachdeva |
| 2005/0244781 A1 | 11/2005 | Abels et al. |
| 2005/0244791 A1 | 11/2005 | Davis et al. |
| 2005/0271996 A1 | 12/2005 | Sporbert et al. |
| 2006/0056670 A1 | 3/2006 | Hamadeh |
| 2006/0057533 A1 | 3/2006 | McGann |
| 2006/0063135 A1 | 3/2006 | Mehl |
| 2006/0078842 A1 | 4/2006 | Sachdeva et al. |
| 2006/0084024 A1 | 4/2006 | Farrell |
| 2006/0093982 A1 | 5/2006 | Wen |
| 2006/0093984 A1 | 5/2006 | Rosenberg |
| 2006/0098007 A1 | 5/2006 | Rouet et al. |
| 2006/0099545 A1 | 5/2006 | Lia et al. |
| 2006/0099546 A1 | 5/2006 | Bergersen |
| 2006/0110698 A1 | 5/2006 | Robson |
| 2006/0111631 A1 | 5/2006 | Kelliher et al. |
| 2006/0115782 A1 | 6/2006 | Li et al. |
| 2006/0115785 A1 | 6/2006 | Li et al. |
| 2006/0137813 A1 | 6/2006 | Robrecht et al. |
| 2006/0147872 A1 | 7/2006 | Andreiko |
| 2006/0154198 A1 | 7/2006 | Durbin et al. |
| 2006/0154207 A1 | 7/2006 | Kuo |
| 2006/0173715 A1 | 8/2006 | Wang |
| 2006/0183082 A1 | 8/2006 | Quadling et al. |
| 2006/0188834 A1 | 8/2006 | Hilliard |
| 2006/0188848 A1 | 8/2006 | Tricca et al. |
| 2006/0194163 A1 | 8/2006 | Tricca et al. |
| 2006/0199153 A1 | 9/2006 | Liu et al. |
| 2006/0204078 A1 | 9/2006 | Orth et al. |
| 2006/0223022 A1 | 10/2006 | Solomon |
| 2006/0223023 A1 | 10/2006 | Lai et al. |
| 2006/0223032 A1 | 10/2006 | Fried et al. |
| 2006/0223342 A1 | 10/2006 | Borst et al. |
| 2006/0234179 A1 | 10/2006 | Wen et al. |
| 2006/0257815 A1 | 11/2006 | De Dominicis |
| 2006/0275729 A1* | 12/2006 | Fornoff ................... A61C 7/12 433/2 |
| 2006/0275731 A1 | 12/2006 | Wen et al. |
| 2006/0275736 A1 | 12/2006 | Wen et al. |
| 2006/0277075 A1 | 12/2006 | Salwan |
| 2006/0290693 A1 | 12/2006 | Zhou et al. |
| 2006/0292520 A1 | 12/2006 | Dillon et al. |
| 2007/0031775 A1* | 2/2007 | Andreiko ............... A61C 7/146 433/24 |
| 2007/0046865 A1 | 3/2007 | Umeda et al. |
| 2007/0053048 A1 | 3/2007 | Kumar et al. |
| 2007/0054237 A1 | 3/2007 | Neuschafer |
| 2007/0065768 A1 | 3/2007 | Nadav |
| 2007/0087300 A1 | 4/2007 | Willison et al. |
| 2007/0087302 A1 | 4/2007 | Reising et al. |
| 2007/0106138 A1 | 5/2007 | Beiski et al. |
| 2007/0122592 A1 | 5/2007 | Anderson et al. |
| 2007/0128574 A1 | 6/2007 | Kuo et al. |
| 2007/0141525 A1 | 6/2007 | Cinader, Jr. |
| 2007/0141526 A1 | 6/2007 | Eisenberg et al. |
| 2007/0143135 A1 | 6/2007 | Lindquist et al. |
| 2007/0168152 A1 | 7/2007 | Matov et al. |
| 2007/0172112 A1 | 7/2007 | Paley et al. |
| 2007/0172291 A1 | 7/2007 | Yokoyama |
| 2007/0178420 A1 | 8/2007 | Keski-Nisula et al. |
| 2007/0183633 A1 | 8/2007 | Hoffmann |
| 2007/0184402 A1 | 8/2007 | Boutoussov et al. |
| 2007/0185732 A1 | 8/2007 | Hicks et al. |
| 2007/0192137 A1 | 8/2007 | Ombrellaro |
| 2007/0199929 A1 | 8/2007 | Rippl et al. |
| 2007/0215582 A1 | 9/2007 | Roeper et al. |
| 2007/0218422 A1 | 9/2007 | Ehrenfeld |
| 2007/0231765 A1 | 10/2007 | Phan et al. |
| 2007/0238065 A1 | 10/2007 | Sherwood et al. |
| 2007/0238066 A1 | 10/2007 | Kopelman et al. |
| 2007/0239488 A1 | 10/2007 | DeRosso |
| 2007/0263226 A1 | 11/2007 | Kurtz et al. |
| 2008/0013727 A1 | 1/2008 | Uemura |
| 2008/0020350 A1 | 1/2008 | Matov et al. |
| 2008/0045053 A1 | 2/2008 | Stadler et al. |
| 2008/0057461 A1 | 3/2008 | Cheng et al. |
| 2008/0057467 A1 | 3/2008 | Gittelson |
| 2008/0057479 A1 | 3/2008 | Grenness |
| 2008/0059238 A1 | 3/2008 | Park et al. |
| 2008/0062429 A1 | 3/2008 | Liang et al. |
| 2008/0090208 A1 | 4/2008 | Rubbert |
| 2008/0094389 A1 | 4/2008 | Rouet et al. |
| 2008/0113317 A1 | 5/2008 | Kemp et al. |
| 2008/0115791 A1 | 5/2008 | Heine |
| 2008/0118882 A1 | 5/2008 | Su |
| 2008/0118886 A1 | 5/2008 | Liang et al. |
| 2008/0141534 A1 | 6/2008 | Hilliard |
| 2008/0169122 A1 | 7/2008 | Shiraishi et al. |
| 2008/0171934 A1 | 7/2008 | Greenan et al. |
| 2008/0176448 A1 | 7/2008 | Muller et al. |
| 2008/0233530 A1 | 9/2008 | Cinader |
| 2008/0242144 A1 | 10/2008 | Dietz |
| 2008/0248443 A1 | 10/2008 | Chishti et al. |
| 2008/0254403 A1 | 10/2008 | Hilliard |
| 2008/0268400 A1 | 10/2008 | Moss et al. |
| 2008/0306724 A1 | 12/2008 | Kitching et al. |
| 2009/0029310 A1 | 1/2009 | Pumphrey et al. |
| 2009/0030290 A1 | 1/2009 | Kozuch et al. |
| 2009/0030347 A1 | 1/2009 | Cao |
| 2009/0040740 A1 | 2/2009 | Muller et al. |
| 2009/0061379 A1 | 3/2009 | Yamamoto et al. |
| 2009/0061381 A1 | 3/2009 | Durbin et al. |
| 2009/0075228 A1 | 3/2009 | Kumada et al. |
| 2009/0087050 A1 | 4/2009 | Gandyra |
| 2009/0098502 A1 | 4/2009 | Andreiko |
| 2009/0099445 A1 | 4/2009 | Burger |
| 2009/0103579 A1 | 4/2009 | Ushimaru et al. |
| 2009/0105523 A1 | 4/2009 | Kassayan et al. |
| 2009/0130620 A1 | 5/2009 | Yazdi et al. |
| 2009/0136890 A1* | 5/2009 | Kang .................... A61C 7/145 433/10 |
| 2009/0136893 A1 | 5/2009 | Zegarelli |
| 2009/0148809 A1 | 6/2009 | Kuo et al. |
| 2009/0170050 A1 | 7/2009 | Marcus |
| 2009/0181346 A1 | 7/2009 | Orth |
| 2009/0191502 A1 | 7/2009 | Cao et al. |
| 2009/0210032 A1 | 8/2009 | Beiski et al. |
| 2009/0218514 A1 | 9/2009 | Klunder et al. |
| 2009/0281433 A1 | 11/2009 | Saadat et al. |
| 2009/0286195 A1 | 11/2009 | Sears et al. |
| 2009/0298017 A1 | 12/2009 | Boerjes et al. |
| 2009/0305540 A1 | 12/2009 | Stadler et al. |
| 2009/0316966 A1 | 12/2009 | Marshall et al. |
| 2009/0317757 A1 | 12/2009 | Lemchen |
| 2010/0015565 A1 | 1/2010 | Gonzalez et al. |
| 2010/0019170 A1 | 1/2010 | Hart et al. |
| 2010/0028825 A1 | 2/2010 | Lemchen |
| 2010/0045902 A1 | 2/2010 | Ikeda et al. |
| 2010/0062394 A1 | 3/2010 | Jones et al. |
| 2010/0068676 A1 | 3/2010 | Mason et al. |
| 2010/0138025 A1 | 6/2010 | Morton et al. |
| 2010/0142789 A1 | 6/2010 | Chang et al. |
| 2010/0145664 A1 | 6/2010 | Hultgren et al. |
| 2010/0145898 A1 | 6/2010 | Malfliet et al. |
| 2010/0152599 A1 | 6/2010 | DuHamel et al. |
| 2010/0165275 A1 | 7/2010 | Tsukamoto |
| 2010/0167225 A1 | 7/2010 | Kuo |
| 2010/0179789 A1 | 7/2010 | Sachdeva et al. |
| 2010/0193482 A1 | 8/2010 | Ow et al. |
| 2010/0196837 A1 | 8/2010 | Farrell |
| 2010/0216085 A1 | 8/2010 | Kopelman |
| 2010/0217130 A1 | 8/2010 | Weinlaender |
| 2010/0231577 A1 | 9/2010 | Kim et al. |
| 2010/0268363 A1 | 10/2010 | Karim et al. |
| 2010/0268515 A1 | 10/2010 | Vogt et al. |
| 2010/0279243 A1 | 11/2010 | Cinader et al. |

(56) References Cited

U.S. PATENT DOCUMENTS

| | | |
|---|---|---|
| 2010/0280798 A1 | 11/2010 | Pattijn |
| 2010/0281370 A1 | 11/2010 | Rohaly et al. |
| 2010/0303316 A1 | 12/2010 | Bullis et al. |
| 2010/0312484 A1 | 12/2010 | DuHamel et al. |
| 2010/0327461 A1 | 12/2010 | Co et al. |
| 2011/0007920 A1 | 1/2011 | Abolfathi et al. |
| 2011/0012901 A1 | 1/2011 | Kaplanyan |
| 2011/0045428 A1 | 2/2011 | Boltunov et al. |
| 2011/0056350 A1 | 3/2011 | Gale et al. |
| 2011/0065060 A1 | 3/2011 | Teixeira et al. |
| 2011/0081625 A1 | 4/2011 | Fuh |
| 2011/0091832 A1 | 4/2011 | Kim et al. |
| 2011/0102549 A1 | 5/2011 | Takahashi |
| 2011/0102566 A1 | 5/2011 | Zakian et al. |
| 2011/0104630 A1 | 5/2011 | Matov et al. |
| 2011/0136072 A1 | 6/2011 | Li et al. |
| 2011/0136090 A1 | 6/2011 | Kazemi |
| 2011/0143300 A1 | 6/2011 | Villaalba |
| 2011/0143673 A1 | 6/2011 | Landesman et al. |
| 2011/0159452 A1* | 6/2011 | Huang ............... A61C 7/146 433/24 |
| 2011/0164810 A1 | 7/2011 | Zang et al. |
| 2011/0207072 A1 | 8/2011 | Schiemann |
| 2011/0212420 A1 | 9/2011 | Vuillemot |
| 2011/0220623 A1 | 9/2011 | Beutler |
| 2011/0235045 A1 | 9/2011 | Koerner et al. |
| 2011/0269092 A1 | 11/2011 | Kuo et al. |
| 2011/0316994 A1 | 12/2011 | Lemchen |
| 2012/0028210 A1 | 2/2012 | Hegyi et al. |
| 2012/0029883 A1 | 2/2012 | Heinz et al. |
| 2012/0040311 A1 | 2/2012 | Nilsson |
| 2012/0064477 A1 | 3/2012 | Schmitt |
| 2012/0081786 A1 | 4/2012 | Mizuyama et al. |
| 2012/0086681 A1 | 4/2012 | Kim et al. |
| 2012/0115107 A1 | 5/2012 | Adams |
| 2012/0129117 A1 | 5/2012 | McCance |
| 2012/0147912 A1 | 6/2012 | Moench et al. |
| 2012/0150494 A1 | 6/2012 | Anderson et al. |
| 2012/0166213 A1 | 6/2012 | Arnone et al. |
| 2012/0172678 A1 | 7/2012 | Logan et al. |
| 2012/0281293 A1 | 11/2012 | Gronenborn et al. |
| 2012/0295216 A1 | 11/2012 | Dykes et al. |
| 2012/0322025 A1 | 12/2012 | Ozawa et al. |
| 2013/0029284 A1 | 1/2013 | Teasdale |
| 2013/0081271 A1 | 4/2013 | Farzin-Nia et al. |
| 2013/0081272 A1 | 4/2013 | Johnson et al. |
| 2013/0089828 A1 | 4/2013 | Borovinskih et al. |
| 2013/0095446 A1 | 4/2013 | Andreiko et al. |
| 2013/0103176 A1 | 4/2013 | Kopelman et al. |
| 2013/0110469 A1 | 5/2013 | Kopelman |
| 2013/0150689 A1 | 6/2013 | Shaw-Klein |
| 2013/0163627 A1 | 6/2013 | Seurin et al. |
| 2013/0201488 A1 | 8/2013 | Ishihara |
| 2013/0204599 A1 | 8/2013 | Matov et al. |
| 2013/0209952 A1* | 8/2013 | Kuo ................. A61C 7/002 433/10 |
| 2013/0235165 A1 | 9/2013 | Gharib et al. |
| 2013/0252195 A1 | 9/2013 | Popat |
| 2013/0266326 A1 | 10/2013 | Joseph et al. |
| 2013/0278396 A1 | 10/2013 | Kimmel |
| 2013/0280671 A1 | 10/2013 | Brawn et al. |
| 2013/0286174 A1 | 10/2013 | Urakabe |
| 2013/0293824 A1 | 11/2013 | Yoneyama et al. |
| 2013/0323664 A1 | 12/2013 | Parker |
| 2013/0323671 A1 | 12/2013 | Dillon et al. |
| 2013/0323674 A1 | 12/2013 | Hakomori et al. |
| 2013/0325431 A1 | 12/2013 | See et al. |
| 2013/0337412 A1 | 12/2013 | Kwon |
| 2014/0061974 A1 | 3/2014 | Tyler |
| 2014/0081091 A1 | 3/2014 | Abolfathi et al. |
| 2014/0093160 A1 | 4/2014 | Porikli et al. |
| 2014/0106289 A1 | 4/2014 | Kozlowski |
| 2014/0122027 A1 | 5/2014 | Andreiko et al. |
| 2014/0136222 A1 | 5/2014 | Arnone et al. |
| 2014/0142902 A1 | 5/2014 | Chelnokov et al. |
| 2014/0178829 A1 | 6/2014 | Kim |
| 2014/0178830 A1 | 6/2014 | Widu |
| 2014/0186794 A1 | 7/2014 | Deichmann et al. |
| 2014/0265034 A1 | 9/2014 | Dudley |
| 2014/0272774 A1 | 9/2014 | Dillon et al. |
| 2014/0280376 A1 | 9/2014 | Kuo |
| 2014/0294273 A1 | 10/2014 | Jaisson |
| 2014/0313299 A1 | 10/2014 | Gebhardt et al. |
| 2014/0329194 A1 | 11/2014 | Sachdeva et al. |
| 2014/0342301 A1 | 11/2014 | Fleer et al. |
| 2014/0350354 A1 | 11/2014 | Stenzler et al. |
| 2014/0363778 A1 | 12/2014 | Parker |
| 2015/0002649 A1 | 1/2015 | Nowak et al. |
| 2015/0004553 A1 | 1/2015 | Li et al. |
| 2015/0021210 A1 | 1/2015 | Kesling |
| 2015/0079531 A1 | 3/2015 | Heine |
| 2015/0079544 A1 | 3/2015 | Boltunov et al. |
| 2015/0094564 A1 | 4/2015 | Tashman et al. |
| 2015/0097315 A1 | 4/2015 | DeSimone et al. |
| 2015/0097316 A1 | 4/2015 | DeSimone et al. |
| 2015/0102532 A1 | 4/2015 | DeSimone et al. |
| 2015/0132708 A1 | 5/2015 | Kuo |
| 2015/0140502 A1 | 5/2015 | Brawn et al. |
| 2015/0150501 A1 | 6/2015 | George et al. |
| 2015/0164335 A1 | 6/2015 | Van Der Poel et al. |
| 2015/0173856 A1 | 6/2015 | Iowe et al. |
| 2015/0182303 A1 | 7/2015 | Abraham et al. |
| 2015/0216626 A1 | 8/2015 | Ranjbar |
| 2015/0216716 A1 | 8/2015 | Anitua |
| 2015/0230885 A1 | 8/2015 | Wucher |
| 2015/0238280 A1 | 8/2015 | Wu et al. |
| 2015/0238283 A1 | 8/2015 | Tanugula et al. |
| 2015/0306486 A1 | 10/2015 | Logan et al. |
| 2015/0320320 A1 | 11/2015 | Kopelman et al. |
| 2015/0320532 A1 | 11/2015 | Matty et al. |
| 2015/0325044 A1 | 11/2015 | Lebovitz |
| 2015/0338209 A1 | 11/2015 | Knüttel |
| 2015/0351638 A1 | 12/2015 | Amato |
| 2015/0374469 A1 | 12/2015 | Konno et al. |
| 2016/0000332 A1 | 1/2016 | Atiya et al. |
| 2016/0003610 A1 | 1/2016 | Lampert et al. |
| 2016/0022185 A1 | 1/2016 | Agarwal et al. |
| 2016/0042509 A1 | 2/2016 | Andreiko et al. |
| 2016/0051345 A1 | 2/2016 | Levin |
| 2016/0064898 A1 | 3/2016 | Atiya et al. |
| 2016/0067013 A1 | 3/2016 | Morton et al. |
| 2016/0081768 A1 | 3/2016 | Kopelman et al. |
| 2016/0081769 A1 | 3/2016 | Kimura et al. |
| 2016/0095668 A1 | 4/2016 | Kuo et al. |
| 2016/0100924 A1 | 4/2016 | Wilson et al. |
| 2016/0106520 A1 | 4/2016 | Borovinskih et al. |
| 2016/0120621 A1 | 5/2016 | Li et al. |
| 2016/0135924 A1 | 5/2016 | Choi et al. |
| 2016/0135925 A1 | 5/2016 | Mason et al. |
| 2016/0135927 A1 | 5/2016 | Boltunov et al. |
| 2016/0163115 A1 | 6/2016 | Furst |
| 2016/0217708 A1 | 7/2016 | Levin et al. |
| 2016/0220105 A1 | 8/2016 | Durent |
| 2016/0220200 A1 | 8/2016 | Sandholm et al. |
| 2016/0225151 A1 | 8/2016 | Cocco et al. |
| 2016/0228213 A1 | 8/2016 | Tod et al. |
| 2016/0242871 A1 | 8/2016 | Morton et al. |
| 2016/0246936 A1 | 8/2016 | Kahn |
| 2016/0287358 A1 | 10/2016 | Nowak et al. |
| 2016/0296303 A1 | 10/2016 | Parker |
| 2016/0302885 A1 | 10/2016 | Matov et al. |
| 2016/0328843 A1 | 11/2016 | Graham et al. |
| 2016/0338799 A1 | 11/2016 | Wu et al. |
| 2016/0346063 A1* | 12/2016 | Schulhof ............... A61C 7/002 |
| 2016/0367188 A1 | 12/2016 | Malik et al. |
| 2016/0367339 A1 | 12/2016 | Khardekar et al. |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0020633 A1 | 1/2017 | Stone-Collonge et al. |
| 2017/0049326 A1 | 2/2017 | Alfano et al. |
| 2017/0056131 A1 | 3/2017 | Alauddin et al. |

(56) References Cited

U.S. PATENT DOCUMENTS

| | | | |
|---|---|---|---|
| 2017/0071705 A1 | 3/2017 | Kuo | |
| 2017/0086943 A1 | 3/2017 | Mah | |
| 2017/0100209 A1 | 4/2017 | Wen | |
| 2017/0100212 A1 | 4/2017 | Sherwood et al. | |
| 2017/0100213 A1 | 4/2017 | Kuo | |
| 2017/0100214 A1 | 4/2017 | Wen | |
| 2017/0105815 A1 | 4/2017 | Matov et al. | |
| 2017/0135792 A1 | 5/2017 | Webber | |
| 2017/0135793 A1 | 5/2017 | Webber et al. | |
| 2017/0156821 A1 | 6/2017 | Kopelman et al. | |
| 2017/0158803 A1 | 6/2017 | Amin et al. | |
| 2017/0165032 A1 | 6/2017 | Webber et al. | |
| 2017/0215739 A1 | 8/2017 | Miyasato | |
| 2017/0265970 A1 | 9/2017 | Verker | |
| 2017/0319054 A1 | 11/2017 | Miller et al. | |
| 2017/0325690 A1 | 11/2017 | Salah et al. | |
| 2017/0340415 A1 | 11/2017 | Choi et al. | |
| 2018/0000563 A1 | 1/2018 | Shanjani et al. | |
| 2018/0000565 A1 | 1/2018 | Shanjani et al. | |
| 2018/0028064 A1 | 2/2018 | Elbaz et al. | |
| 2018/0028065 A1 | 2/2018 | Elbaz et al. | |
| 2018/0055602 A1 | 3/2018 | Kopelman et al. | |
| 2018/0071055 A1 | 3/2018 | Kuo | |
| 2018/0096465 A1 | 4/2018 | Levin | |
| 2018/0125610 A1 | 5/2018 | Carrier et al. | |
| 2018/0153648 A1 | 6/2018 | Shanjani et al. | |
| 2018/0153649 A1 | 6/2018 | Wu et al. | |
| 2018/0153733 A1 | 6/2018 | Kuo | |
| 2018/0168788 A1 | 6/2018 | Fernie | |
| 2018/0192877 A1 | 7/2018 | Atiya et al. | |
| 2018/0228359 A1 | 8/2018 | Meyer et al. | |
| 2018/0280118 A1 | 10/2018 | Cramer | |
| 2018/0284727 A1 | 10/2018 | Cramer et al. | |
| 2018/0318043 A1 | 11/2018 | Li et al. | |
| 2018/0353264 A1 | 12/2018 | Riley et al. | |
| 2018/0360567 A1 | 12/2018 | Xue et al. | |
| 2018/0368944 A1 | 12/2018 | Sato et al. | |
| 2018/0368961 A1 | 12/2018 | Shanjani et al. | |
| 2019/0019187 A1 | 1/2019 | Miller et al. | |
| 2019/0021817 A1 | 1/2019 | Sato et al. | |
| 2019/0029522 A1 | 1/2019 | Sato et al. | |
| 2019/0029784 A1 | 1/2019 | Moalem et al. | |
| 2019/0046296 A1 | 2/2019 | Kopelman et al. | |
| 2019/0046297 A1 | 2/2019 | Kopelman et al. | |
| 2019/0069975 A1 | 3/2019 | Cam et al. | |
| 2019/0076026 A1 | 3/2019 | Elbaz et al. | |
| 2019/0076214 A1 | 3/2019 | Nyukhtikov et al. | |
| 2019/0076216 A1 | 3/2019 | Moss et al. | |
| 2019/0090983 A1 | 3/2019 | Webber et al. | |
| 2019/0298494 A1 | 10/2019 | Webber et al. | |

FOREIGN PATENT DOCUMENTS

| | | |
|---|---|---|
| CA | 1121955 A1 | 4/1982 |
| CN | 1655732 A | 8/2005 |
| CN | 1655733 A | 8/2005 |
| CN | 1867317 A | 11/2006 |
| CN | 101991465 A | 3/2011 |
| CN | 102017658 A | 4/2011 |
| CN | 103889364 A | 6/2014 |
| CN | 104254297 A | 12/2014 |
| CN | 204092220 U | 1/2015 |
| CN | 105496575 A | 4/2016 |
| CN | 105997274 A | 10/2016 |
| DE | 2749802 A1 | 5/1978 |
| DE | 3526198 A1 | 2/1986 |
| DE | 4207169 A1 | 9/1993 |
| DE | 69327661 T2 | 7/2000 |
| DE | 102005043627 A1 | 3/2007 |
| DE | 202010017014 U1 | 3/2011 |
| DE | 102011051443 A1 | 1/2013 |
| DE | 202012011899 U1 | 1/2013 |
| DE | 102014106151 A1 | 11/2014 |
| DE | 102014225457 A1 | 6/2016 |
| EP | 0428152 A1 | 5/1991 |
| EP | 490848 A2 | 6/1992 |
| EP | 541500 A1 | 5/1993 |
| EP | 714632 B1 | 5/1997 |
| EP | 774933 B1 | 12/2000 |
| EP | 731673 B1 | 5/2001 |
| EP | 1941843 A2 | 7/2008 |
| EP | 2266494 A1 | 12/2010 |
| EP | 2437027 A2 | 4/2012 |
| EP | 2447754 A1 | 5/2012 |
| EP | 1989764 B1 | 7/2012 |
| EP | 2332221 B1 | 11/2012 |
| EP | 2596553 B1 | 12/2013 |
| EP | 2612300 B1 | 2/2015 |
| EP | 2848229 A1 | 3/2015 |
| ES | 463897 A1 | 1/1980 |
| ES | 2455066 A1 | 4/2014 |
| FR | 2369828 A1 | 6/1978 |
| FR | 2867377 A1 | 9/2005 |
| FR | 2930334 A1 | 10/2009 |
| GB | 1550777 A | 8/1979 |
| JP | 53-058191 A | 5/1978 |
| JP | 04-028359 A | 1/1992 |
| JP | 08-508174 A | 9/1996 |
| JP | 09-19443 A | 1/1997 |
| JP | 2003245289 A | 9/2003 |
| JP | 2000339468 A | 9/2004 |
| JP | 2005527320 A | 9/2005 |
| JP | 2005527321 A | 9/2005 |
| JP | 2006043121 A | 2/2006 |
| JP | 2007151614 A | 6/2007 |
| JP | 2007260158 A | 10/2007 |
| JP | 2007537824 A | 12/2007 |
| JP | 2008067732 A | 3/2008 |
| JP | 2008523370 A | 7/2008 |
| JP | 04184427 B1 | 11/2008 |
| JP | 2009000412 A | 1/2009 |
| JP | 2009018173 A | 1/2009 |
| JP | 2009078133 A | 4/2009 |
| JP | 2009101386 A | 5/2009 |
| JP | 2009205330 A | 9/2009 |
| JP | 2010017726 A | 1/2010 |
| JP | 2011087733 A | 5/2011 |
| JP | 2012045143 A | 3/2012 |
| JP | 2013007645 A | 1/2013 |
| JP | 2013192865 A | 9/2013 |
| JP | 201735173 A | 2/2017 |
| KR | 10-2002006279 A | 7/2002 |
| KR | 10-20090065778 A | 6/2009 |
| KR | 10-1266966 B1 | 5/2013 |
| KR | 10-2016-041632 A | 4/2016 |
| KR | 10-2016-0071127 A | 6/2016 |
| KR | 101675089 B1 | 11/2016 |
| TW | 480166 B | 3/2002 |
| WO | WO91/004713 A1 | 4/1991 |
| WO | WO92/03102 A1 | 3/1992 |
| WO | WO94/010935 A1 | 5/1994 |
| WO | WO96/23452 A1 | 8/1996 |
| WO | WO98/032394 A1 | 7/1998 |
| WO | WO98/044865 A1 | 10/1998 |
| WO | 0032132 A1 | 6/2000 |
| WO | WO01/08592 A1 | 2/2001 |
| WO | WO01/85047 A2 | 11/2001 |
| WO | 0224100 A1 | 3/2002 |
| WO | WO02/017776 A2 | 3/2002 |
| WO | 02058583 A1 | 8/2002 |
| WO | WO02/062252 A1 | 8/2002 |
| WO | WO02/095475 A1 | 11/2002 |
| WO | WO03/003932 A2 | 1/2003 |
| WO | 2005114183 A1 | 12/2005 |
| WO | WO2006/096558 A2 | 9/2006 |
| WO | WO2006/100700 A1 | 9/2006 |
| WO | WO2006/133548 A1 | 12/2006 |
| WO | WO2007/019709 A2 | 2/2007 |
| WO | WO2007/071341 A1 | 6/2007 |
| WO | WO2007/103377 A2 | 9/2007 |
| WO | WO2008/115654 A1 | 9/2008 |
| WO | WO2009/016645 A2 | 2/2009 |
| WO | WO2009/085752 A2 | 7/2009 |
| WO | WO2009/089129 A1 | 7/2009 |

(56) References Cited

FOREIGN PATENT DOCUMENTS

| WO | WO2009/146788 A1 | 12/2009 |
|---|---|---|
| WO | WO2009/146789 A1 | 12/2009 |
| WO | WO2010/059988 A1 | 5/2010 |
| WO | WO2010/123892 A2 | 10/2010 |
| WO | WO2012/007003 A1 | 1/2012 |
| WO | WO2012/064684 A2 | 5/2012 |
| WO | WO2012/074304 A2 | 6/2012 |
| WO | WO2012/078980 A2 | 6/2012 |
| WO | WO2012/083968 A1 | 6/2012 |
| WO | WO2012/140021 A2 | 10/2012 |
| WO | WO2013/058879 A2 | 4/2013 |
| WO | WO2014/068107 A1 | 5/2014 |
| WO | WO2014/091865 A1 | 6/2014 |
| WO | 2014143911 A1 | 9/2014 |
| WO | WO2015/015289 A2 | 2/2015 |
| WO | WO2015/063032 A1 | 5/2015 |
| WO | WO2015/112638 A1 | 7/2015 |
| WO | WO2015/176004 A1 | 11/2015 |
| WO | WO2016/004415 A1 | 1/2016 |
| WO | WO2016/042393 A1 | 3/2016 |
| WO | WO2016/061279 A1 | 4/2016 |
| WO | WO2016/084066 A1 | 6/2016 |
| WO | WO2016/099471 A1 | 6/2016 |
| WO | WO2016/113745 A1 | 7/2016 |
| WO | WO2016/116874 A1 | 7/2016 |
| WO | WO2016/200177 A1 | 12/2016 |
| WO | WO2017/006176 A1 | 1/2017 |
| WO | WO2018/057547 A1 | 3/2018 |
| WO | 2018232113 A1 | 12/2018 |

OTHER PUBLICATIONS

Berland; The use of smile libraries for cosmetic dentistry; Dental Tribunne: Asia pacfic Edition; pp. 16-18; Mar. 29, 2006.
Bookstein; Principal warps: Thin-plate splines and decomposition of deformations; IEEE Transactions on pattern analysis and machine intelligence; 11(6); pp. 567-585; Jun. 1989.
Cadent Inc.; OrthoCAD ABO user guide; 38 pages; Dec. 21, 2005.
Cadent Inc.; Reviewing and modifying an orthoCAD case; 4 pages; Feb. 14, 2005.
Daniels et al.; The development of the index of complexity outcome and need (ICON); British Journal of Orthodontics; 27(2); pp. 149-162; Jun. 2000.
Dentrix; Dentrix G3, new features; 2 pages; retrieved from the internet (http://www.dentrix.com/g3/new_features/index.asp); on Jun. 6, 2008.
Di Giacomo et al.; Clinical application of sterolithographic surgical guides for implant placement: Preliminary results; Journal Periodontolgy; 76(4); pp. 503-507; Apr. 2005.
Gansky; Dental data mining: potential pitfalls and practical issues; Advances in Dental Research; 17(1); pp. 109-114; Dec. 2003.
Geomagic; Dental reconstruction; 1 page; retrieved from the internet (http://geomagic.com/en/solutions/industry/detal_desc.php) on Jun. 6, 2008.
Gottschalk et al.; OBBTree: A hierarchical structure for rapid interference detection; 12 pages; (http://www.cs.unc.edu/?geom/OBB/OBBT.html); retieved from te internet (https://www.cse.iitk.ac.in/users/amit/courses/RMP/presentations/dslamba/presentation/sig96.pdf) on Apr. 25, 2019.
gpsdentaire.com; Get a realistic smile simulation in 4 steps with GPS; a smile management software; 10 pages; retrieved from the internet (http://www.gpsdentaire.com/en/preview/) on Jun. 6, 2008.
Karaman et al.; A practical method of fabricating a lingual retainer; Am. Journal of Orthodontic and Dentofacial Orthopedics; 124(3); pp. 327-330; Sep. 2003.
Mantzikos et al.; Case report: Forced eruption and implant site development; The Angle Orthodontist; 68(2); pp. 179-186; Apr. 1998.
Methot; Get the picture with a gps for smile design in 3 steps; Spectrum; 5(4); pp. 100-105; (year of pub. sufficiently earlier than effective US filing date and any foreign priority date) 2006.
OrthoCAD downloads; retrieved Jun. 27, 2012 from the internet (www.orthocad.com/download/downloads.asp); 2 pages; Feb. 14, 2005.
Page et al.; Validity and accuracy of a risk calculator in predicting periodontal disease; Journal of the American Dental Association; 133(5); pp. 569-576; May 2002.
Patterson Dental; Cosmetic imaging; 2 pages retrieved from the internet (http://patterson.eaglesoft.net/cnt_di_cosimg.html) on Jun. 6, 2008.
Rose et al.; The role of orthodontics in implant dentistry; British Dental Journal; 201(12); pp. 753-764; Dec. 23, 2006.
Rubin et al.; Stress analysis of the human tooth using a three-dimensional finite element model; Journal of Dental Research; 62(2); pp. 82-86; Feb. 1983.
Sarment et al.; Accuracy of implant placement with a sterolithographic surgical guide; journal of Oral and Maxillofacial Implants; 118(4); pp. 571-577; Jul. 2003.
Smalley; Implants for tooth movement: Determining implant location and orientation: Journal of Esthetic and Restorative Dentistry; 7(2); pp. 62-72; Mar. 1995.
Smart Technology; Smile library II; 1 page; retrieved from the internet (http://smart-technology.net/) on Jun. 6, 2008.
Smile-Vision_The smile-vision cosmetic imaging system; 2 pages; retrieved from the internet (http://www.smile-vision.net/cos_imaging.php) on Jun. 6, 2008.
Szeliski; Introduction to computer vision: Structure from motion; 64 pages; retrieved from the internet (http://robots.stanford.edu/cs223b05/notes/CS%20223-B%20L10%structurefrommotion1b.ppt, on Feb. 3, 2005.
Vevin et al.; Pose estimation of teeth through crown-shape matching; In Medical Imaging: Image Processing of International Society of Optics and Photonics; vol. 4684; pp. 955-965; May 9, 2002.
Video of DICOM to Surgical Guides; [Copy Not Enclosed], Can be viewed at <URL:https://youtu.be/47KtOmCEFQk; Published Apr. 4, 2016.
Virtual Orthodontics; Our innovative software; 2 pages; (http://www.virtualorthodontics.com/innovativesoftware.html); retrieved from the internet (https://web.archive.org/web/20070518085145/http://www.virtualorthodontics.com/innovativesoftware.html); (year of pub. sufficiently earlier than effective US filing date and any foreign priority date) 2005.
Wiedmann; According to the laws of harmony to find the right tooth shape with assistance of the computer; Digital Dental News; 2nd vol. pp. 0005-0008; (English Version Included); Apr. 2008.
Wong et al.; Computer-aided design/computer-aided manufacturing surgical guidance for placement of dental implants: Case report; Implant Dentistry; 16(2); pp. 123-130; Sep. 2007.
Wong et al.; The uses of orthodontic study models in diagnosis and treatment planning; Hong Knog Dental Journal; 3(2); pp. 107-115; Dec. 2006.
Yaltara Software; Visual planner; 1 page; retrieved from the internet (http://yaltara.com/vp/) on Jun. 6, 2008.
Zhang et al.; Visual speech features extraction for improved speech recognition; 2002 IEEE International conference on Acoustics, Speech and Signal Processing; vol. 2; 4 pages; May 13-17, 2002.
Culp; U.S. Appl. No. 16/236,220 entitled "Laser cutting," filed Dec. 28, 2018.
Culp; U.S. Appl. No. 16/265,287 entitled "Laser cutting," filed Feb. 1, 2019.
Arnone et al.; U.S. Appl. No. 16/235,449 entitled "Method and system for providing indexing and cataloguing of orthodontic related treatment profiles and options," filed Dec. 28, 2018.
Mason et al.; U.S. Appl. No. 16/374,648 entitled "Dental condition evaluation and treatment," filed Apr. 3, 2019.
Brandt et al.; U.S. Appl. No. 16/235,490 entitled "Dental wire attachment," filed Dec. 28, 2018.
Kou; U.S. Appl. No. 16/270,891 entitled "Personal data file," filed Feb. 8, 2019.
AADR. American Association for Dental Research; Summary of Activities; Los Angeles, CA; p. 195; Mar. 20-23,(year of pub. sufficiently earlier than effective US filed and any foreign priority date) 1980.

(56) References Cited

OTHER PUBLICATIONS

Alcaniz et aL; An Advanced System for the Simulation and Planning of Orthodontic Treatments; Karl Heinz Hohne and Ron Kikinis (eds.); Visualization in Biomedical Computing, 4th Intl. Conf, VBC '96, Hamburg, Germany; Springer-Verlag; pp. 511-520; Sep. 22-25, 1996.

Alexander et al.; The DigiGraph Work Station Part 2 Clinical Management; J. Clin. Orthod.; pp. 402-407; (Author Manuscript); Jul. 1990.

Align Technology; Align technology announces new teen solution with introduction of invisalign teen with mandibular advancement; 2 pages; retrieved from the internet (http://investor.aligntech.com/static-files/eb4fa6bb-3e62-404f-b74d-32059366a01b); Mar. 6, 2017.

Allesee Orthodontic Appliance: Important Tip About Wearing the Red White & Blue Active Clear Retainer System; Allesee Orthodontic Appliances-Pro Lab; 1 page; (year of pub. sufficiently earlier than effective US filing date and any foreign priority date); 1998.

Allesee Orthodontic Appliances: DuraClearTM; Product information; 1 page; (year of pub. sufficiently earlier than effective US filing date and any foreign priority date) 1997.

Allesee Orthodontic Appliances; The Choice Is Clear: Red, White & Blue . . . The Simple, Affordable, No-Braces Treatment; ( product information for doctors); retrieved from the internet (http://ormco.com/aoa/appliancesservices/RWB/doctorhtml); 5 pages on May 19, 2003.

Allesee Orthodontic Appliances; The Choice is Clear: Red, White & Blue . . . The Simple, Affordable, No-Braces Treatment; (product information), 6 pages; (year of pub. sufficiently earlier than effective US filing date and any foreign priority date) 2003.

Allesee Orthodontic Appliances; The Choice is Clear: Red, White & Blue . . . The Simple, Affordable, No-Braces Treatment;(Patient Information); retrieved from the internet (http://ormco.com/aoa/appliancesservices/RWB/patients.html); 2 pages on May 19, 2003.

Allesee Orthodontic Appliances; The Red, White & Blue Way to Improve Your Smile; (information for patients), 2 pages; (year of pub. sufficiently earlier than effective US filing date and any foreign priority date) 1992.

Allesee Orthodontic Appliances; You may be a candidate for this invisible no-braces treatment; product information for patients; 2 pages; (year of pub. sufficiently earlier than effective US filing date and any foreign priority date) 2002.

Altschuler et al.; Analysis of 3-D Data for Comparative 3-D Serial Growth Pattern Studies of Oral-Facial Structures; AADR Abstracts, Program and Abstracts of Papers, 57th General Session, IADR Annual Session, Mar. 29, 1979-Apr. 1, 1979, New Orleans Marriot; Journal of Dental Research; vol. 58, Special Issue A, p. 221; Jan. 1979.

Altschuler et al.; Laser Electro-Optic System for Rapid Three-Dimensional (3D) Topographic Mapping of Surfaces; Optical Engineering; 20(6); pp. 953-961; Dec. 1981.

Altschuler et al.; Measuring Surfaces Space-Coded by a Laser-Projected Dot Matrix; SPIE Imaging q Applications for Automated Industrial Inspection and Assembly; vol. 182; pp. 187-191; Oct. 10, 1979.

Altschuler; 3D Mapping of Maxillo-Facial Prosthesis; AADR Abstract #607; 2 pages total, (year of pub. sufficiently earlier than effective US filing date and any foreign priority date) 1980.

Andersson et al.; Clinical Results with Titanium Crowns Fabricated with Machine Duplication and Spark Erosion; Acta Odontologica Scandinavica; 47(5); pp. 279-286; Oct. 1989.

Andrews, The Six Keys to Optimal Occlusion Straight Wire, Chapter 3, L.A. Wells; pp. 13-24; (year of pub. sufficiently earlier than effective US filing date and any foreign priority date) 1989.

Bandodkar et al.; Self-healing inks for autonomous repair of printable electrochemical devices; Advanced Electronic Materials; 1(12); 5 pages; 1500289; Dec. 2015.

Barone et al.; Creation of 3D multi-body orthodontic models by using independent imaging sensors; Sensors; 13(2); pp. 2033-2050; Feb. 5, 2013.

Bartels et al.; An Introduction to Splines for Use in Computer Graphics and Geometric Modeling; Morgan Kaufmann Publishers; pp. 422-425 Jan. 1, 1987.

Baumrind et al, "Mapping the Skull in 3-D," reprinted from J. Calif. Dent. Assoc, 48(2), 11 pages; (year of pub. sufficiently earlier than effective US filing date and any foreign priority date) Fall Issue 1972.

Baumrind et al.; A Stereophotogrammetric System for the Detection of Prosthesis Loosening in Total Hip Arthroplasty; NATO Symposium on Applications of Human Biostereometrics; SPIE; vol. 166; pp. 112-123; Jul. 9-13, 1978.

Baumrind; A System for Cranio facial Mapping Through the Integration of Data from Stereo X-Ray Films and Stereo Photographs; an invited paper submitted to the 1975 American Society of Photogram Symposium on Close-Range Photogram Systems; University of Illinois; pp. 142-166; Aug. 26-30, 1975.

Baumrind; Integrated Three-Dimensional Craniofacial Mapping: Background, Principles, and Perspectives; Seminars in Orthodontics; 7(4); pp. 223-232; Dec. 2001.

Begole et al.; A Computer System for the Analysis of Dental Casts; The Angle Orthodontist; 51(3); pp. 252-258; Jul. 1981.

Bernard et al; Computerized Diagnosis in Orthodontics for Epidemiological Studies: a ProgressReport; (Abstract Only), J. Dental Res. Special Issue, vol. 67, p. 169, paper presented at International Association for Dental Research 66th General Session, Montreal Canada; Mar. 9-13, 1988.

Bhatia et al.; A Computer-Aided Design for Orthognathic Surgery; British Journal of Oral and Maxillofacial Surgery; 22(4); pp. 237-253; Aug. 1, 1984.

Biggerstaff et al.; Computerized Analysis of Occlusion in the Postcanine Dentition; American Journal of Orthodontics; 61(3); pp. 245-254; Mar. 1972.

Biggerstaff; Computerized Diagnostic Setups and Simulations; Angle Orthodontist; 40(1); pp. 28-36; Jan. 1970.

Biostar Operation & Training Manual. Great Lakes Orthodontics, Ltd. 199 Fire Tower Drive,Tonawanda, New York. 14150-5890, 20 pages; (year of pub. sufficiently earlier than effective US filing date and any foreign priority date) 1990.

Blu et al.; Linear interpolation revitalized; IEEE Transactions on Image Processing; 13(5); pp. 710-719; May 2004.

Bourke, Coordinate System Transformation; 1 page; retrived from the internet (http://astronomy.swin.edu.au/' pbourke/prolection/coords) on Nov. 5, 2004; Jun. 1996.

Boyd et al.; Three Dimensional Diagnosis and Orthodontic Treatment of Complex Malocclusions With the Invisalipn Appliance; Seminars in Orthodontics; 7(4); pp. 274-293; Dec. 2001.

Brandestini et al.; Computer Machined Ceramic Inlays: In Vitro Marginal Adaptation; J. Dent. Res. Special Issue; (Abstract 305); vol. 64; p. 208; (year of pub. sufficiently earlier than effective US filing date and any foreign priority date) 1985.

Brook et al.; An Image Analysis System for the Determination of Tooth Dimensions from Study Casts: Comparison with Manual Measurements of Mesio-distal Diameter; Journal of Dental Research; 65(3); pp. 428-431; Mar. 1986.

Burstone et al.; Precision Adjustment of the Transpalatal Lingual Arch: Computer Arch Form Predetermination; American Journal of Orthodontics; 79(2);pp. 115-133; Feb. 1981.

Burstone; Dr. Charles J. Burstone on the Uses of the Computer in Orthodontic Practice (Part 1); Journal of Clinical Orthodontics; 13(7); pp. 442-453; (interview); Jul. 1979.

Burstone; Dr. Charles J. Burstone on the Uses of the Computer in Orthodontic Practice (Part 2); journal of Clinical Orthodontics; 13(8); pp. 539-551 (interview); Aug. 1979.

Cardinal Industrial Finishes; Powder Coatings; 6 pages; retrieved from the internet (http://www.cardinalpaint.com) on Aug. 25, 2000.

Carnaghan, An Alternative to Holograms for the Portrayal of Human Teeth; 4th Int'l Conf. on Holographic Systems, Components and Applications; pp. 228-231; Sep. 15, 1993.

Chaconas et al,; The DigiGraph Work Station, Part 1, Basic Concepts; Journal of Clinical Orthodontics; 24(6); pp. 360-367; (Author Manuscript); Jun. 1990.

(56) References Cited

OTHER PUBLICATIONS

Chafetz et al.; Subsidence of the Femoral Prosthesis, A Stereophotogrammetric Evaluation; Clinical Orthopaedics and Related Research; No. 201; pp. 60-67; Dec. 1985.

Chiappone; Constructing the Gnathologic Setup and Positioner; Journal of Clinical Orthodontics; 14(2); pp. 121-133; Feb. 1980.

Chishti et al.; U.S. Appl. No. 60/050,342 entitled "Procedure for moving teeth using a seires of retainers," filed Jun. 20, 1997.

CSI Computerized Scanning and Imaging Facility; What is a maximum/minimum intensity projection (MIP/MinIP); 1 page; retrived from the internet (http://csi.whoi.edu/content/what-maximumminimum-intensity-projection-mipminip); Jan. 4, 2010.

Cottingham; Gnathologic Clear Plastic Positioner; American Journal of Orthodontics; 55(1); pp. 23-31; Jan. 1969.

Crawford; CAD/CAM in the Dental Office: Does It Work?; Canadian Dental Journal; 57(2); pp. 121-123 Feb. 1991.

Crawford; Computers in Dentistry: Part 1: CAD/CAM: The Computer Moves Chairside, Part 2: F. Duret A Man With A Vision, Part 3: The Computer Gives New Vision—Literally, Part 4: Bytes 'N Bites The Computer Moves From the Front Desk to the Operatory; Canadian Dental Journal; 54(9); pp. 661-666 Sep. 1988.

Crooks; CAD/CAM Comes to USC; USC Dentistry; pp. 14-17; (year of pub. sufficiently earlier than effective US filing date and any foreign priority date) Spring 1990.

Cureton; Correcting Malaligned Mandibular Incisors with Removable Retainers; Journal of Clinical Orthodontics; 30(7); pp. 390-395; Jul. 1996.

Curry et al.; Integrated Three-Dimensional Craniofacial Mapping at the Craniofacial Research InstrumentationLaboratory/University of the Pacific; Seminars in Orthodontics; 7(4); pp. 258-265; Dec. 2001.

Cutting et al.; Three-Dimensional Computer-Assisted Design of Craniofacial Surgical Procedures: Optimization and Interaction with Cephalometric and CT-Based Models; Plastic and Reconstructive Surgery; 77(6); pp. 877-885; Jun. 1986.

DCS Dental AG; The CAD/CAM 'DCS Titan System' for Production of Crowns/Bridges; DSC Production; pp. 1-7; Jan. 1992.

Defranco et al.; Three-Dimensional Large Displacement Analysis of Orthodontic Appliances; Journal of Biomechanics; 9(12); pp. 793-801; Jan. 1976.

Dental Institute University of Zurich Switzerland; Program for International Symposium on Computer Restorations: State of the Art of the CEREC-Method; 2 pages; May 1991.

Dentrac Corporation; Dentrac document; pp. 4-13; (year of pub. sufficiently earlier than effective US filing date and any foreign priority date) 1992.

Dent-X; Dentsim . . . Dent-x's virtual reality 3-D training simulator . . . A revolution in dental education; 6 pages; retrieved from the internet (http://www.dent-x.com/DentSim.htm); on Sep. 24, 1998.

Di Muzio et al.; Minimum intensity projection (MinIP); 6 pages; retrieved from the internet (https://radiopaedia.orgiarticles/minimum-intensity-projection-minip) on Sep. 6, 2018.

Doruk et al.; The role of the headgear timer in extraoral co-operation; European Journal of Orthodontics; 26; pp. 289-291; Jun. 1, 2004.

Doyle; Digital Dentistry; Computer Graphics World; pp. 50-52 andp. 54; Oct. 2000.

Dummer et al.; Computed Radiography Imaging Based on High-Density 670 nm VCSEL Arrays; International Society for Optics and Photonics; vol. 7557; p. 75570H; 7 pages; (Author Manuscript); Feb. 24, 2010.

Duret et al.; CAD/CAM Imaging in Dentistry; Current Opinion in Dentistry; 1 (2); pp. 150-154; Apr. 1991.

Duret et al; CAD-CAM in Dentistry; Journal of the American Dental Association; 117(6); pp. 715-720; Nov. 1988.

Duret; The Dental CAD/CAM, General Description of the Project; Hennson International Product Brochure, 18 pages; Jan. 1986.

Duret; Vers Une Prosthese Informatisee; Tonus; 75(15); pp. 55-57; (English translation attached); 23 pages; Nov. 15, 1985.

Economides; The Microcomputer in the Orthodontic Office; Journal of Clinical Orthodontics; 13(11); pp. 767-772; Nov. 1979.

Ellias et al.; Proteomic analysis of saliva identifies potential biomarkers for orthodontic tooth movement; The Scientific World Journal; vol. 2012; Article ID 647240; dio:10.1100/2012/647240; 7 pages; Jul. 2012.

Elsasser; Some Observations on the History and Uses of the Kesling Positioner; American Journal of Orthodontics; 36(5); pp. 368-374; May 1, 1950.

English translation of Japanese Laid-Open Publication No. 63-11148 to inventor T. Ozukuri (Laid-Open on Jan. 18, 1998) pp. 1-7.

Faber et al.; Computerized Interactive Orthodontic Treatment Planning; American Journal of Orthodontics; 73(1); pp. 36-46; Jan. 1978.

Farooq et al.; Relationship between tooth dimensions and malocclusion; JPMA: The Journal of the Pakistan Medical Association; 64(6); pp. 670-674; Jun. 2014.

Felton et al.; A Computerized Analysis of the Shape and Stability of Mandibular Arch Form; American Journal of Orthodontics and Dentofacial Orthopedics; 92(6); pp. 478-483; Dec. 1987.

Florez-Moreno; Time-related changes in salivary levels of the osteotropic factors sRANKL and OPG through orthodontic tooth movement; American Journal of Orthodontics and Dentofacial Orthopedics; 143(1); pp. 92-100; Jan. 2013.

Friede et al.; Accuracy of Cephalometric Prediction in Orthognathic Surgery; Journal of Oral and Maxillofacial Surgery; 45(9); pp. 754-760; Sep. 1987.

Friedrich et al; Measuring system for in vivo recording of force systems in orthodontic treatment-concept and analysis of accuracy; J. Biomech.; 32(1); pp. 81-85; (Abstract Only) Jan. 1999.

Futterling et al., Automated Finite Element Modeling of a Human Mandible with Dental Implants; JS WSCG '98 -Conference Program; 8 pages; retrieved from the Internet (https://dspace5.zcu.cz/bitstream/11025/15851/1/Strasser_98.pdf); on Aug. 21, 2018.

Gao et al.; 3-D element Generation for Multi-Connected Complex Dental and Mandibular Structure; IEEE Proceedings International Workshop in Medical Imaging and Augmented Reality; pp. 267-271; Jun. 12, 2001.

Gim-Alldent Deutschland, "Das DUX System: Die Technik," 3 pages; (English Translation Included); (year of pub. sufficiently earlier than effective US filing date and any foreign priority date); 2002.

Gottleib et al.; JCO Interviews Dr. James A. McNamura, Jr., on the Frankel Appliance: Part 2: Clinical 1-1 Management; Journal of Clinical Orthodontics; 16(6); pp. 390-407; retrieved from the internet (http://www.jco-online.com/archive/print_article.asp?Year=1982&Month=06&ArticleNum+); 21 pages; Jun. 1982.

Grayson; New Methods for Three Dimensional Analysis of Craniofacial Deformity, Symposium: Computerized Facial Imaging in Oral and Maxillofacial Surgery; American Association of Oral and Maxillofacial Surgeons; 48(8) suppl 1; pp. 5-6; Sep. 13, 1990.

Grest, Daniel; Marker-Free Human Motion Capture in Dynamic Cluttered Environments from a Single View-Point, PhD Thesis; 171 pages; Dec. 2007.

Guess et al.; Computer Treatment Estimates in Orthodontics and Orthognathic Surgery; Journal of Clinical Orthodontics; 23(4); pp. 262- 268; 11 pages; (Author Manuscript); Apr. 1989.

Heaven et al.; Computer-Based Image Analysis of Artificial Root Surface Caries; Abstracts of Papers #2094; Journal of Dental Research; 70:528; (Abstract Only); Apr. 17-21, 1991.

Highbeam Research; Simulating stress put on jaw. (ANSYS Inc.'s finite element analysis software); 2 pages; retrieved from the Internet (http://static.highbeam.eom/t/toolingampproduction/november011996/simulatingstressputonfa . . . ); on Nov. 5, 2004.

Hikage; Integrated Orthodontic Management System for Virtual Three-Dimensional Computer Graphic Simulation and Optical Video Image Database for Diagnosis and Treatment Planning; Journal of Japan KA Orthodontic Society; 46(2); pp. 248-269; 56 pages; (English Translation Included); Feb. 1987.

Hoffmann et al.; Role of Cephalometry for Planning of Jaw Orthopedics and Jaw Surgery Procedures; Informatbnen, pp. 375-396; (English Abstract Included); Mar. 1991.

(56) References Cited

OTHER PUBLICATIONS

Hojjatie et al.; Three-Dimensional Finite Element Analysis of Glass-Ceramic Dental Crowns; Journal of Biomechanics; 23(11); pp. 1157-1166; Jan. 1990.

Huckins; CAD-CAM Generated Mandibular Model Prototype from MRI Data; AAOMS, p. 96; (Abstract Only); (year of pub. sufficiently earlier than effective US filing date and any foreign priority date) 1999.

Invisalign; You were made to move. There's never been a better time to straighten your teeth with the most advanced clear aligner in the world'; Product webpage; 2 pages; retrieved from the internet (www.invisalign.com/) on Dec. 28, 2017.

Jia et al.; Epidermal biofuel cells: energy harvesting from human perspiration; Angewandle Chemie International Edition; 52(28); pp. 7233-7236; Jul. 8, 2013.

Jia et al.; Wearable textile biofuel cells for powering electronics; Journal of Materials Chemistry a; 2(43); pp. 18184-18189; Oct. 14, 2014.

JCO Interviews; Craig Andreiko, DDS, MS on the Elan and Orthos Systems; Interview by Dr. Larry W. White; Journal of Clinical Orthodontics; 28(8); pp. 459-468; 14 pages; (Author Manuscript); Aug. 1994.

JCO Interviews; Dr. Homer W. Phillips on Computers in Orthodontic Practice, Part 2; Journal of Clinical Orthodontics; 17(12); pp. 819-831; 19 pages; (Author Manuscript); Dec. 1983.

Jerrold; The Problem, Electronic Data Transmission and the Law; American Journal of Orthodontics and Dentofacial Orthopedics; 113(4); pp. 478-479; 5 pages; (Author Manuscript); Apr. 1998.

Jones et al.; An Assessment of the Fit of a Parabolic Curve to Pre- and Post-Treatment Dental Arches; British Journal of Orthodontics; 16(2); pp. 85-93; May 1989.

Kamada et.al.; Case Reports on Tooth Positioners Using LTV Vinyl Silicone Rubber; J. Nihon University School of Dentistry; 26(1); pp. 11-29; (year of pub. sufficiently earlier than effective US filing date and any foreign priority date) 1984.

Kamada et.al.; Construction of Tooth Positioners with LTV Vinyl Silicone Rubber and Some Case KJ Reports; J. Nihon University School of Dentistry; 24(1); pp. 1-27; (year of pub. sufficiently earlier than effective US filing date and any foreign priority date) 1982.

Kanazawa et al.; Three-Dimensional Measurements of the Occlusal Surfaces of Upper Molars in a Dutch Population; Journal of Dental Research; 63(11); pp. 1298-1301; Nov. 1984.

Kesling et al.; the Philosophy of the Tooth Positioning Appliance; American Journal of Orthodontics and Oral surgery; 31(6); pp. 297-304; Jun. 1945.

Kesling; Coordinating the Predetermined Pattern and Tooth Positioner with Conventional Treatment; American Journal of Orthodontics and Oral Surgery; 32(5); pp. 285-293; May 1946.

Kim et al.; Non-invasive mouthguard biosensor for continuous salivary monitoring of metabolites; Analyst; 139(7); pp. 1632-1636; Apr. 7, 2014.

Kim et al.; Wearable salivary uric acid mouthguard biosensor with integrated wireless electronics; Biosensors and Bioelectronics; 74; pp. 1061-1068; 19 pp.; (Author Manuscript); Dec. 2015.

Kleeman et al.; The Speed Positioner; J. Clin. Orthod.; 30(12); pp. 673-680; Dec. 1996.

Kochanek; Interpolating Splines with Local Tension, Continuity and Bias Control; Computer Graphics; 18(3); pp. 33-41; Jan. 1, 1984.

Kumar et al.; Biomarkers in orthodontic tooth movement; Journal of Pharmacy Bioallied Sciences; 7(Suppl 2); pp. S325-S330; 12 pages; (Author Manuscript); Aug. 2015.

Kumar et al.; Rapid maxillary expansion: A unique treatment modality in dentistry; J. Clin. Diagn. Res.; 5(4); pp. 906-911; Aug. 2011.

Kunii et al.; Articulation Simulation for an Intelligent Dental Care System; Displays; 15(3); pp. 181-188; Jul. 1994.

Kuroda et al.; Three-Dimensional Dental Cast Analyzing System Using Laser Scanning; American Journal of Orthodontics and Dentofacial Orthopedics; 110(4); pp. 365-369; Oct. 1996.

Laurendeau et al.; A Computer-Vision Technique for the Acquisition and Processing of 3-D Profiles of 7 Dental Imprints: An Application in Orthodontics; IEEE Transactions on Medical Imaging; 10(3); pp. 453-461; Sep. 1991.

Leinfelder et al.; A New Method for Generating Ceramic Restorations: a CAD-CAM System; Journal of the American Dental Association; 118(6); pp. 703-707; Jun. 1989.

Manetti et al.; Computer-Aided Cefalometry and New Mechanics in Orthodontics; Fortschr Kieferorthop; 44; pp. 370-376; 8 pages; (English Article Summary Included); (year of pub. sufficiently earlier than effective US filing date and any foreign priority date) 1983.

McCann; Inside the ADA; J. Amer. Dent. Assoc, 118:286-294; Mar. 1989.

McNamara et al.; Invisible Retainers; J. Clin Orthod.; pp. 570-578; 11 pages; (Author Manuscript); Aug. 1985.

McNamara et al.; Orthodontic and Orthopedic Treatment in the Mixed Dentition; Needham Press; pp. 347-353; Jan. 1993.

Moermann et al, Computer Machined Adhesive Porcelain Inlays: Margin Adaptation after Fatigue Stress; IADR Abstract 339; J. Dent. Res.; 66(a):763; (Abstract Only); (year of pub. sufficiently earlier than effective US filing date and any foreign priority date) 1987.

Moles; Correcting Mild Malalignments—As Easy As One, Two, Three; AOA/Pro Corner; 11(2); 2 pages; (year of pub. sufficiently earlier than effective US filing date and any foreign priority date) 2002.

Mormann et al.; Marginale Adaptation von adhasuven Porzellaninlays in vitro; Separatdruck aus:Schweiz. Mschr. Zahnmed.; 95; pp. 1118-1129; 8 pages; (Machine Translated English Abstract); (year of pub. sufficiently earlier than effective US filing date and any foreign priority date); 1985.

Nahoum; The Vacuum Formed Dental Contour Appliance; N. Y. State Dent. J.; 30(9); pp. 385-390; Nov. 1964.

Nash; Cerec CAD/CAM Inlays: Aesthetics and Durability in a Single Appointment; Dentistry Today; 9(8); pp. 20, 22-23 and 54; Oct. 1990.

Nedelcu et al.; "Scanning Accuracy and Precision in 4 Intraoral Scanners: An In Vitro Comparison Based on 3-Dimensional Analysis"; J. Prosthet. Dent.; 112(6); pp. 1461-1471; Dec. 2014.

Newcombe; DTAM: Dense tracking and mapping in real-time; 8 pages; retrieved from the internet (http://www.doc.ic.ac.uk/?ajd/Publications/newcombe_etal_iccv2011.pdf; on Dec. 2011.

Nishiyama et al.; A New Construction of Tooth Repositioner by LTV Vinyl Silicone Rubber; The Journal of Nihon University School of Dentistry; 19(2); pp. 93-102 (year of pub. sufficiently earlier than effective US filing date and any foreign priority date) 1977.

Ogawa et al.; Mapping, profiling and clustering of pressure pain threshold (PPT) in edentulous oral muscosa; Journal of Dentistry; 32(3); pp. 219-228; Mar. 2004.

Ogimoto et al.; Pressure-pain threshold determination in the oral mucosa; Journal of Oral Rehabilitation; 29(7); pp. 620-626; Jul. 2002.

ormco.com; Increasing clinical performance with 3D interactive treatment planning and patient-specific appliances; 8 pages; retrieved from the internet (http://www.konsident.com/wp-content/files_mf/1295385693http___ormco.com_index_cmsfilesystemaction_fileOrmcoPDF_whitepapers.pdf) on Feb 27, 2019.

Paul et al.; Digital Documentation of Individual Human Jaw and Tooth Forms for Applications in Orthodontics; Oral Surgery and Forensic Medicine Proc. of the 24th Annual Conf. of the IEEE Industrial Electronics Society (IECON '98); vol. 4; pp. 2415-2418; Sep. 4, 1998.

Pinkham; Foolish Concept Propels Technology; Dentist, 3 pages, Jan./Feb. 1989.

Pinkham; Inventor's CAD/CAM May Transform Dentistry; Dentist; pp. 1 and 35, Sep. 1990.

Ponitz; Invisible retainers; Am. J. Orthod.; 59(3); pp. 266-272; Mar. 1971.

Procera Research Projects; Procera Research Projects 1993 ' Abstract Collection; 23 pages; (year of pub. sufficiently earlier than effective US filing date and any foreign priority date) 1993.

(56) References Cited

OTHER PUBLICATIONS

Proffit et al.; The first stage of comprehensive treatment alignment and leveling; Contemporary Orthodontics, 3rd Ed.; Chapter 16; Mosby Inc.; pp. 534-537; (year of pub. sufficiently earlier than effective US filing date and any foreign priority date) 2000.
Proffit et al.; The first stage of comprehensive treatment: alignment and leveling; Contemporary Orthodontics; (Second Ed.); Chapter 15, MosbyYear Book; St. Louis, Missouri; pp. 470-533 Oct. 1993.
Raintree Essix & ARS Materials, Inc., Raintree Essix, Technical Magazine Table of contents and Essix Appliances, 7 pages; retrieved from the internet (http://www.essix.com/magazine/defaulthtml) on Aug. 13, 1997.
Redmond et al.; Clinical Implications of Digital Orthodontics; American Journal of Orthodontics and Dentofacial Orthopedics; 117(2); pp. 240-242; Feb. 2000.
Rekow et al.; CAD/CAM for Dental Restorations—Some of the Curious Challenges; IEEE Transactions on Biomedical Engineering; 38(4); pp. 314-318; Apr. 1991.
Rekow et al.; Comparison of Three Data Acquisition Techniques for 3-D Tooth Surface Mapping; Annual International Conference of the IEEE Engineering in Medicine and Biology Society; 13(1); pp. 344-345 (year of pub. sufficiently earlier than effective US filing date and any foreign priority date) 1991.
Rekow; A Review of the Developments in Dental CAD/CAM Systems; Current Opinion in Dentistry; 2; pp. 25-33; Jun. 1992.
Rekow; CAD/CAM in Dentistry: A Historical Perspective and View of the Future; Journal Canadian Dental Association; 58(4); pp. 283, 287-288; Apr. 1992.
Rekow; Computer-Aided Design and Manufacturing in Dentistry: A Review of the State of the Art; Journal of Prosthetic Dentistry; 58(4); pp. 512-516; Dec. 1987.
Rekow; Dental CAD-CAM Systems: What is the State of the Art?; The Journal of the American Dental Association; 122(12); pp. 43-48; Dec. 1991.
Rekow; Feasibility of an Automated System for Production of Dental Restorations, Ph.D. Thesis; Univ. of Minnesota, 250 pages, Nov. 1988.
Richmond et al.; The Development of the PAR Index (Peer Assessment Rating): Reliability and Validity.; The European Journal of Orthodontics; 14(2); pp. 125-139; Apr. 1992.
Richmond et al.; The Development of a 3D Cast Analysis System; British Journal of Orthodontics; 13(1); pp. 53-54; Jan. 1986.
Richmond; Recording the Dental Cast in Three Dimensions; American Journal of Orthodontics and Dentofacial Orthopedics; 92(3); pp. 199-206; Sep. 1987.
Rudge; Dental Arch Analysis: Arch Form, A Review of the Literature; The European Journal of Orthodontics; 3(4); pp. 279-284; Jan. 1981.
Sahm et al.; "Micro-Electronic Monitoring of Functional Appliance Wear"; Eur J Orthod.; 12(3); pp. 297-301; Aug. 1990.
Sahm; Presentation of a wear timer for the clarification of scientific questions in orthodontic orthopedics; Fortschritte der Kieferorthopadie; 51 (4); pp. 243-247; (Translation Included) Jul. 1990.
Sakuda et al.; Integrated Information-Processing System in Clinical Orthodontics: an Approach with Use of a Computer Network System; American Journal of Orthodontics and Dentofacial Orthopedics; 101(3); pp. 210-220; 20 pages; (Author Manuscript) Mar. 1992.
Schafer et al.; "Quantifying patient adherence during active orthodontic treatment with removable appliances using microelectronic wear-time documentation"; Eur J Orthod.; 37(1)pp. 1-8; doi:10.1093/ejo/cju012; Jul. 3, 2014.
Schellhas et al.; Three-Dimensional Computed Tomography in Maxillofacial Surgical Planning; Archives of Otolaryngology—Head and Neck Surgery; 114(4); pp. 438-442; Apr. 1988.
Schroeder et al; Eds. The Visual Toolkit, Prentice Hall PTR, New Jersey; Chapters 6, 8 & 9, (pp. 153-210,309-354, and 355-428; (year of pub. sufficiently earlier than effective US filing date and any foreign priority date) 1998.
Shilliday; Minimizing finishing problems with the mini-positioner; American Journal of Orthodontics; 59(6); pp. 596-599; Jun. 1971.
Shimada et al.; Application of optical coherence tomography (OCT) for diagnosis of caries, cracks, and defects of restorations; Current Oral Health Reports; 2(2); pp. 73-80; Jun. 2015.
Siemens; CEREC—Computer-Reconstruction, High Tech in der Zahnmedizin; 15 pages; (Includes Machine Translation); (year of pub. sufficiently earlier than effective US filing date and any foreign priority date); 2004.
Sinclair; The Readers' Corner; Journal of Clinical Orthodontics; 26(6); pp. 369-372; 5 pages; retrived from the internet (http://www.jco-online.com/archive/print_article.asp?Year=1992&Month=06&ArticleNum=); Jun. 1992.
Sirona Dental Systems GmbH, CEREC 3D, Manuel utiiisateur, Version 2.0X (in French); 114 pages; (English translation of table of contents included); (year of pub. sufficiently earlier than effective US filing date and any foreign priority date); 2003.
Stoll et al.; Computer-aided Technologies in Dentistry; Dtsch Zahna'rztl Z 45, pp. 314-322; (English Abstract Included); (year of pub. sufficiently earlier than effective US filing date and any foreign priority date) 1990.
Sturman; Interactive Keyframe Animation of 3-D Articulated Models; Proceedings Graphics Interface '84; vol. 86; pp. 35-40; May-Jun. 1984.
The American Heritage, Stedman's Medical Dictionary; Gingiva; 3 pages; retrieved from the interent (http://reference.com/search/search?q=gingiva) on Nov. 5, 2004.
The Dental Company Sirona: Cerc omnicam and cerec bluecam brochure: The first choice in every case; 8 pages; (year of pub. sufficiently earlier than effective US filing date and any foreign priority date) 2014.
Thera Mon; "Microsensor"; 2 pages; retrieved from the internet (www.english.thera-mon.com/the-product/transponder/index.html); on Sep. 19, 2016.
Thorlabs; Pellin broca prisms; 1 page; retrieved from the internet (www.thorlabs.com); Nov. 30, 2012.
Tiziani et al.; Confocal principle for macro and microscopic surface and defect analysis; Optical Engineering; 39(1); pp. 32-39; Jan. 1, 2000.
Truax; Truax Clasp-Less(TM) Appliance System; The Functional Orthodontist; 9(5); pp. 22-24, 26-8; Sep.-Oct. 1992.
TRU-TATN Orthodontic & Dental Supplies, Product Brochure, Rochester, Minnesota 55902, 16 pages; (year of pub. sufficiently earlier than effective US filing date and any foreign priority date) 1996.
U.S. Department of Commerce, National Technical Information Service, Holodontography: An Introduction to Dental Laser Holography; School of Aerospace Medicine Brooks AFB Tex; Mar. 1973, 40 pages; Mar. 1973.
U.S. Department of Commerce, National Technical Information Service; Automated Crown Replication Using Solid Photography SM; Solid Photography Inc., Melville NY,; 20 pages; Oct. 1977.
Vadapalli; Minimum intensity projection (MinIP) is a data visualization; 7 pages; retrieved from the internet (https://prezi.com/tdmttnmv2knw/minimum-intensity-projection-minip-is-a-data-visualization/) on Sep. 6, 2018.
Van Der Linden et al.; Three-Dimensional Analysis of Dental Casts by Means of the Optocom; Journal of Dental Research; 51(4); p. 1100; Jul.-Aug. 1972.
Van Der Linden; A New Method to Determine Tooth Positions and Dental Arch Dimensions; Journal of Dental Research; 51(4); p. 1104; Jul.-Aug. 1972.
Van Der Zel; Ceramic-Fused-to-Metal Restorations with a New CAD/CAM System; Quintessence International; 24(a); pp. 769-778; (year of pub. sufficiently earlier than effective US filing date and any foreign priority date); 1993.
Van Hilsen et al.; Comparing potential early caries assessment methods for teledentistry; BMC Oral Health; 13(16); doi: 10.1186/1472-6831-13-16; 9 pages; Mar. 2013.
Varady et al.; Reverse Engineering of Geometric Models'An Introduction; Computer-Aided Design; 29(4); pp. 255-268; 20 pages; (Author Manuscript); Apr. 1997.

(56) References Cited

OTHER PUBLICATIONS

Verstreken et al.; An Image-Guided Planning System for Endosseous Oral Implants; IEEE Transactions on Medical Imaging; 17(5); pp. 842-852; Oct. 1998.
Warunek et al.; Physical and Mechanical Properties of Elastomers in Orthodonic Positioners; American Journal of Orthodontics and Dentofacial Orthopedics; 95(5); pp. 388-400; 21 pages; (Author Manuscript); May 1989.
Warunek et.al.; Clinical Use of Silicone Elastomer Applicances; JCO; 23 (10); pp. 694-700; Oct. 1989.
Watson et al.; Pressures recorded at to denture base-mucosal surface interface in complete denture wearers; Journal of Oral Rehabilitation 14(6); pp. 575-589; Nov. 1987.
Wells; Application of the Positioner Appliance in Orthodontic Treatment; American Journal of Orthodontics; 58(4); pp. 351-366; Oct. 1970.
Wikipedia; Palatal expansion; 3 pages; retrieved from the internet (https://en.wikipedia.org/wiki/Palatal_expansion) on Mar. 5, 2018.
Williams; Dentistry and CAD/CAM: Another French Revolution; J. Dent. Practice Admin.; 4(1); pp. 2-5 Jan./Mar. 1987.
Williams; The Switzerland and Minnesota Developments in CAD/CAM; Journal of Dental Practice Administration; 4(2); pp. 50-55; Apr./Jun. 1987.
Windmiller et al.; Wearable electrochemical sensors and biosensors: a review; Electroanalysis; 25(1); pp. 29-46; Jan. 2013.
Wireless Sensor Networks Magazine; Embedded Teeth for Oral Activity Recognition; 2 pages; retrieved on Sep. 19, 2016 from the internet (www.wsnmagazine.com/embedded-teeth/); Jul. 29, 2013.
Wishan; New Advances in Personal Computer Applications for Cephalometric Analysis, Growth Prediction, Surgical Treatment Planning and Imaging Processing; Symposium: Computerized Facial Imaging in Oral and Maxilofacial Surgery; p. 5; Presented on Sep. 13, 1990.
Witt et al.; The wear-timing measuring device in orthodontics-cui bono? Reflections on the state-of-the-art in wear-timing measurement and compliance research in orthodontics; Fortschr Kieferorthop.; 52(3); pp. 117-125; (Translation Included) Jun. 1991.
Wolf; Three-dimensional structure determination of semi-transparent objects from holographic data; Optics Communications; 1(4); pp. 153-156; Sep. 1969.
WSCG'98—Conference Program, The Sixth International Conference in Central Europe on Computer Graphics and Visualization '98; pp. 1-7; retrieved from the Internet on Nov. 5, 2004, (http://wscg.zcu.cz/wscg98/wscg98.htm); Feb. 9-13, 1998.
Xia et al.; Three-Dimensional Virtual-Reality Surgical Planning and Soft-Tissue Prediction for Orthognathic Surgery; IEEE Transactions on Information Technology in Biomedicine; 5(2); pp. 97-107; Jun. 2001.
Yamada et al.; Simulation of fan-beam type optical computed-tomography imaging of strongly scattering and weakly absorbing media; Applied Optics; 32(25); pp. 4808-4814; Sep. 1, 1993.
Yamamoto et al.; Optical Measurement of Dental Cast Profile and Application to Analysis of Three-Dimensional Tooth Movement in Orthodontics; Front. Med. Biol. Eng., 1(2); pp. 119-130; (year of pub. sufficiently earlier than effective US filing date and any foreign priority date); 1988.
Yamamoto et al.; Three-Dimensional Measurement of Dental Cast Profiles and Its Applications to Orthodontics; Conf. Proc. IEEE Eng. Med. Biol. Soc.; 12(5); pp. 2052-2053; Nov. 1990.
Yamany et al.; A System for Human Jaw Modeling Using Intra-Oral Images; Proc. of the 20th Annual Conf. of the IEEE Engineering in Medicine and Biology Society; vol. 2; pp. 563-566; Oct. 1998.
Yoshii; Research on a New Orthodontic Appliance: The Dynamic Positioner (D.P.); 111. The General Concept of the D.P. Method and Its Therapeutic Effect, Part 1, Dental and Functional Reversed Occlusion Case Reports; Nippon Dental Review; 457; pp. 146-164; 43 pages; (Author Manuscript); Nov. 1980.
Yoshii; Research on a New Orthodontic Appliance: The Dynamic Positioner (D.P.); I. The D.P. Concept and Implementation of Transparent Silicone Resin (Orthocon); Nippon Dental Review; 452; pp. 61-74; 32 pages; (Author Manuscript); Jun. 1980.
Yoshii; Research on a New Orthodontic Appliance: The Dynamic Positioner (D.P.); II. The D.P. Manufacturing Procedure and Clinical Applications; Nippon Dental Review; 454; pp. 107-130; 48 pages; (Author Manuscript); Aug. 1980.
Yoshii; Research on a New Orthodontic Appliance: The Dynamic Positioner (D.P.); III—The General Concept of the D.P. Method and Its Therapeutic Effect, Part 2. Skeletal Reversed Occlusion Case Reports; Nippon Dental Review; 458; pp. 112-129; 40 pages; (Author Manuscript); Dec. 1980.
Zhou et al.; Bio-logic analysis of injury biomarker patterns in human serum samples; Talanta; 83(3); pp. 955-959; Jan. 15, 2011.
Zhou et al.; Biofuel cells for self-powered electrochemical biosensing and logic biosensing: A review; Electroanalysis; 24(2); pp. 197-209; Feb. 2012.
Grove et al.; U.S. Appl. No. 15/726,243 entitled "Interproximal reduction templates," filed Oct. 5, 2017.
Kopelman et al.; U.S. Appl. No. 16/152,281 entitled "Intraoral appliances for sampling soft-tissue," filed Oct. 4, 2018.
Morton et al.; U.S. Appl. No. 16/177,067 entitled "Dental appliance having selective occlusal loading and controlled intercuspation," filed Oct. 31, 2018.
Akopov et al.; U.S. Appl. No. 16/178,491 entitled "Automatic treatment planning," filed Nov. 1, 2018.
Elbaz et al.; U.S. Appl. No. 16/198,488 entitled "Intraoral scanner with dental diagnostics capabilities," filed Nov. 21, 2018.
O'Leary et al.; U.S. Appl. No. 16/195,701 entitled "Orthodontic retainers," filed Nov. 19, 2018.
Shanjani et al., U.S. Appl. No. 16/206,894 entitled "Sensors for monitoring oral appliances," filed Nov. 28, 2019.
Shanjani et al., U.S. Appl. No. 16/231,906 entitled "Augmented reality enhancements for dental practitioners." Dec. 24, 2018.
Kopleman et al., U.S. Appl. No. 16/220,381 entitled "Closed loop adaptive orthodontic treatment methods and apparatuses," filed Dec. 14, 2018.
Sabina et al., U.S. Appl. No. 16/258,516 entitled "Diagnostic intraoral scanning" filed Jan. 25, 2019.
Sabina et al., U.S. Appl. No. 16/258,523 entitled "Diagnostic intraoral tracking" filed Jan. 25, 2019.
Sabina et al., U.S. Appl. No. 16/258,527 entitled "Diagnostic intraoral methods and apparatuses" filed Jan. 25, 2019.
Li et al.; U.S. Appl. No. 16/171,159 entitled "Alternative bite adjustment structures," filed Oct. 25, 2018.
Dentalwings; Intraoral scanner; 7 pages; retrieved from the internet (https://web.archive.org/web/20160422114335/http://www.dentalwings.com/products/intraoral-scanner/); available as of Apr. 4, 2016.
Dentalwings; I series dental impression scanner; 8 pages; retrieved from the Internet (https://web.archive.org/web/20160502145908/http://www.dentalwings.com/products/scan-and-design-systems/iseries/) ; available as of May 2, 2016.
Bernabe et al.; Are the iower incisors the best predictors for the unerupted canine and premolars sums? An analysis of peruvian sample; The Angle Orthodontist; 75(2); pp. 202-207, Mar. 2005.
Collins English Dictionary; Teeth (definition); 9 pages; retrieved from the Internet (https:www.collinsdictionary.com/us/dictionary/english/teeth) on May 13, 2019.
dictionary.com; Plural (definition); 6 pages; retrieved from the internet (https://www.dictionary.com/browse/plural#) on May 13, 2019.
dictionary.com; Quadrant (definition); 6 pages; retrieved from the internet ( https://www.dictionary.com/browse/quadrant?s=t) on May 13, 2019.
Martinelli et al.; Prediction of lower permanent canine and premolars width by correlation methods; The Angle Orthodontist; 75(5); pp. 805-808; Sep. 2005.
Nourallah et al.; New regression equations for prediciting the size of unerupted canines and premolars in a contemporary population; The Angle Orthodontist; 72(3); pp. 216-221; Jun. 2002.
Paredes et al.; A new, accurate and fast digital method to predict unerupted tooth size; The Angle Orthodontist; 76(1); pp. 14-19; Jan. 2006.

(56) References Cited

OTHER PUBLICATIONS

Dental Monitoring, "Basics: How to put your Cheek Retractor? (Dental Monitoring Tutorial)", https://www.youtube.com/watch?v=6K1HXw4Kq3c, May 27, 2016.

Dental Monitoring, Dental monitoring tutdrial, 1 page (Screenshot), retrieved from the internet (https:www.youtube.com/watch?v=Dbe3udOf9_c), Mar. 18, 2015.

Eclinger Selfie, Change your smile, 1 page (screenshot), retrieved from the internet https://play.google.com/store/apps/details?id=parkelict.ecligner), on Feb. 13, 2018.

Lawrence, H.P., "Salivary Markers of Systemic Disease: Noninvasive Diagnosis of Disease and Monitorning of General Health," Journal of the Canadian Dental Association Clinical Parctice, vol. 68, No. 3, Mar. 2002, pp. 170-174.

Nishanian et al., "Oral Fluids as an Alternative to Serum for Measurement of Markers of Immune Activation," Clinical and Diagnostic Laboratory Immunology, Jul. 1998, vol. 5, No. 4, pp. 507-512.

SVEC et al.; "Molded rigid monolithic porous polymers: an inexpensive, efficient, and versatile alternative to beads for design of materials for numerous applications", Industrial and Engineering Chemistry Research; Jan. 4, 1999, vol. 38(1); pp. 34-48.

U.S. Food and Drug Administration; Color additives; 3 pages; retrieved from the internet https://websrchive.org/web/20070502213911/http://www.cfsan.fda.gov/-dms/col-toc.html; last known as May 2, 2007.

\* cited by examiner

DENTAL ATTACHMENT PLACEMENT STRUCTURE

CROSS-REFERENCE TO RELATED APPLICATIONS

This application is a continuation-in-part of U.S. patent application Ser. No. 14/963,527, filed on Dec. 9, 2015, the entire contents of which are hereby incorporated by reference.

BACKGROUND

The present disclosure provides methods, computing device readable medium, devices, and systems that utilize dental attachment placement structures prior to or during dental treatment. Dental treatments involve restorative and/or orthodontic procedures to improve the quality of life of a patient.

For example, restorative procedures may be designed to implant a dental prosthesis (e.g., a crown, bridge, inlay, onlay, veneer, etc.) intraorally in a patient. Orthodontic procedures may include repositioning misaligned teeth and/or changing bite configurations for improved cosmetic appearance and/or dental function. Orthodontic repositioning can be accomplished, for example, by applying controlled forces to one or more teeth or a jaw of a patient over a period of time.

As an example, orthodontic repositioning may be provided through a dental process that uses positioning appliances for realigning teeth. Such appliances may utilize a shell of material having resilient properties, referred to as an "aligner," that generally conforms to a patient's teeth but is slightly out of alignment with a current tooth configuration.

Placement of such an appliance over the teeth may provide controlled forces in specific locations to gradually move the teeth into a new configuration. Repetition of this process with successive appliances in progressive configurations can move the teeth through a series of intermediate arrangements to a final desired arrangement. Appliances can also be used for other dental conditions, such as application of medications, appliances to help with sleep apnea, and other issues.

Attachments are affixed to the one or more teeth of the patient (typically with an adhesive material, such as an attachment composite material) or directly cured to the tooth. These attachments interact with surfaces on the appliance to impart forces on one or more teeth.

Such systems typically utilize a set of appliances that can be used serially such that, as the teeth move, a new appliance from the set can be implemented to further move the teeth without having to take a new impression of the patient's teeth at every increment of tooth movement in order to make each successive appliance. The same attachments may be utilized with successive appliances or attachments may be added, removed, or replaced with other attachment shapes that may impart different force characteristics than a previous appliance and attachment combination (i.e., appliance and one or more attachments).

Currently, attachments can be formed by hand by a treatment professional (e.g., a doctor or assistant). In this process, a treatment professional selects an attachment material to be used and inserts the material into a well, formed in a sheet of material, to the desired exterior shape of the attachment is provided to the treatment professional and the mixed attachment material is pushed into the well to form the attachment based on the shape of the well.

The attachment is then removed from the well and then put on a tooth and cured. The mixing of the attachment material and amount of attachment composite put into attachment wells on templates are uncontrolled, and therefore errors can occur.

The absolute position of the attachment on the tooth is also subject to user error. When this occurs, the mismatch between the position and/or orientation of the attachment in relation to a contact surface on the appliance, may make using the appliance difficult or impossible and/or make the appliance less effective (reduction of one or more forces being applied by the combination of the attachment and appliance) or provide an incorrect effect (location and/or orientation of the attachment provides different force characteristics than was intended).

Accordingly, the positioning, orientation, and securing of attachments is typically done by a treatment professional at a dentist or orthodontist's office. However, treatment professionals can make one or more errors when mixing, forming, positioning, orienting, or securing one or more of the attachments and as such, the appliance and attachment combination may not fit together correctly or impart the correct one or more forces.

DETAILED DESCRIPTION

Figure 1A:
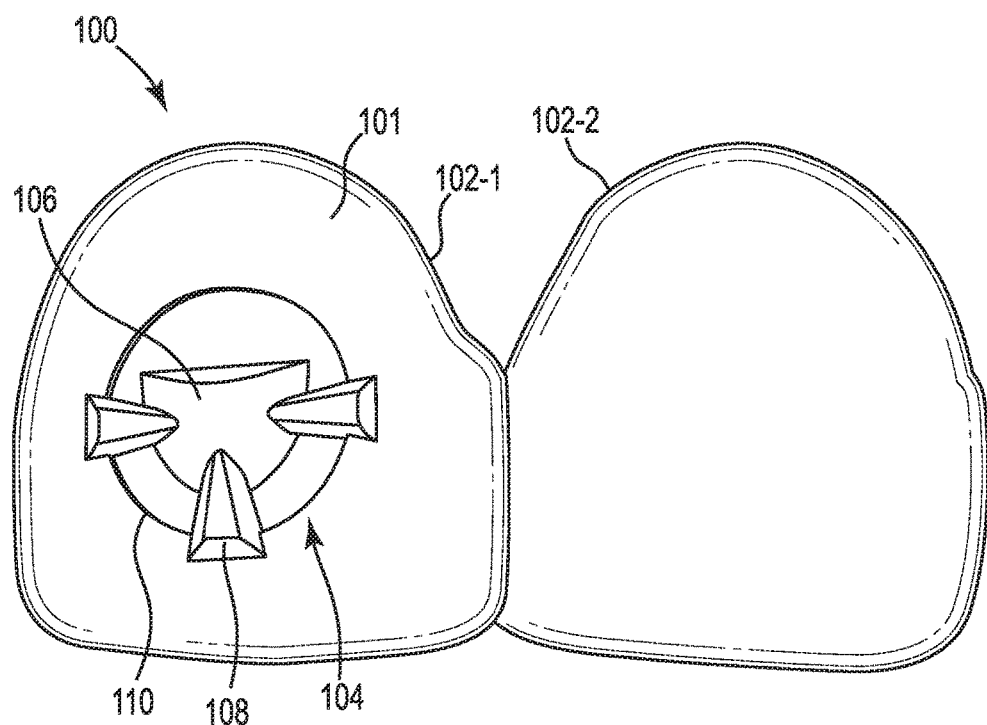
FIG. 1A illustrates a front view of a dental attachment placement structure for placement of an attachment according to a number of embodiments of the present disclosure.

The present disclosure provides methods, computing device readable medium, devices, and systems having a dental attachment placement structure. Such solutions should make mixing, forming, positioning, orienting, and securing attachments easier and quicker, and can make the patient's experience better than use of past procedures.

One dental attachment placement apparatus includes a body having an attachment placement surface that is to be placed on an attachment affixing surface of a tooth and wherein the attachment placement surface includes a portion that is shaped to allow placement of an attachment at a particular position on the affixing surface of the tooth and a portion of the body having a contour that is shaped to correspond with a contour of an alignment surface of a tooth and when the contour of the body and the corresponding contour is aligned, the attachment is located at the particular position and can be secured to the affixing surface of the tooth.

In the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, the designators "M", "N", "P", "R", "S", "T", and "V", particularly with respect to reference numerals in the drawings, indicate that any number of the particular feature so designated can be included. As used herein, "a number of" a particular thing can refer to one or more of such things (e.g., a number of teeth can refer to one or more teeth).

The figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1A, and a similar element may be referenced as 301 in FIG. 3A.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present disclosure, and should not be taken in a limiting sense.

FIG. 1A illustrates a front view of a dental attachment placement structure for placement of an attachment according to a number of embodiments of the present disclosure. In the embodiment of FIG. 1A, the apparatus 100 includes a body 101 having at least one surface shaped to conform to one or more of the contours of an exterior surface of a tooth. In the case of the embodiment of FIG. 1A, the body has multiple surfaces, (inner surfaces of portions 102-1 and 102-2), each shaped to conform to the multiple contours of an exterior surface of a tooth, and other surfaces will be discussed in more detail in FIG. 1B.

The body 101 also includes an attachment mounting structure 104 including the attachment 106, an aperture 110 to allow placement of the attachment 106 on the surface of a tooth, and a number of supports 108. The structure illustrated in FIG. 1A, allows the treatment professional to place the apparatus 100 onto the teeth of a patient to provide a more accurate position and orientation for the attachment 106, with respect to the tooth surface, during the securing of the attachment 106 to the surface of the tooth than previous techniques.

The securing of the attachment can be accomplished in any suitable manner. For example, the attachment can be cured to the tooth surface, for instance, by use of a light source, such as ultra-violet (UV) light source, which will bond the attachment material directly to the surface of the tooth. In some embodiments, an adhesive material can be applied to the back side of the attachment and the adhesive can be used to secure the attachment to the tooth surface.

In various embodiments, the apparatus can be designed to have one surface shaped to conform to one or more contours of an exterior surface of a tooth (e.g., a surface that conforms to a portion of the front surface of a tooth), such that when the two surfaces are aligned, their contours match, thereby indicating to the treatment professional that the apparatus has been placed correctly.

This correct placement can be with respect to the placement of the apparatus with respect to the tooth in one or more dimensions (e.g., up, down, right, left, rotationally, etc. with respect to the tooth surface upon which the attachment will be applied). If the apparatus is correctly placed, then the attachment will also be correctly placed with respect to the tooth surface.

As used herein, "positioning" is the locating of the attachment at a particular point on the surface of a tooth and "orienting" is the movement of the attachment in a manner that does not change its position on the surface of the tooth (e.g., a rotation of the attachment about an axis or movement of the attachment in one or more directions that does not change its position on the surface of the tooth). For example, an attachment can be positioned at a particular point on the surface of a tooth and then can be oriented by rotating it, for example, parallel to the tooth surface, or along an axis perpendicular to the surface of the tooth. Other angles of rotation can also be used to orient the attachment without changing the attachment's position.

Figure 1B:
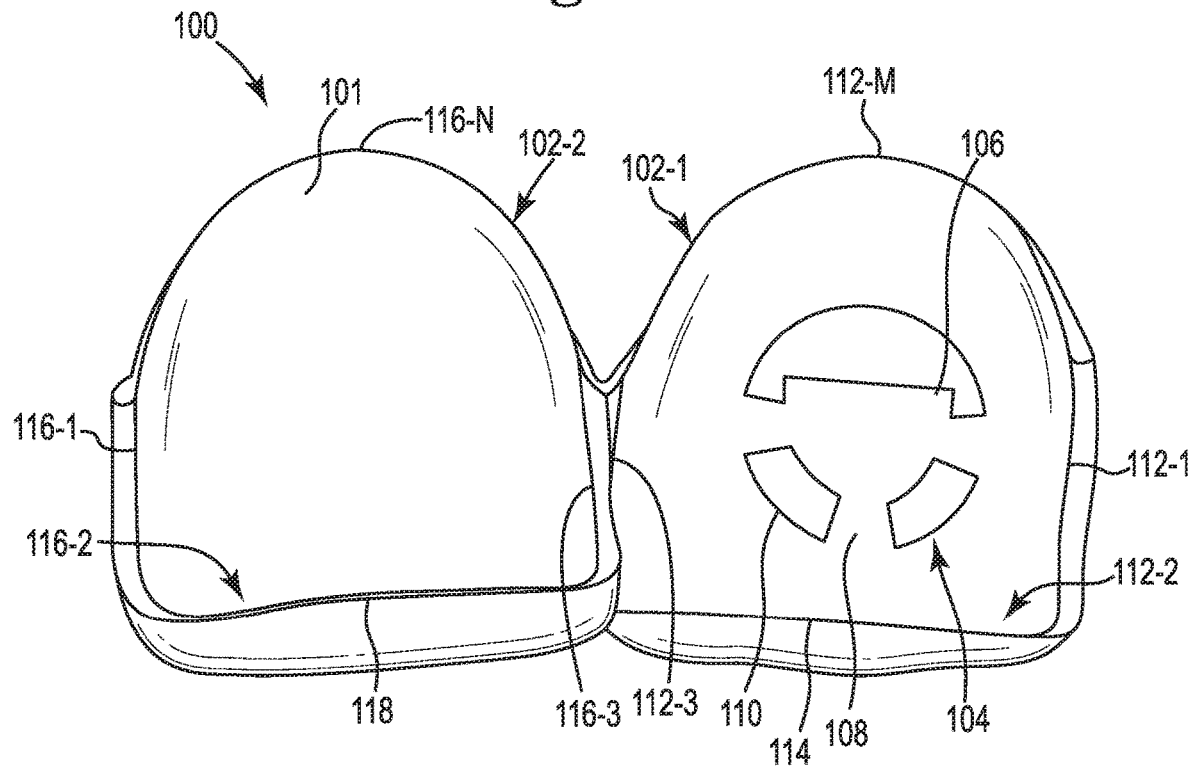
FIG. 1B illustrates a back view of the dental attachment placement structure of FIG. 1A.

In the embodiment of FIGS. 1A and 1B, the apparatus includes many surfaces that are shaped to conform to many contours of many exterior surfaces of multiple teeth (e.g., one or more contours of the front surface, side surfaces, edge surfaces, back surface, etc.).

Generally, the more surfaces used, the more accurate the positioning and/or orientation of the attachment, in relation to the tooth, can be to the desired correct placement. Also, when attaching multiple attachments, these surfaces can be used to accurately position and orient the attachments in relation to each other.

Once an attachment is placed on the tooth, it has to be secured to the tooth and the apparatus has to be removed. In some embodiments, such as that shown in FIGS. 1A and 1B, the apparatus can include one or more supports connecting the attachment to the body.

In such embodiments, the one or more supports can be made from a material that allows the support material 108 to be separated from the material of the attachment 106. For example, the support can be made from a material that can be broken at or near the location where the support and attachment are connected.

In some embodiments, the attachment between the support and the attachment can be released by a release agent, such as a chemical, heat, moisture, or other type of release agent. The release agent may, for example, dissolve a portion of the support and/or attachment in order to release the support and/or attachment from each other.

In various embodiments, the support and attachment can be fabricated from the same material, but the structure of the support can be such that it can be broken at a point to disconnect it from the attachment. Any suitable technique can be used to achieve the breaking or release of the support and/or attachment material in order to release the support from the attachment.

For example, the support structure may include a narrow section that is conducive to breaking at that location. In another embodiment, the support structure may include a scored section that is conducive to breaking at that location.

In various embodiments, the attachment can be mechanically mounted to the supports such that the attachment can be released from the supports once the attachment is secured to the surface of the tooth. This can be accomplished by any suitable releasable attachment structure. For example, one suitable structure is a groove located on each support and corresponding mating flanges on the attachment surface that can be slid out of the grooves to release the attachment from the supports.

FIG. 1B illustrates a back view of the dental attachment placement structure of FIG. 1A. In this view, the back side of the body 101 is shown including the back side of the attachment mounting structure 104 including the attachment 106 and supports 108, and the two inner surfaces of portions 102-1 and 102-2 of the body 101, each shaped to conform to the multiple contours of an exterior surface of a tooth are shown.

As used herein, a surface that is shaped to conform to a contour of an exterior surface of a tooth (i.e., an alignment surface) can be used to accurately position and/or orient the attachment on the tooth. For example, if surface of the apparatus is shaped to conform to a contour of the front surface of the tooth (e.g., surface 102-1 shown in FIG. 1A), then when the apparatus is pressed against the front surface of the tooth such that the contours of the tooth and the apparatus correspond to each other, the attachment will be correctly oriented with respect to the angle of the back side of the attachment to the surface of the tooth.

In the view shown in FIG. 1B, more surfaces shaped to conform to the multiple contours of an exterior surface of a tooth are shown than were visible in the view of FIG. 1A. As discussed above, if another surface is used, for example, a side surface 112-1, then the placement of the attachment can be more accurately accomplished with respect to its position and orientation.

For instance, when the side 112-1 is positioned along the corresponding side of the tooth such that their contours align, then the attachment should be the correct distance from the side of the tooth and will be correctly oriented with respect to the angle of the back side of the attachment to the surface of the tooth.

When more surfaces are utilized, the position and/or orientation of the attachment can be further precisioned. For example, the body 101 includes side surfaces 112-1, 112-3 of a first tooth, and side surfaces 116-1 and 116-3 of a second tooth. The body 101 also includes surfaces that are shaped to conform to the gingival line on a tooth 112-M and 116-N, and surfaces 112-2 and 116-2 that conform to the bottom edge of a tooth (and/or the bottom of the front and/or back side of the tooth).

Additionally, the embodiment of FIG. 1B includes a portion that conforms to the back side of the first tooth 114 and another portion that conforms to the back side of the second tooth 118. The use of such surfaces in conjunction with other surfaces can also allow for use of the corners of the teeth to be used to aid in positioning and/or orientation of an attachment. For example, the apparatus can be slid onto the tooth until the bottom edge of the tooth contacts the bottom edge 112-2 of the apparatus. When the front surface, the sides, corners, and bottom of the apparatus are aligned with their corresponding tooth surfaces, the attachment can be very precisely placed on its intended tooth surface.

Figure 1C:
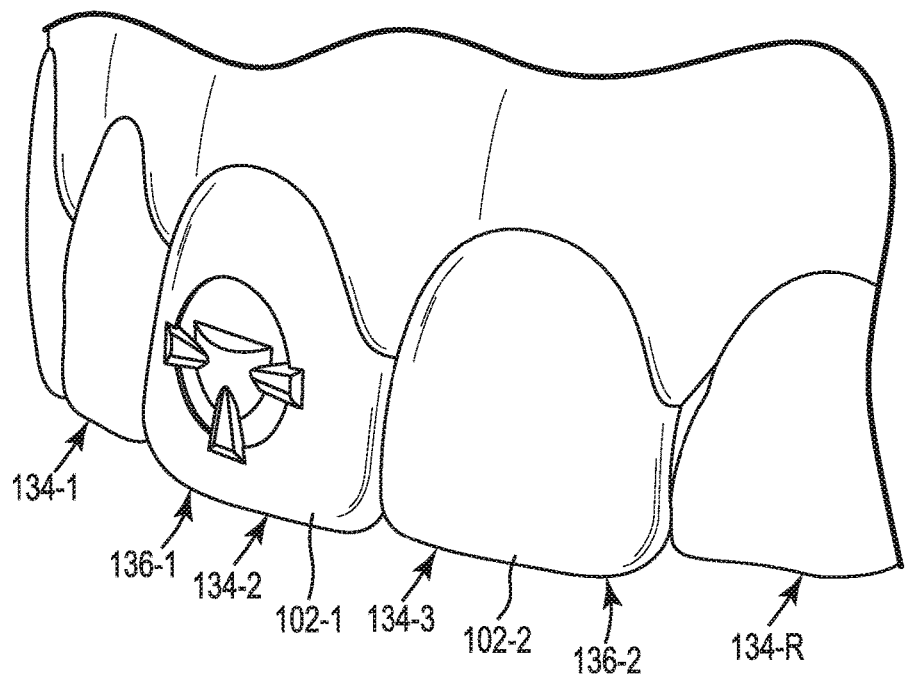
FIG. 1C illustrates a front view of the dental attachment placement structure of FIGS. 1A and 1B positioned on a tooth of a patient.

FIG. 1C illustrates a front view of the dental attachment placement structure of FIGS. 1A and 1B positioned on a tooth of a patient. In the view of FIG. 1C, several teeth and the gingiva of a patient are illustrated, including teeth 134-1, 134-2, 134-3, and 134-R. The apparatus 100 has been placed on the two of the teeth (134-2 and 134-3) such that the inner surfaces of portions 102-1 and 102-2 are placed in contact with tooth surfaces 136-1 and 136-2, respectively.

Figure 1D:
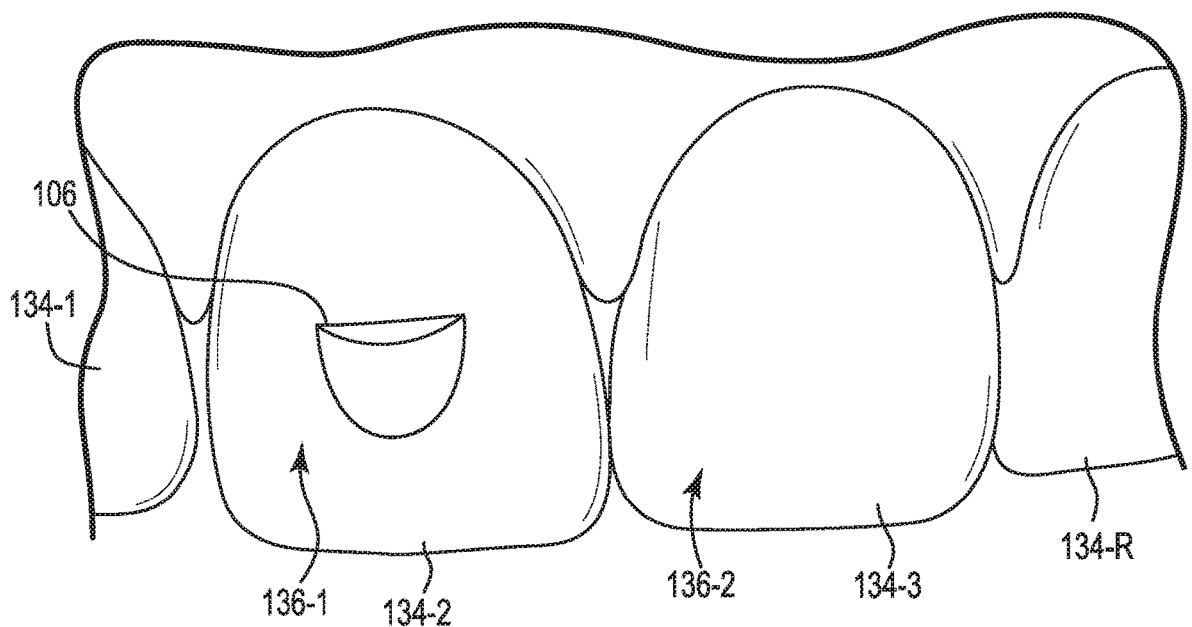
FIG. 1D illustrates a front view of a dental attachment attached to a tooth of a patient utilizing the dental attachment placement structure of FIGS. 1A and 1B.

FIG. 1D illustrates a front view of a dental attachment attached to a tooth of a patient utilizing the dental attachment placement structure of FIGS. 1A and 1B. The resultant placement has been accomplished via the attachment mounting structure illustrated in FIGS. 1A and 1B.

In this manner, the attachment 106 has been correctly positioned on the surface 136-1 of tooth 134-2 and oriented such that it can provide the desired force to the teeth of the patient (e.g., 134-1, 134-2, 134-3, 134-R, and/or other teeth of the patient) when combined with the dental appliance that will attach to the attachment.

In some embodiments, such as that shown in FIGS. 1A-1C, the attachment and/or the dental attachment placement structure, can be fabricated through direct fabrication, such as via a three-dimensional (3D) printer). This can be beneficial as the treatment profession can print these components at their location rather than at a manufacturing facility. Further, these components do not need to be formed around a mold of teeth when direct printed, this can save in manufacturing costs due to less time, materials, and employee time in creating such models and removing the components from the models.

Direct fabrication also allows for the design to be more easily and readily changed because the design can be altered via a computing device and direct printed from the modified design stored in memory on the computing device or a connected network or memory. Further, direct fabrication allows for creation of components of different material without substantial changes to equipment that may be used at a manufacturing facility, among other benefits.

For example, a dental attachment placement apparatus can be formed by printing, using a three-dimensional printing apparatus, an attachment, out of an attachment material and printing, using a three-dimensional printing apparatus, a dental attachment placement structure, connected to the attachment to hold the attachment in a particular position. In some embodiments, the dental attachment placement structure and the attachment can be fabricated from the same material. Material, examples include: polymers such as, polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, or a combination thereof, which can be used to make dental appliances, such as aligners, or curable composite (e.g., a resin material) that can be used to attach orthodontic appliances to teeth or create orthodontic structures.

In some embodiments, the dental attachment placement structure can be fabricated out of a second material that is different than the attachment material. For example, the attachment can be fabricated from a composite material and the dental attachment placement structure can be fabricated from a polymer, such as those discussed above. In some embodiments, the attachment and dental attachment placement structure can be constructed such that they are connected to each other. As discussed herein, this connection can be designed to be cut, broken, or otherwise released to allow the dental attachment placement structure to be removed while the attachment is positioned on the tooth.

As discussed herein, one other benefit to direct fabrication is that one or more surfaces that will be used to attach the attachment to a tooth and/or to position an attachment with respect to one or more teeth can be fabricated with surfaces that will mate with the corresponding surface of the one or more teeth to accomplish these functionalities (attachment and/or positioning of the attachment). This can be accomplished by virtual design of these surfaces and then using these virtual designs to fabricate the attachment and/or the dental attachment placement structure directly.

Figure 2:
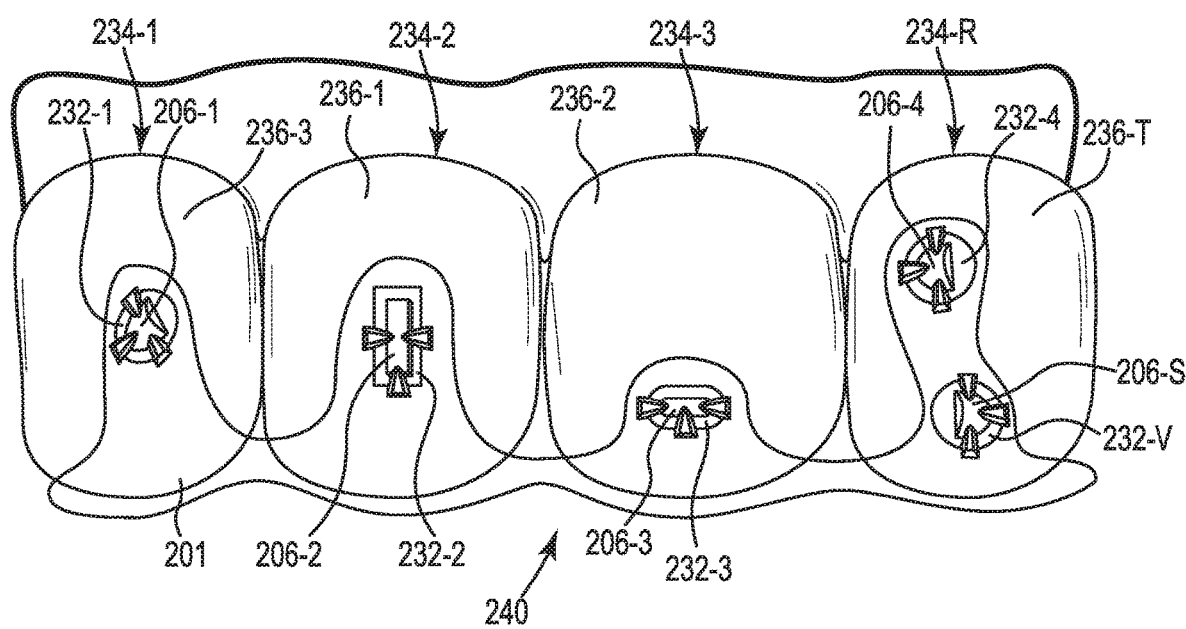
FIG. 2 illustrates a front view of a dental attachment placement structure having multiple attachment placement components provided on the structure according to a number of embodiments of the present disclosure.

FIG. 2 illustrates a front view of a dental attachment placement structure having multiple attachment placement components provided on the structure according to a number of embodiments of the present disclosure. In the embodiment of FIG. 2, the body 201 of apparatus 240 has an attachment mounting structure has an aperture 232-1 with an attachment 206-1 placed in the aperture. Through use of the apparatus 240, the attachment is in the desired position and orientation for securing to the surface 236-3 of tooth 234-1.

Attachments 206-2, 206-3, 206-4, and 206-S are also positioned in apertures 232-2, 232-3, 232-4, and 232-V on surface 236-1 of tooth 234-2, 236-2 of tooth 234-3, and 236-T of tooth 234-R. In such an embodiment, one or more of the teeth can have multiple attachments affixed thereon.

In order to save fabrication time and materials cost, the apparatus may include multiple attachment locations and only some may be used at any given time. In such applications, the apparatus 240 can, for example, be used to affix attachment 206-2 at one point in time and can be reused to attach 206-S at aperture 232-V or an attachment at one or more of the other locations on the apparatus (e.g., apertures 232-1, 232-2, and/or 232-3) at a different time.

Another feature of the embodiment of FIG. 2, is that in order to save fabrication time and materials cost, an apparatus with less material can be used. In such embodiments, the apparatus can be designed such that a reduced amount or minimized amount of material is used in order to properly position the attachment at a desired location.

Further, in prior concepts, treatment professionals may only have had access to a few, standardized attachment shapes. In this manner, the options for treatment may have been restricted based on the limited forces that could be provided by the standardized attachments. If any other attachment shape was desired, the treatment professional could file or grind the attachment surfaces to change its shape, but a treatment plan would not take these modifications into account and therefore the actual result would be different than the treatment plan result. This resulted in additional time spent in getting the proper shape, misshapen attachments that did not fit or function correctly, and other issues.

Although embodiments of the present disclosure can be used to form such standardized attachments, since the apparatus can be fabricated to be used with a specific patient's teeth positioning, specialized attachments can also be designed and can be made available to a treatment professional.

Such specialization can also, for example, include the size of the attachment, shape of the attachment, and other suitable specialized characteristics. Accordingly, the patient will be able to get a more customized treatment based on use of such embodiments. This can allow the apparatus to be specialized to the patient, but not be onerous on the treatment professional who, for example, may not have attachment design skills or capabilities.

In some embodiments, the treatment professional may also select one or more attachment materials or attachment types and/or select the location upon which they should be applied. Such embodiments can allow further customization of the apparatus and can be taken into account when the manufacture of the attachment templates are created. Further, in various embodiments, this customization can be made for each appliance (or for multiple appliances) in a set of appliances of a treatment plan.

In some embodiments, a computing device (such as that described in relation to FIG. 10 below) can be used to create a treatment plan to move the teeth of a patient in an incremental manner to improve their position within the patient's mouth. Other dental appliances can be created to aid patients with sleep apnea or medication delivery, among other types of appliances.

A computing device can be used to create such devices or molds to fabricate such dental appliances, attachments, and/or attachment placement structures. In some embodiments, a computing device can be used to virtually model such dental appliances, attachments, and/or attachment placement structures.

For example, through use of a treatment plan and/or virtual modeling, a dental appliance (e.g., an aligner for aligning teeth or jaws of a patient) or attachment placement structure can be made, for example, by thermal-forming a sheet of plastic over a physical dental mold. The physical dental mold, for instance, can represent an incremental position to which a patient's teeth are to be moved and can include attachment shapes formed in the mold.

In this manner, one or more surfaces of the dental appliance can engage with one or more surfaces of the one or more attachments (when the finished dental appliance is placed in the patient's mouth with the actual attachments). By having the attachments on the mold, the dental appliance is formed with the surfaces that will interact with the attachments.

The physical dental mold can be manufactured, for example, by downloading a computer-aided design (CAD) virtual dental model to a rapid prototyping process, such as, for example, a computer-aided manufacturing (CAM) milling, stereolithography, and/or photolithography process.

The dental mold (e.g., set of molded teeth and/or jaw) can be created from a virtual model of a number of teeth and/or jaw of a patient. A virtual model, for example, can include an initial virtual dental model and/or intermediate virtual dental model (wherein the teeth of the patient have been moved with respect to their actual physical position). A dental mold can be formed in accordance with a unique treatment file that, for example, identifies a patient, a stage of a treatment plan, the virtual model of the number of teeth and/or jaw, and/or whether the dental mold is of the upper and/or lower dental arch.

In some computing device system processes, a treatment file can be accessed by a rapid prototyping apparatus machine or direct fabrication device, such as a SLA or 3D printing machine, to form and/or create the dental mold. As discussed above, the result of the dental mold can include a set of molded teeth.

The set of molded teeth can include at least a replica of a number of teeth of the patient, but can also include other features such as gingival and jaw structures, among others. The dental mold can be used to make a dental appliance, for example, by creating a negative impression of the dental mold using polymeric sheets of material and vacuum forming the sheets over the dental mold, as discussed above.

For instance, a dental appliance or attachment placement structure can be formed by layering a thermoformable sheet of material and/or multiple sheets of one or more materials over the dental mold. The materials can include a polymeric material, for instance.

Generally, the dental appliance or attachment placement structure is produced and/or formed by heating the polymeric thermoformable sheet and vacuum or pressure forming the sheet over the dental mold (e.g., a number of molded teeth). A dental appliance or attachment placement structure can, for example, include a negative impression of the dental mold. Such molding techniques can be used to create the dental appliances and attachment placement structures.

Figure 3A:
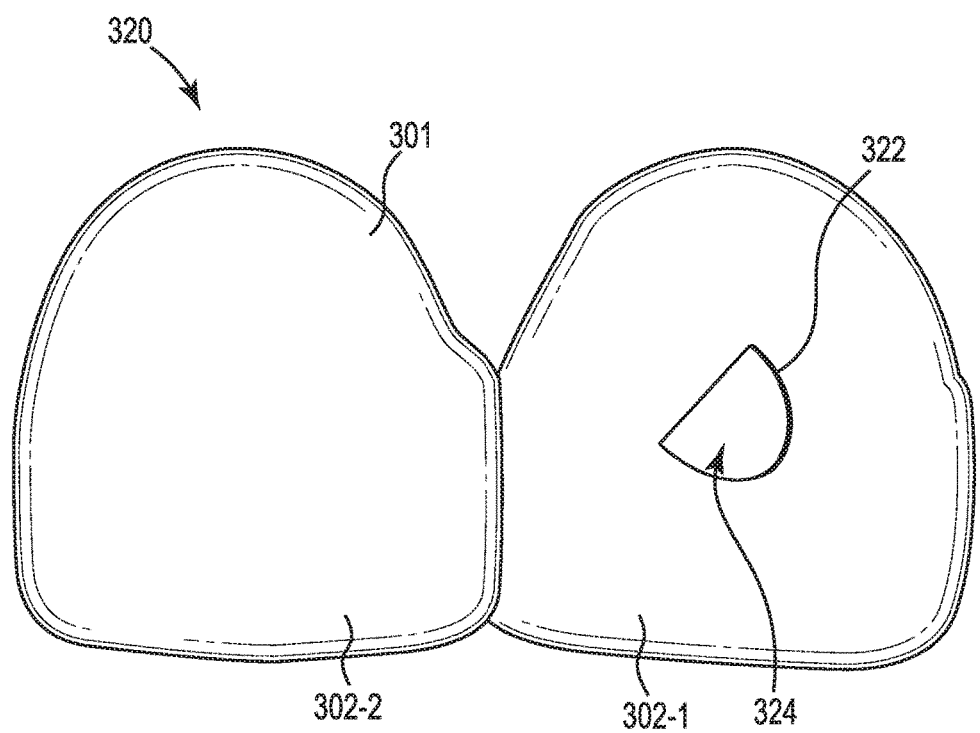
FIG. 3A illustrates a front view of a dental attachment placement structure for etching a tooth according to a number of embodiments of the present disclosure.
Figure 3B:
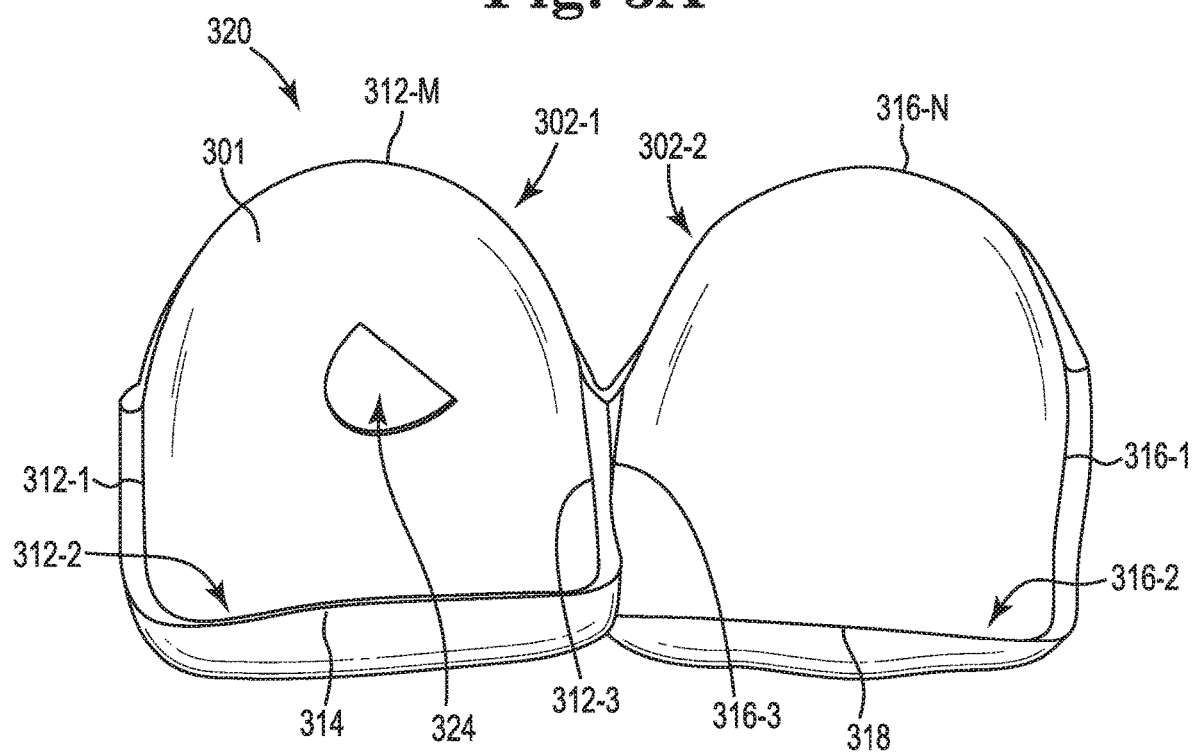
FIG. 3B illustrates a back view of the dental attachment placement structure of FIG. 3A.

FIGS. 3A and 3B illustrate another apparatus embodiment that can be used in the placement of an attachment on the surface of a tooth. FIG. 3A illustrates a front view of a dental attachment placement structure for etching a tooth according to a number of embodiments of the present disclosure. FIG. 3B illustrates a back view of the dental attachment placement structure of FIG. 3A.

In some instances, it may be beneficial to prepare the surface of the tooth for adhering of a dental attachment thereto. It is ideal if the preparation of the surface of the tooth takes place only at the area in which the attachment is to be attached.

Such preparation can include etching of the surface of the tooth which improves the adhesion between the tooth surface and the attachment or adhesive material used to adhere the attachment to the tooth. In embodiments such as that illustrated in FIGS. 3A, 3B, and 4, the dental attachment placement structure can be utilized as an etch mask that allows the etching to occur in the area to which the attachment is to be placed without etching other surfaces not at the attachment area.

Similar to the apparatus of FIG. 1A, in the embodiment of FIG. 3A, the apparatus 320 includes a body 301 having at least one surface shaped to conform to one or more of the contours of an exterior surface of a tooth. The body has multiple surfaces, 302-1 and 302-2, each shaped to conform to the multiple contours of an exterior surface of a tooth, and other surfaces will be discussed in more detail in FIG. 3B.

In the embodiment of FIG. 3A, the body 301 includes an aperture 324 formed in portion 302-1. The aperture 324 has a specific shape 322 that, when the apparatus 320 is placed correctly on the tooth, will allow the attachment area (i.e., the area at which the attachment will be attached) to be etched without etching other areas of the tooth. The structure illustrated in FIG. 3A, allows the treatment professional to place the apparatus 320 onto the teeth of a patient to provide a mask for purposes of etching in a more accurate position and orientation for placement of an attachment (e.g., the shape of aperture 324 would be appropriate for an attachment such as that illustrated in FIG. 1C (106)), with respect to the tooth surface, than previous techniques.

Similar to FIG. 1B, the embodiment illustrated in FIG. 3B includes multiple surfaces that can be used to assist in the alignment of the etch mask with respect to the intended surface of the tooth to which the attachment is to be secured. For example, one or more of surfaces: 312-1, 312-2, 312-3, 312-M, 314, 316-1, 316-2, 316-3, 316-N, 318, and/or inner surfaces of portions 302-1 and/or 302-2 can be utilized in various embodiments of the present disclosure.

In such an embodiment, the surface of the tooth can be etched with an etching material that can, for example be brushed onto the surface of the tooth by the treatment professional through the aperture 324. In the embodiment of FIGS. 3A and 3B, the shape 322 of the aperture 324 is sized and shaped to be as large or slightly larger or smaller than the attachment that is to be placed on the tooth. However, in some embodiments, the size and/or shape of the aperture may be different than the surface of the attachment that is to be placed in the tooth.

When shaped like the surface of the attachment that is to be placed in the tooth the treatment professional can align the shape of the attachment with the shape of the etched area such that the attachment is at the correct location and in the correct orientation with respect to the surface of the tooth. Although a particular attachment shape and aperture shape are illustrated, any suitable attachment shape and corresponding aperture shape can be utilized in the embodiments of the present disclosure.

The present example also includes a portion of the body (e.g., surfaces 212-1, 212-2, 212-3, 212-M, and/or the inner surface of 202-1) having a contour that is shaped to correspond with a contour of an alignment surface of a tooth (e.g., front surface, back surface, side surface, edge surface, etc.) and when the contour of the body and the corresponding contour is aligned, the etching area is located at the particular position.

In another example embodiment, a dental attachment placement apparatus includes a body that has an attachment mounting structure. The body also includes a surface (e.g., surfaces 212-1, 212-2, 212-3, 212-M, and/or the inner surface of 202-1) having a contour that is shaped to correspond with a contour of an alignment surface (e.g., front surface, back surface, side surface, edge surface, etc.) of a tooth and when the contour of the body and the corresponding contour of the tooth are aligned, a dental attachment, when placed in the attachment mounting structure, is located at the particular position with respect to an exterior surface of the tooth.

In some embodiments, the body includes at least a second surface (e.g., inner surface of 102-2) shaped to correspond with a contour of an alignment surface of a second tooth. Further, the body can include a second attachment mounting structure (e.g., as shown in FIGS. 3, 332-1 and 332-P) for attaching a second dental attachment to an exterior surface of the second tooth (e.g., 434-3).

Another example embodiment provides a dental attachment placement apparatus having a body that includes an attachment mounting structure having an aperture that allows an attachment to be placed through the body and onto an exterior surface of the tooth. The body also includes a surface having a contour that is shaped to correspond with a contour of an alignment surface of a tooth and when the contour of the body and the corresponding contour of the tooth are aligned, a dental attachment, when placed in the aperture, is located at the particular position with respect to an exterior surface of the tooth.

As illustrated in FIGS. 1B and 2B, in some embodiments, the body includes multiple surfaces having contours that are shaped to correspond with contours of multiple alignment surfaces of a tooth. In some such embodiments, when the contours of the body and the corresponding contours of the tooth are aligned, they frictionally hold the apparatus in place against the tooth during securement of the attachment. For example, the inner surface of 102-1 and inner surface 114 can engage the corresponding surfaces of the tooth to hold the apparatus in place while the attachment is being placed and/or secured. This can be beneficial as it, for example, can allow the treatment professional to use both hands to address other tasks while the attachment is in position to be secured or is being secured.

Figure 3C:
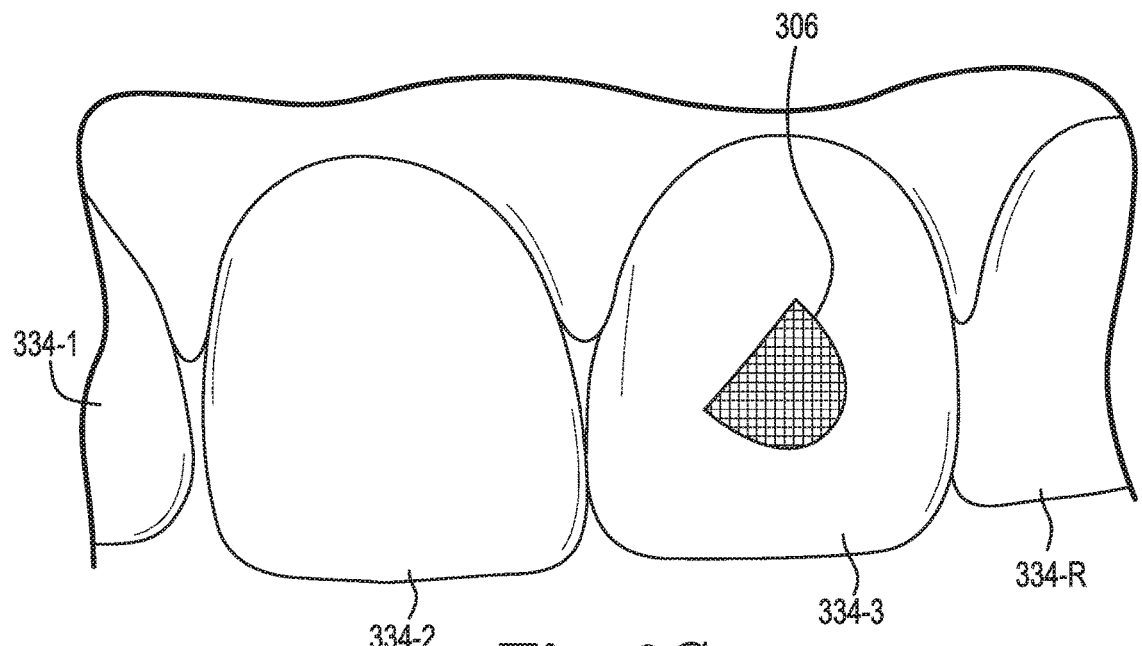
FIG. 3C illustrates a front view of an etched area of a tooth of a patient that has been etched utilizing the dental attachment placement structure of FIGS. 3A and 3B.

In some embodiments, the body can include multiple attachment mounting structures each having an aperture that allows an attachment to be placed through the body and onto an exterior surface of the tooth. For example, in the embodiment shown in FIG. 4, the apparatus 401 includes multiple attachment mounting structures each having apertures (e.g., 432-4 and 432-V) that allows an attachment (406-2 and 406-S) to be placed through the body and onto the exterior surface 436-T of tooth 434-R. FIG. 3C illustrates a front view of an etched area of a tooth of a patient that has been etched utilizing the dental attachment placement structure of FIGS. 3A and 3B. The resultant etched area 306 has been accomplished via the attachment mounting structure illustrated in FIGS. 3A and 3B.

In this manner, the surface of the tooth can be etched at an area that is large enough to secure an attachment, but not un-necessarily large. Also, in this manner, an attachment can be correctly positioned on the surface of tooth 334-3 and oriented such that it can provide the desired force to the teeth of the patient (e.g., 334-1, 334-2, 334-3, 334-R, and/or other teeth of the patient) when combined with the dental appliance that will attach to the attachment.

Figure 4:
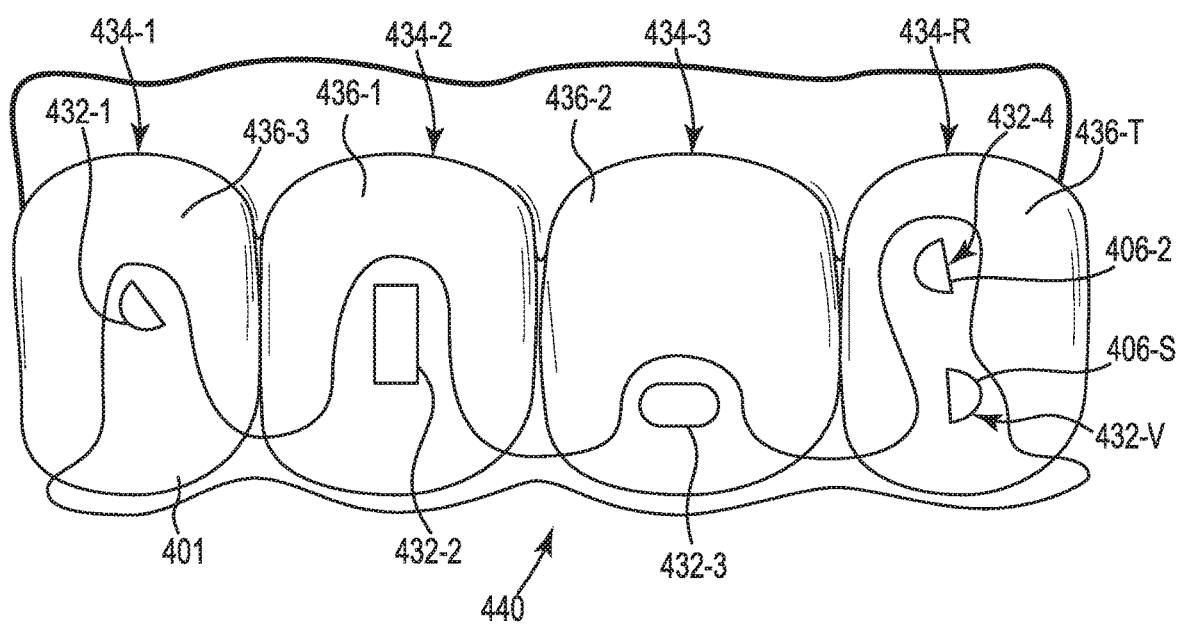
FIG. 4 illustrates a front view of a dental attachment placement structure having multiple attachment placement components provided on the structure according to a number of embodiments of the present disclosure.

FIG. 4 illustrates a front view of a dental attachment placement structure having multiple attachment placement components provided on the structure according to a number of embodiments of the present disclosure. In the embodiment of FIG. 4, the body 401 of apparatus 440 has an attachment mounting structure that includes multiple apertures 432-1, 432-2, 432-3, 432-4, and 432-V that can be used to etch portions of teeth 434-1, 434-2, 434-3, 434-R on surfaces 436-1, 436-2, 436-3, and 436-T.

In order to save fabrication time and materials cost, the apparatus may include multiple etch locations and only some may be used at any given time. In such applications, the apparatus 440 can, for example, be used to etch a location on a tooth at one point in time and can be reused to etch another location on a tooth at another point in time.

Similar to the embodiment of FIG. 2, another feature of the embodiment of FIG. 4, is that in order to save fabrication time and materials cost, an apparatus with less material can be used. In such embodiments, the apparatus can be designed such that a reduced amount or minimized amount of material is used in order to properly etch a surface of a tooth at a desired location.

Figure 5A:
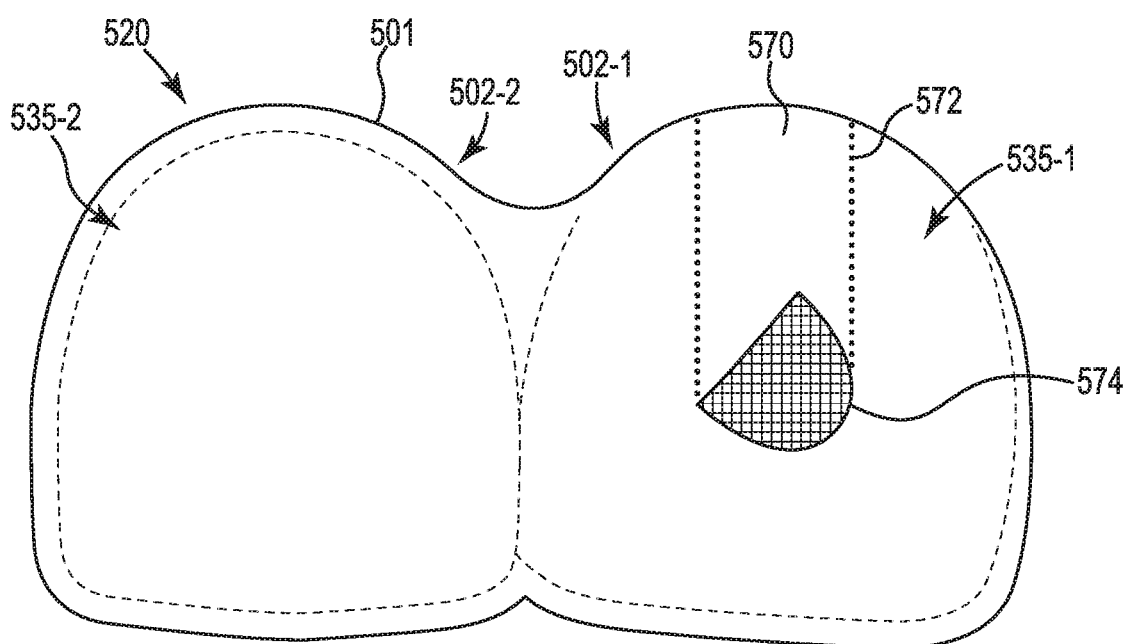
FIG. 5A illustrates a front view of another dental attachment placement structure for etching a tooth according to a number of embodiments of the present disclosure.

FIG. 5A illustrates a front view of another dental attachment placement structure for etching a tooth according to a number of embodiments of the present disclosure. The embodiment of FIG. 5A is similar to that of FIG. 3A.

In the embodiment of FIG. 5A, the apparatus 520 includes a body 501 having at least one surface shaped to conform to one or more of the contours of an exterior surface of a tooth. The body has multiple surfaces, 502-1 and 502-2, each shaped to conform to the multiple contours of an exterior surface of a tooth. Some embodiments may have one or more other surfaces similar to those shown in FIG. 3B to aid in the alignment of the dental attachment placement structure with the tooth. In the example of FIG. 5A, the surface 502-1 is positioned on tooth surface 535-1 and surface 502-2 is positioned on tooth surface 535-2.

In the embodiment illustrated in FIG. 5A, the dental attachment placement structure allows for the surface of the tooth to be etched through the aperture. The etched area is illustrated at 574. Adjacent to the aperture is a releasable portion 570.

The releasable portion can be released by any suitable release mechanism. For example, a series of perforations can be cut into the body 501 to allow the portion 570 to be torn away from the rest of the body 501. This can allow the dental attachment placement structure to also be used as a guide for the placement of an attachment to be placed in the correct position.

For example, once the area is etched as shown in FIG. 5A, an attachment can be secured to the etched area. If an attachment has a surface that is shaped to correspond to the shape of the aperture, then the edges of the aperture can be used as a guide to the correct positioning of the attachment. Once secured, the releasable portion 570 can be removed and the rest of the body 501 can be removed from the teeth while the attachment remains attached to the tooth surface 535-1.

Figure 5B:
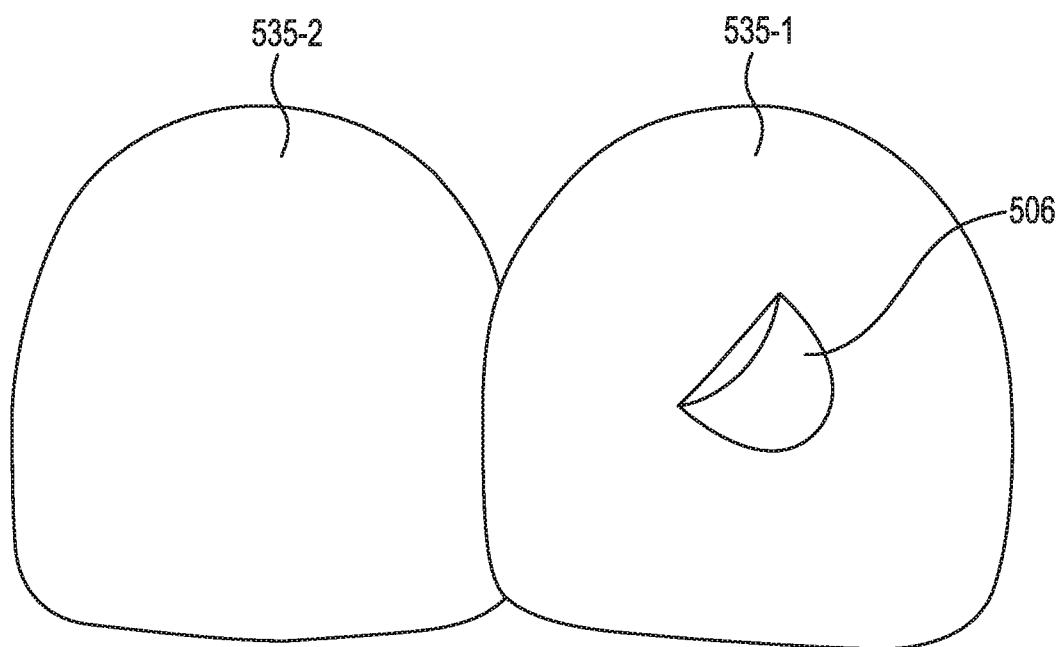
FIG. 5B illustrates front view of a dental attachment attached to a tooth of a patient utilizing the dental attachment placement structure of FIG. 5A.

FIG. 5B illustrates front view of a dental attachment attached to a tooth of a patient utilizing the dental attachment placement structure of FIG. 5A. This figure includes a tooth surface 535-1 of a first tooth and a tooth surface of a second tooth 535-2, and an attachment 506 mounted on the surface 535-1.

As can be seen from this figure, the attachment 506 is positioned and oriented on the surface of the tooth 535-1 in the same position and orientation as the etched area 574, thereby allowing better adhesion of the attachment 506 to the surface of the tooth 535-1. This is because the attachment was placed in the aperture of body 501 while it was positioned on tooth surfaces 535-1 and 535-2, then removed after the attachment 506 was adhered to etched area 574.

Figure 6A:
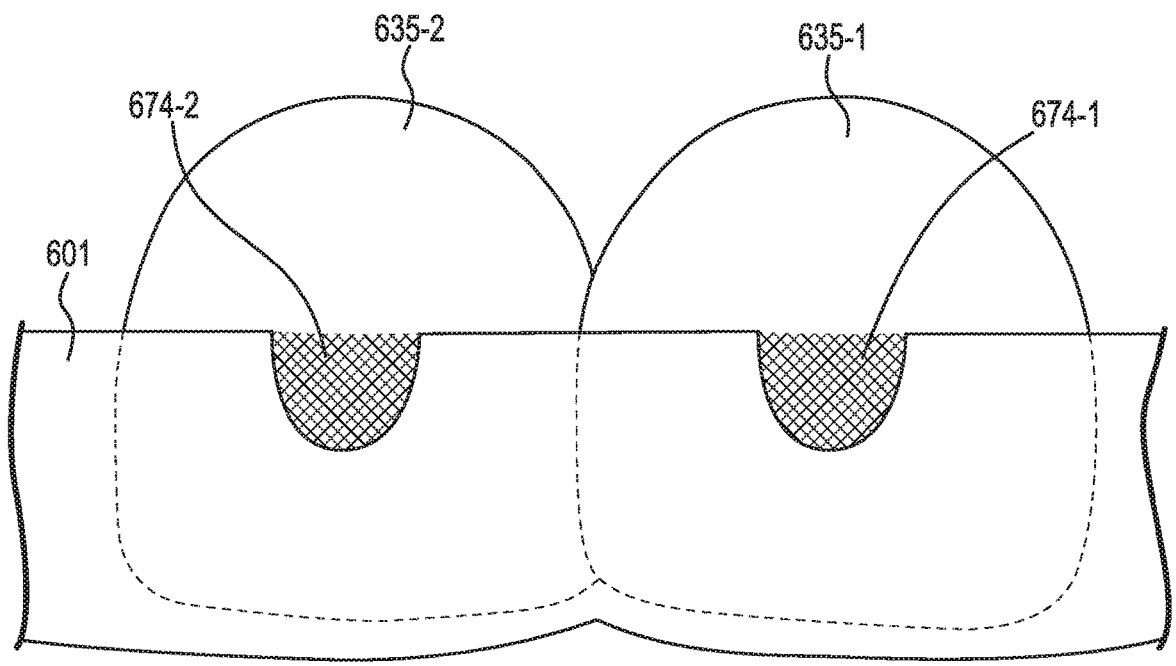
FIG. 6A illustrates a front view of another dental attachment placement structure for etching a tooth according to a number of embodiments of the present disclosure.

FIG. 6A illustrates a front view of another dental attachment placement structure for etching a tooth according to a number of embodiments of the present disclosure. FIG. 6A illustrates an embodiment wherein the body 601 of the dental attachment placement structure has apertures that do not fully surround the area to be etched. In such embodiments, the body can be used as a guide for what area is to be etched (e.g., areas 674-1 and 674-2), and as a guide to placement of one or more attachments (e.g., 606-1 and 606-2), but also allows for removal of the body 601, once the attachment has been secured to the surface of the tooth (e.g., 635-1 and/or 635-2).

Figure 6B:
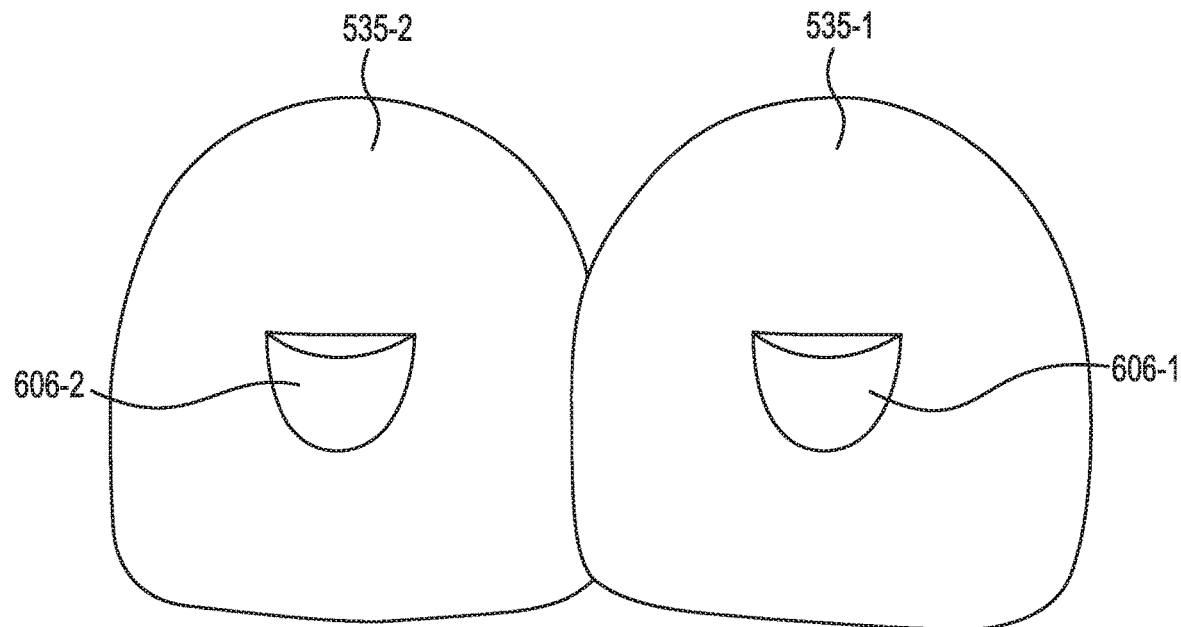
FIG. 6B illustrates front view of multiple dental attachments attached to multiple teeth of a patient utilizing the dental attachment placement structure of FIG. 6A.

For instance, FIG. 6B illustrates front view of multiple dental attachments attached to multiple teeth of a patient utilizing the dental attachment placement structure of FIG. 6A. This figure includes a tooth surface 635-1 of a first tooth and a tooth surface of a second tooth 635-2, and attachments 606-1 and 606-2 mounted on the surfaces 635-1 and 635-2, respectively.

As can be seen from FIG. 6B, the attachments 606-1 and 606-2 are positioned and oriented on the surface of the teeth 635-1 and 635-2 in the same position and orientation as the etched areas 674-1 and 674-2, thereby allowing better adhesion of the attachments 606-1 and 606-2 to the surface of the teeth 635-1 and 635-2. This is because the attachment was placed in the apertures of body 601 while it was positioned on tooth surfaces 635-1 and 635-2, then removed after the attachments 606-1 and 606-2 were adhered to etched areas 674-1 and 674-2.

Figure 7A:
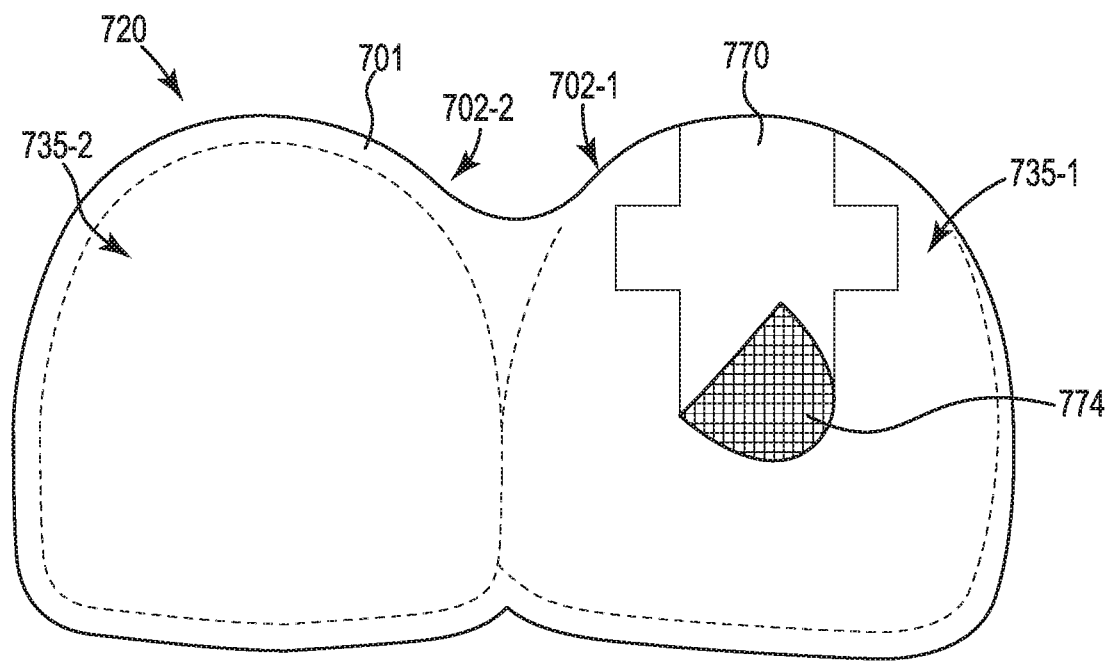
FIG. 7A illustrates a front view of another dental attachment placement structure for etching a tooth according to a number of embodiments of the present disclosure.

FIG. 7A illustrates a front view of another dental attachment placement structure for etching a tooth according to a number of embodiments of the present disclosure. The embodiment of FIG. 7A is similar to that of FIG. 5A.

In the embodiment of FIG. 7A, the apparatus 720 includes a body 701 having at least one surface shaped to conform to one or more of the contours of an exterior surface of a tooth. The body has multiple surfaces, 702-1 and 702-2, each shaped to conform to the multiple contours of an exterior surface of a tooth.

As with other embodiments discussed herein, some embodiments may have one or more other surfaces similar to those shown in FIG. 3B to aid in the alignment of the dental attachment placement structure with the tooth. In the example of FIG. 7A, the surface 702-1 is positioned on tooth surface 735-1 and surface 702-2 is positioned on tooth surface 735-2 to aid in positioning and/or orientation of the dental attachment placement structure with respect to the tooth to which an attachment is to be attached and thereby the positioning and/or orientation of the attachment to the tooth.

In the embodiment illustrated in FIG. 7A, the dental attachment placement structure allows for the surface of the tooth to be etched through the aperture. The etched area is illustrated at 774. Adjacent to the aperture is a removable portion 770.

The removable portion can be held in place by any suitable mechanism. For example, the removable portion can be shaped like a puzzle piece that mates with the rest of the body 701 in a particular orientation based on the removable portion 770 having an irregular shape. As used herein, an irregular shape is a shape that can only be positioned in one way with the rest of the body 501 such that the aperture has a desired shape for etching and/or positioning of an attachment therein. This can allow the dental attachment placement structure to be used for etching of the surface of a tooth and/or to be used as a guide for the placement of an attachment to be placed in the correct position.

For example, once the area is etched as shown in FIG. 7A, an attachment can be secured to the etched area. If an attachment has a surface that is shaped to correspond to the shape of the aperture, then the edges of the aperture can be used as a guide to the correct positioning of the attachment. Once secured, the removable portion 770 can be removed and the rest of the body 701 can be removed from the teeth while the attachment remains attached to the tooth surface 735-1.

In some embodiments, the edges of the removable portion and the edges on the body that correspond to the edges of the removable portion can be slanted such that when the removable portion is positioned into the rest of the body, it can be held in place. This can allow the treatment professional the ability to use their hands to do other things without having to hold the removable portion in place.

Also, in embodiments such as that shown in FIG. 7A, the apparatus can be positioned to accomplish etching (with the removable portion in place). The removable portion can be removed once the etch material and has been applied. Then, the removable portion can be repositioned with the rest of the body for securing of an attachment to the tooth. Once the attachment is secured to the tooth, the removable portion can be removed again to allow for removal of the apparatus for the patient's mouth without having to pull a portion of the apparatus over the attachment.

Figure 7B:
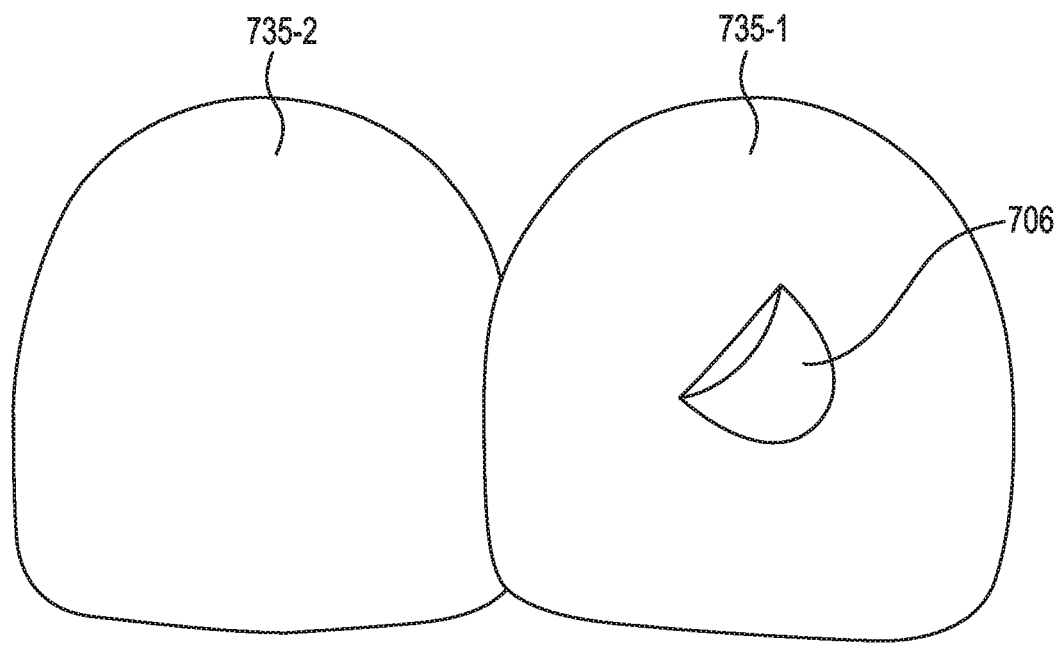
FIG. 7B illustrates front view of a dental attachment attached to a tooth of a patient utilizing the dental attachment placement structure of FIG. 7A.

FIG. 7B illustrates front view of a dental attachment attached to a tooth of a patient utilizing the dental attachment placement structure of FIG. 7A. This figure includes a tooth surface 735-1 of a first tooth and a tooth surface of a second tooth 735-2, and an attachment 706 mounted on the surface 735-1.

As illustrated in this figure, the attachment 706 is positioned and oriented on the surface of the tooth 735-1 in the same position and orientation as the etched area 774, thereby allowing better adhesion of the attachment 706 to the surface of the tooth 735-1. As with the embodiment of FIGS. 5A and 5B, this is because the attachment was placed in the aperture of body 701 while it was positioned on tooth surfaces 735-1 and 775-2, then removed after the attachment 706 was adhered to etched area 774.

FIGS. 8A-10C provide three embodiments that each include different support structures that make the connection between the body of the dental attachment placement structure and the attachment. These embodiments may each have benefits for some implementations and those differences and their benefits are discussed below.

As shown and described in the embodiments of FIGS. 8A-10C, the attachment is located within an aperture and the dental attachment placement structure includes at least one support connecting the attachment to the body. As can be seen from the embodiment of FIG. 8C, the attachment 806 can be connected to the one or more supports 808. The direct connection can be arched as shown to reduce or eliminate contact of the support to the surface of the tooth.

Such an arch may be beneficial, for example, because the treatment professional may not have to maneuver a detachment tool as close to the tooth as an embodiment where the support or the connection between the support and the attachment touch the tooth surface. In some such embodiments, the support can be connected to the attachment such that it can be released from the attachment.

For example, in some embodiments, the junction between the attachment and the support can include a feature to assist in the detachment of the attachment from the support. This feature can be located at or near the transition between the support material and the attachment material.

The feature can, for example, be a physical feature provided at the junction, such as one or more perforations, a portion that is thinner than the rest of the support and/or attachment, or a different material than the attachment and/or the support, among other attachment separation structures discussed herein. The feature can also be the use of a particular material at the junction that allows for a stimulant to be applied to that material that allows the attachment to be more easily removed. Such materials could, for example, make the material more brittle, thereby allowing it to be more easily broken, or cause the material to dissolve or disintegrate. Examples, of stimulants include wavelengths of light, such as UV, or chemical materials that cause the above affects based on interaction with the support material at the junction between the attachment and the one or more supports.

Once the attachment 806 is separated from the body 801, the attachment will remain on the tooth (e.g., attachment is affixed via adhesive to the surface of the tooth) during a portion or all of one or more treatment periods and the dental attachment placement structure body will be removed from the teeth of the patient. For example, this can be accomplished by lifting parts of the body over the attachment or by cutting/breaking the body into pieces and removing it in that manner.

The embodiment also includes a dental attachment placement structure, connected to a dental attachment to hold the attachment in a particular position. A portion of the body has a contour that is shaped to correspond with a contour of an alignment surface of a tooth such that when the contour of the body and the corresponding contour of the tooth are aligned, the aperture is located over the particular position on the surface of the tooth.

The attachment placement surface can include the portion of the body that is shaped to conform to corresponding contours of an alignment surface of the tooth. As stated herein, the alignment surface of the tooth is any shape on the surface of the tooth that can be used in connection with the attachment placement surface to more precisely position an attachment in the surface of the tooth. In this manner, when the contour of the body and the corresponding contour of the tooth are aligned, the aperture is located over the particular position in three dimensions on the surface of the tooth. For example, a ridge on the tooth can mate with a corresponding, but complementary surface of the attachment placement surface.

In some embodiments, a dental attachment placement structure, can include a body that includes a dental attachment placement structure, connected to a dental attachment to hold the attachment in a particular position, the body also can include a surface having a contour that is shaped to correspond with a contour of an alignment surface of a tooth. As used herein, an alignment surface of a tooth is any surface that when mirrored in the shape of a corresponding surface on the body can be used to properly locate the body with respect to the tooth. For example, when the contour of the body that mirrors the contour of the tooth and the corresponding contour of the tooth are aligned, a dental attachment, when placed in the attachment mounting structure, is located at the particular position with respect to an exterior surface of the tooth. Examples, of alignment surfaces on a tooth include: a ridge on a front surface of a tooth, a valley in a front surface, an edge of a tooth, a corner of a tooth, a contour of the gingival line of a tooth, a ridge or valley on a back surface of a tooth, among other such features that can be used to more precisely locate the dental attachment placement structure in relation to the tooth to aid in the correct placement of the attachment.

As discussed elsewhere in the specification the body can include at least a second surface shaped to correspond with a contour of an alignment surface of a second tooth. Such additional surfaces allow for greater accuracy in the placement of the attachment.

Figure 8A:
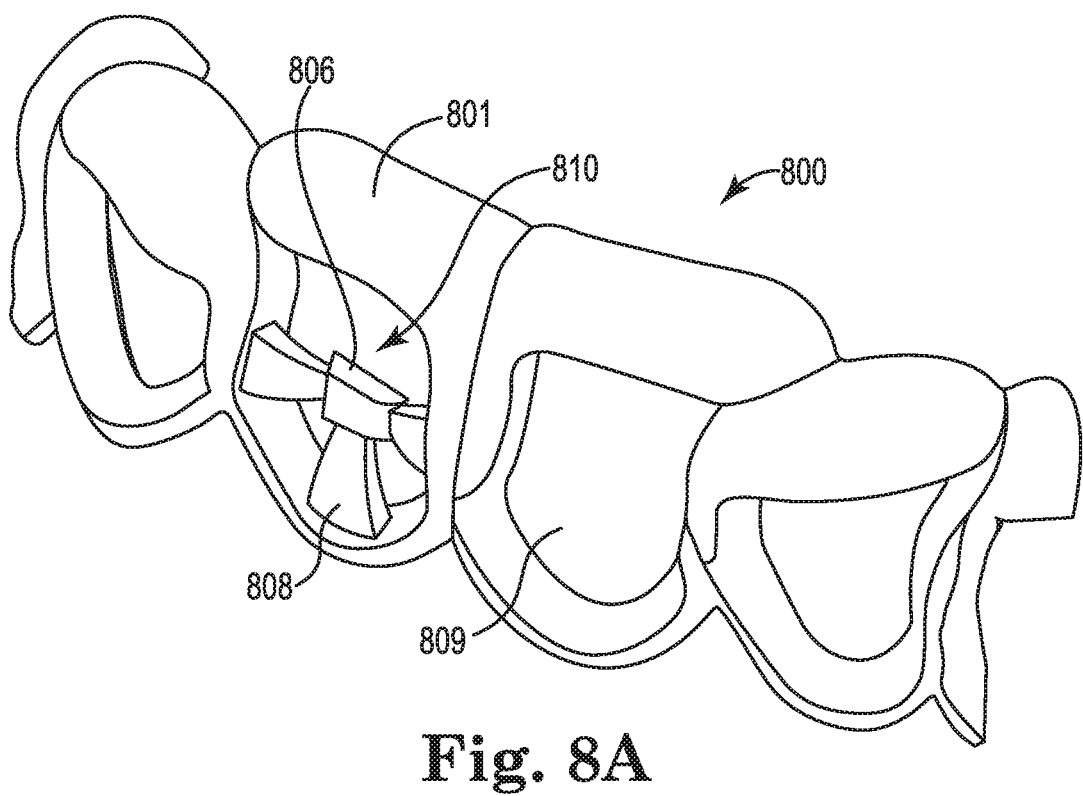
FIG. 8A illustrates an angled front view of a dental attachment placement structure having an attachment placement component provided on the structure according to a number of embodiments of the present disclosure.

FIG. 8A illustrates an angled front view of a dental attachment placement structure having an attachment placement component provided on the structure according to a number of embodiments of the present disclosure. conforming to the surface of the tooth and that there is a top surface In the view of FIG. 8A, an attachment placement structure that conforms to the front surfaces of a tooth at a top of the tooth, sides of the tooth and bottom of the tooth (along the gingival line of the tooth). The illustrated structure is shown for a lower jaw, but such embodiments are not limited to use with the lower jaw. The attachment placement structure 800 of FIG. 8A includes a body 801 having several tooth shaped portions, at least one of those portions having an attachment 806 connected thereto by a number of supports 808, the supports separated by one or more apertures 810.

FIG. 8A shows the attachment 806 attached to the body 801 by three supports 808. One feature of the supports shown in FIG. 8A, is that they are arched along their direction of elongation. This feature can allow the surface of the supports that is closest to the tooth to be a distance that is further away from the tooth than the surface of the attachment that is closest to the tooth (the surface of the attachment that is to be attached to the tooth).

This can be beneficial for a number of reasons. For example, being farther away from the tooth reduces the potential for the support to be adhered to the tooth by stray adhesive that has leaked from between the tooth and the attachment during the securing process or that was sloppily applied during application of the adhesive to the surface of the attachment.

Additionally, the spaced nature of the arched support from the tooth may also allow separation of the attachment from the supports in a manner that reduces the potential for damage of the tooth during separation. For example, if the support is to be cut away from the attachment to form the separation, the tip of the cutting device may have space to pass between the support and the tooth during separation where there would be no space if the support were in contact with the tooth.

Further, as can be seen in the embodiment of FIG. 8A, the support can be tapered from a first thickness at its connection to the body 801 to a second, thinner thickness at its connection to the attachment 806. This can be beneficial in various ways. For example, the thinned connection at the attachment end of the support allows more space for a separation tool to be placed, while the thicker end allows a more stable and substantial support member during positioning and separation.

This can be beneficial in that when the structure is placed on the teeth of the patient, force may be applied to the supports and the thicker portion can resist the potential for the support to break during the placement of the structure. This could affect the positioning of the attachment or render the dental attachment placement structure ineffective to assist in placement of the attachment (e.g., the structure may not be able to hold the attachment in proper position for attachment at the correct location or orientation).

The tapering also makes separation of the attachment from the dental attachment placement structure body easier. For example, when a cutting tool is used to separate the attachment from the body, it must cut completely through the support to accomplish the separation.

A thinner support means that less cutting needs to be done. Furthermore, a tapered support may negate the need for a cutting tool and separation of the attachment from the support may only require the user to apply a compressive or tensile force on the thinner support end to initiate the break. Additionally, when the separation between the body and the attachment is accomplished, there may be a little of the support material still attached to the attachment (e.g., if the treatment professional did not cut exactly at the junction between the attachment and the support).

This may leave non-biocompatible material on the attachment and may make the attachment not fit with the dental appliance that is placed over the attachment (the attachment is a different shape in one or more dimensions than the cavity into which the attachment is to be placed). By using a thinner support end at the junction between the attachment and the support, the likelihood that extra support material is left on the attachment is reduced.

The illustration of the embodiment in FIG. 8A also shows that the body may not cover the entire front surfaces of the teeth adjacent to the tooth on which the attachment 806 is to be affixed. For example, an aperture 809 may be formed in the body over a portion that would cover a part of the adjacent tooth.

Having more or less material on the adjacent tooth surfaces provides several benefits and these can be weighed when designing various implementations. For example, having more material will increase the strength of the body which may be beneficial in some implementations, such as where the installation of the dental attachment placement structure may be difficult.

Having more material will increase the rigidity of the body which may be beneficial in some implementations, such as where accurate positioning is important. Further, having used less material for the body may be beneficial for reasons of reducing weight of the structure, reducing cost of manufacture as less materials and time may be used, and improving flexibility of the structure to aid in removal, among other benefits.

Figure 8B:
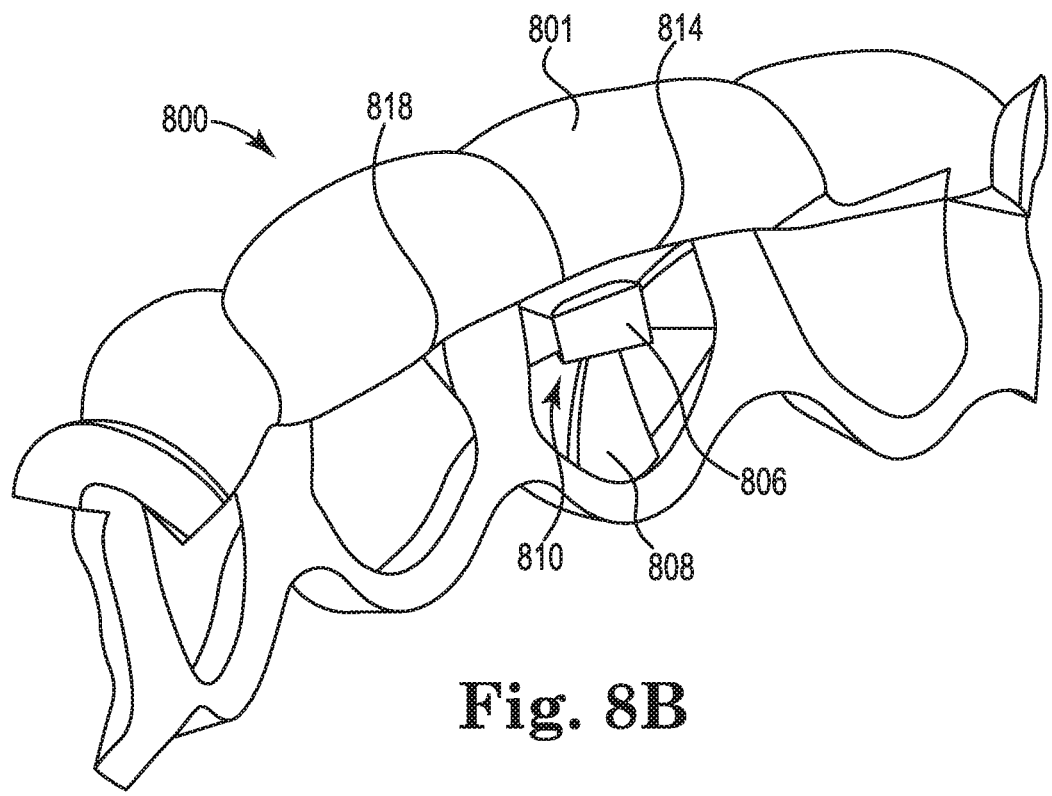
FIG. 8B illustrates an angled back view of the dental attachment placement structure of FIG. 8A.

FIG. 8B illustrates an angled back view of the dental attachment placement structure of FIG. 8A. In this view, the body 801 of the structure 800 has a number of tooth cavities for the placement of a tooth therein. In the example of FIG. 8B, four cavities are shown, however, embodiments are not limited to four teeth and more or less tooth cavities can be provided in various embodiments.

Each cavity is formed from a number of surfaces of the structure that are used to contact a corresponding surface of the tooth onto which the cavity is placed. As shown in FIG. 8A, those surfaces may represent complete surfaces of a tooth or parts of such surface (e.g., the aperture 809).

The apparatus includes a body 801 having a tooth-shaped surface that is shaped to conform to the front surface of a tooth and is to be placed against the front surface of the tooth. This tooth-shaped surface of the body can include an aperture (e.g., aperture 810) to allow placement of an attachment at a particular position on the tooth surface. It will be understood that, in some embodiments, the aperture may not be completely closed around its edge. Such designs should be considered to be within the embodiments of the present disclosure.

As shown in FIG. 8A, FIG. 8B also shows the apertures 810 that provide spaces between the supports 808. In the embodiment of FIG. 8B, the structure also includes a first back side portion 814 that conforms to the back side of the first tooth and a second back side portion 818 that conforms to the back side of the second tooth. As will be discussed with respect to FIG. 8C, a surface of the structure may also be used in conjunction with the biting surface of a tooth for improving the alignment of the attachment prior to affixing it to the tooth.

Also, it should be noted by the reader that the surface on which the line for element number 806 is positioned is the surface on the attachment that is to be attached to the tooth. It is on this surface that an adhesive material is to be placed (the adhesive is not shown). The adhesive can be applied to the entire surface or to a part thereof. The adhesive can be ultra-violet (UV) curable adhesive or any other suitable type of adhesive that can be used to affix the attachment to the tooth surface.

In some embodiments, the attachment can, for example, include an adhesive layer positioned to secure the attachment to an affixing surface of a tooth. In some embodiments, the adhesive is only located on the portion of the attachment that will contact the tooth. In this manner, it is unlikely that the adhesive will secure other parts of the apparatus to the tooth or create excess dried adhesive that may need to be removed from the tooth.

In some embodiments, the surface of the attachment that contacts the tooth may contain a recessed well or pocket in which an adhesive can be applied. This controls the location of where the adhesive is applied and avoids issues surrounding excess adhesive, for example, unwanted flash, unwanted adherence of the positioning structure supports to the tooth.

In some implementations, a release layer is provided over the adhesive. The release layer can be a thin film of plastic, wax paper, or other suitable covering that can be removable by the treatment professional when it is time for the attachment to be placed on the tooth of the patient. This can be beneficial, for example, to allow the adhesive to be applied at or shortly after fabrication of the apparatus, does not expose the adhesive to contaminants that may harden or make the adhesive less effective (e.g., dust).

The use of surfaces (e.g., 814, 818, and/or 812 of FIG. 8C) in conjunction with other surfaces can also allow for use of the corners of one or more teeth to be used to aid in positioning and/or orientation of an attachment. The use of corners can be beneficial in that they can be used to control the positioning of the attachment in more axes of movement than use of the edge surfaces of a tooth.

Figure 8C:
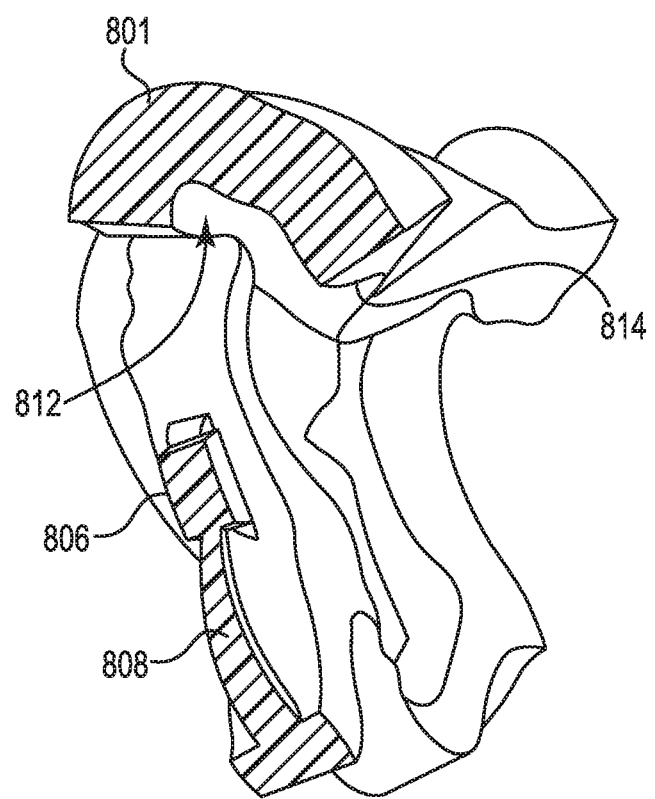
FIG. 8C illustrates a cutaway side view of the dental attachment placement structure of FIG. 8A.

FIG. 8C illustrates a cutaway side view of the dental attachment placement structure of FIG. 8A. FIG. 8C provides a view of the shape of the cavity described above as well and more detail regarding the supports 808 and attachment 806 and their connection.

As discussed above with respect to FIG. 8B, the cavity for placement of a tooth is formed from a number of surfaces of the body 801 of the structure. For example, the cavity, in the embodiment of FIG. 8A-8C is formed from the inside surface that conforms to the front side of the tooth (e.g., buccal side), a surface 812 that contacts and wraps around the tooth's incisal edge (top surface of the tooth in this embodiment, but may be bottom surface, if the structure is designed for the upper jaw), and surface 814 that conforms to the back side of the tooth (e.g., lingual side). In this manner, the three surfaces, when in contact with the tooth, can provide more precise locating of the attachment for placement on the tooth.

Figure 9A:
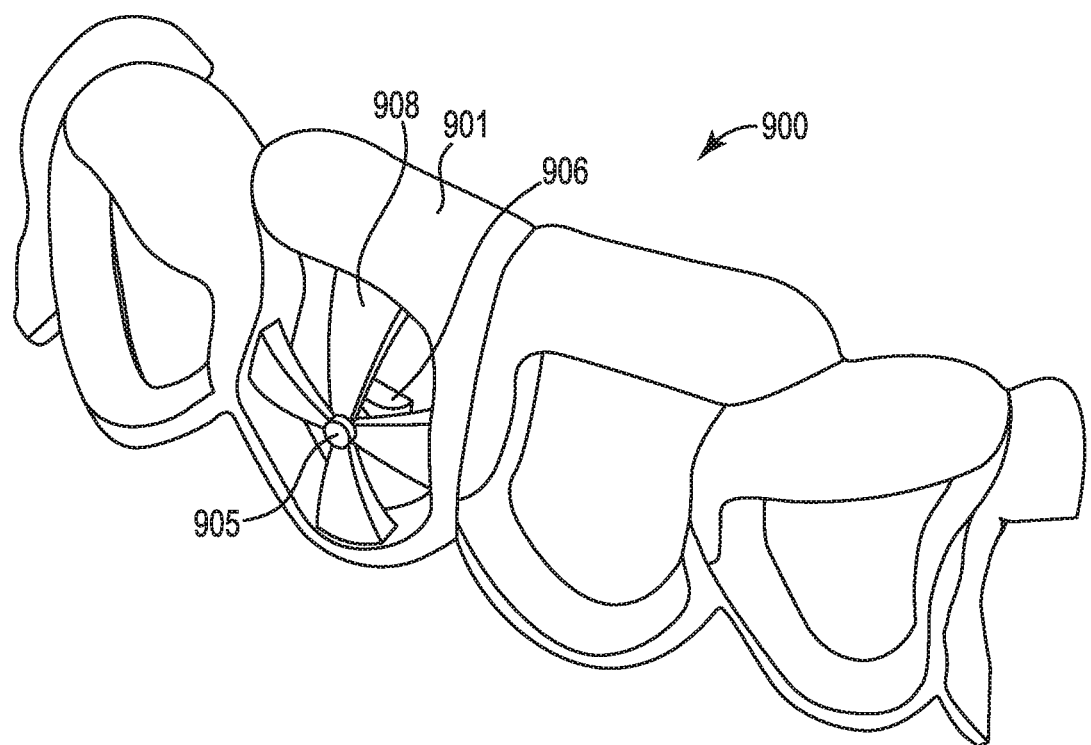
FIG. 9A illustrates an angled front view of a dental attachment placement structure having an attachment placement component provided on the structure according to a number of embodiments of the present disclosure.
Figure 9B:
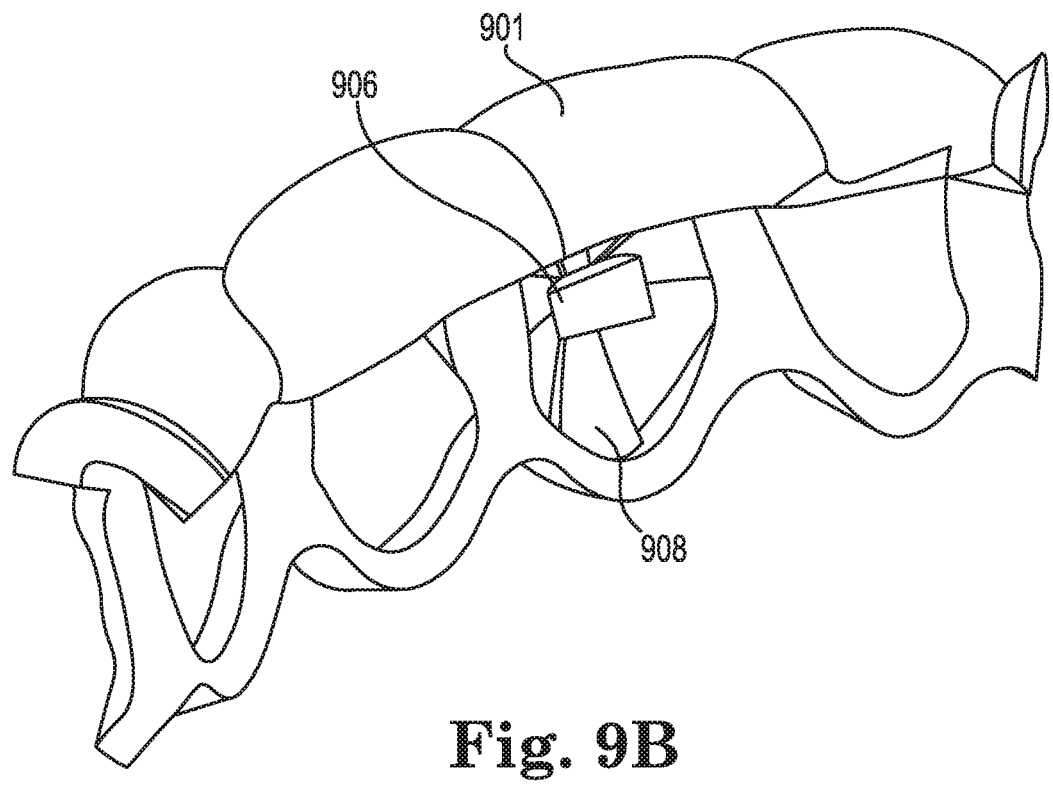
FIG. 9B illustrates an angled back view of the dental attachment placement structure of FIG. 9A.

FIG. 9A illustrates an angled front view of a dental attachment placement structure having an attachment placement component provided on the structure according to a number of embodiments of the present disclosure. FIG. 9B illustrates an angled back view of the dental attachment placement structure of FIG. 9A.

In FIGS. 9A and 9B, the structure 900 includes an attachment 906 that is connected by a single connection member 905 to four supports 908 that are connected to the body 901. In this type of embodiment, the connection that is severed to detach the appliance from the rest of the dental attachment placement structure offers several benefits.

For example, the connection is a single connection allowing the detachment to be made with only one breaking of the connection with the attachment. Also, with a single connection, any residual material from the single connection member is located in one area of the attachment making removal of the extra material easier.

Figure 9C:
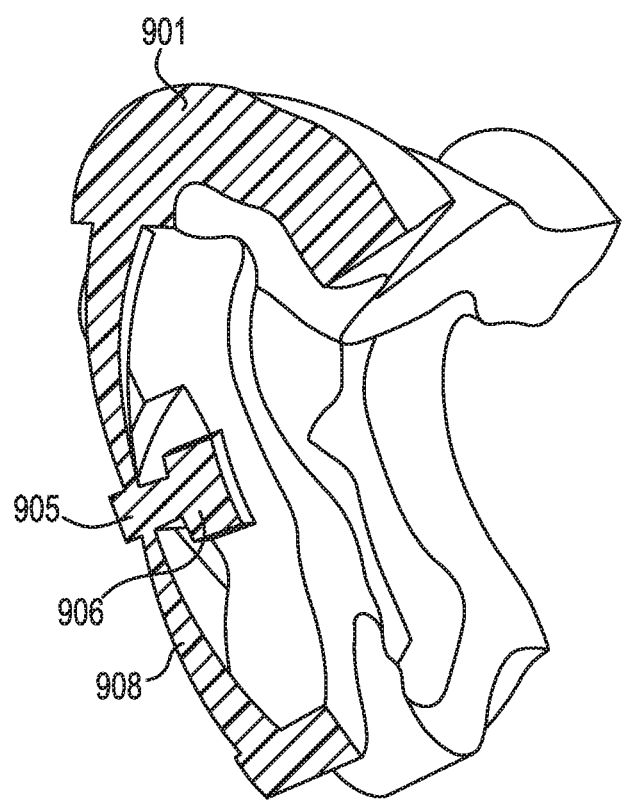
FIG. 9C illustrates a cutaway side view of the dental attachment placement structure of FIG. 9A.

Additionally, in the embodiment shown in FIGS. 9A-9C, the connection is at the top of the attachment which makes detachment and removal of any excess material easier as the connection area is away from the surface of the tooth and more easily accessible. In addition, only one surface of the attachment is affected by the presence of these supports, therefore preserving the integrity of all other attachment surfaces. This is important as these surfaces play a critical role in the orthodontic treatment and require a high degree of dimensional accuracy.

Any suitable number of supports can be utilized. For example, in FIGS. 9A-9C four supports 908 are used, but in other embodiments, for example, those shown in FIGS. 8-A-8C and 10A-10C, other numbers of supports are provided.

In some embodiments, the support functionality can be provided by a material that spans across at least part of the area covering the front surface of tooth. In such an embodiment, the attachment can be attached to the material or to one or more connection members such as the type shown at 905 in FIG. 9A.

In such embodiments, the material may, for example, be cut away to allow access to the connection between the connection member and the attachment in order to detach the attachment. In some embodiments, a stimulant that can be applied as discussed above. In such embodiments, the stimulant can be used, for example, to make the material (or a portion thereof) and/or connection member brittle or dissolve the material and/or connection to detach the attachment therefrom.

FIG. 9C illustrates a cutaway side view of the dental attachment placement structure of FIG. 9A. FIG. 9C, provides a better view of the single connection member 905 that connects the attachment 906 to the supports 908. As shown in FIGS. 9A-9C, in some embodiments, there is a single connection area between the attachment and the attachment placement structure. As stated herein, this, for example, allows the attachment to be separated from the rest of the apparatus more easily and/or with less potential for damage to the tooth or attachment during the separation process.

Figure 10A:
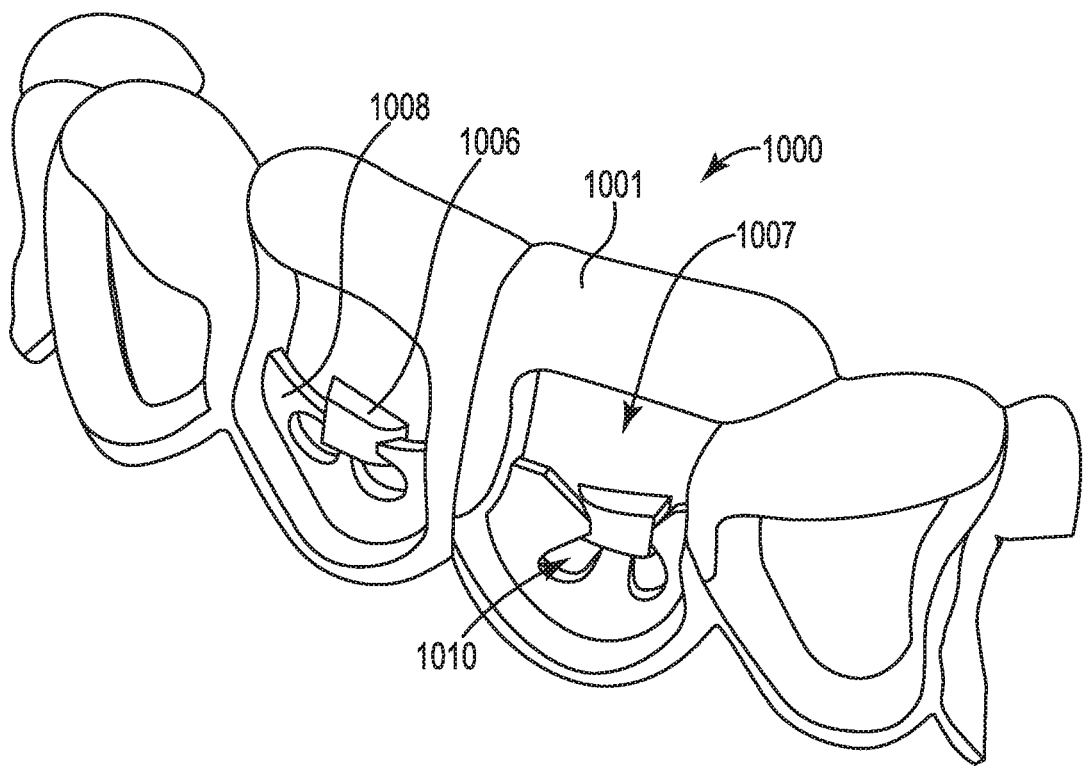
FIG. 10A illustrates an angled front view of a dental attachment placement structure having an attachment placement component provided on the structure according to a number of embodiments of the present disclosure.
Figure 10B:
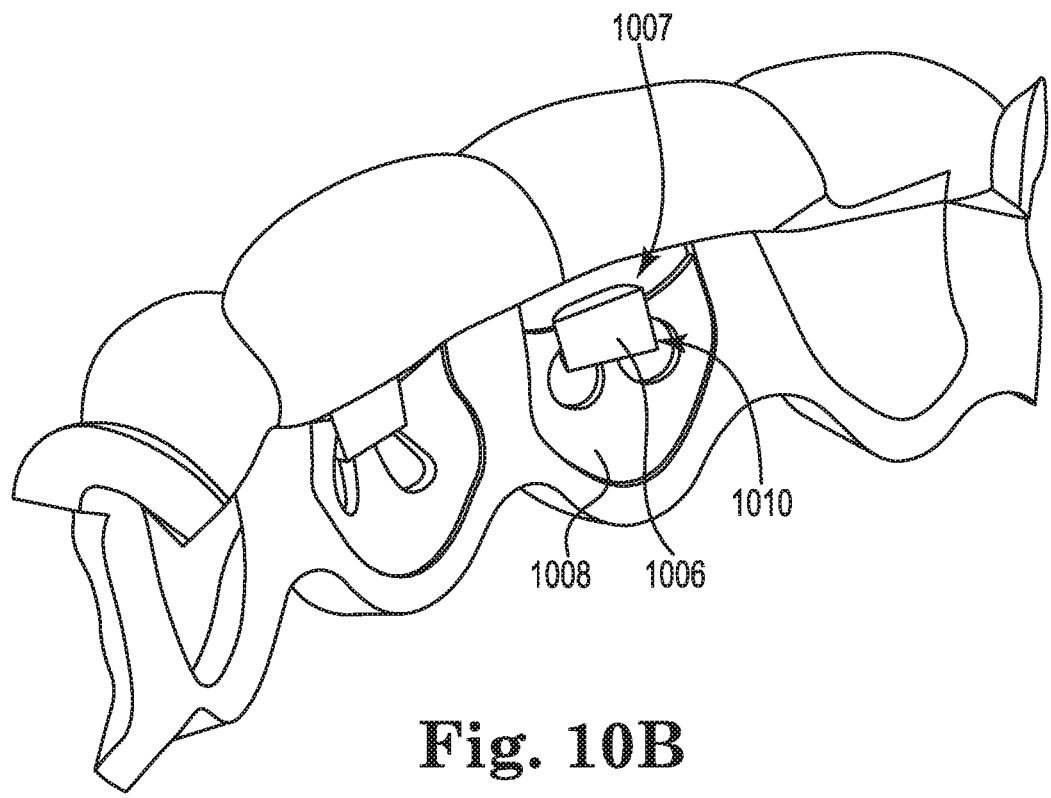
FIG. 10B illustrates an angled back view of the dental attachment placement structure of FIG. 10A.

FIG. 10A illustrates an angled front view of a dental attachment placement structure having an attachment placement component provided on the structure according to a number of embodiments of the present disclosure. FIG. 10B illustrates an angled back view of the dental attachment placement structure of FIG. 10A.

As shown in the embodiment illustrated in FIGS. 10A and 10B, at least one of the attachment mounting structures can have a support connected between the body and a dental attachment. In this manner the supports can be cut instead of a solid layer of material thereby making it easier to release the attachment from the rest of the apparatus.

For instance, in FIGS. 10A and 10B, the supports, that connect the attachment 1006 to the body 1001 of the structure 1000, can be formed individually or can be formed as a sheet of material and then apertures, such as apertures 1010 can be formed in the sheet of material. This sheet of material can be formed with the body 1001 or can be attached to the body after fabrication. The support structure can be fabricated as shown in FIGS. 10A and 10B or can be fabricated to fill the entire inside area of inside shape of the tooth of the body 1001 and then a part of the support can be removed to form aperture 1007.

The body can also include an additional attachment mounting structure (e.g., a second attachment mounting structure) for attaching one or more dental attachments to an exterior surface of another tooth. This allows further elements of the patient's mouth to be used to further corroborate the position of the appliance. This is, for example, because the surfaces and edges of the apparatus when they contact the mouth of the patient, at surfaces and edges of the tooth or teeth that those surface and/or edges of the apparatus.

For example, as shown in FIGS. 10A and 10B, more than one attachment can be provided on the structure for attachment to a user's teeth. In such embodiments, the supports can be the same type of configuration, as shown with respect to supports 1008 in FIG. 10A, or can be different types of configurations (e.g., a support type from 8A-8C could be utilized, and/or from another embodiment shown herein).

Figure 10C:
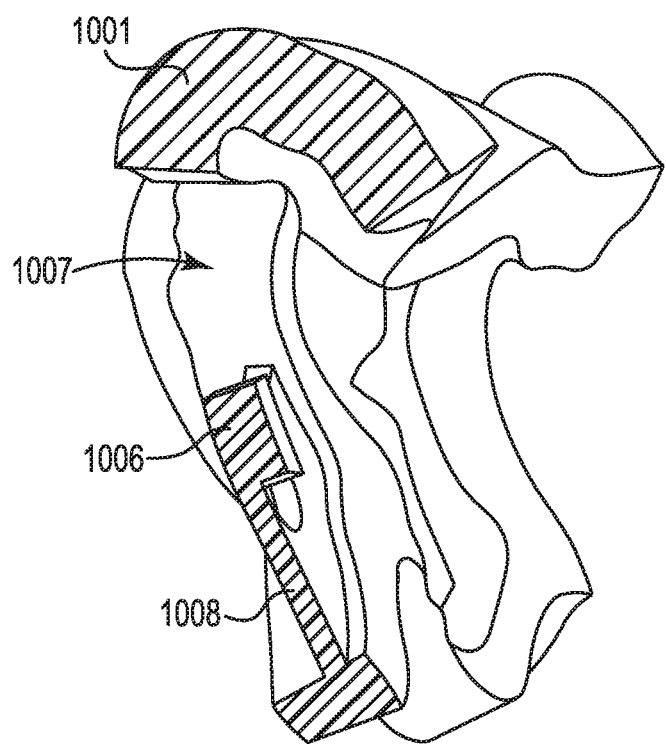
FIG. 10C illustrates a cutaway side view of the dental attachment placement structure of FIG. 10A.

In some embodiments, having more support material (e.g., the support structure of FIGS. 10A-10C compared to the thinner supports of FIGS. 8A-8C) may provide benefits in certain implementations. For example, a more stable structure may provide for better positioning of the attachment, due to its rigidity or other characteristics.

FIG. 10C illustrates a cutaway side view of the dental attachment placement structure of FIG. 10A. FIG. 10C better shows the arrangement of the support structure 1008 and the aperture 1007 formed with respect to the attachment 1006 and body 1001. In this embodiment, the support structure is not arched, which may be easier to manufacture, among other benefits, and its connections to the attachment 1006 are away from the surface that will contact the tooth of the patient. As stated elsewhere, this may be beneficial in allowing for easier detachment of the attachment 1006 from the support structure 1008 and less potential for damaging the tooth during the detachment process, among other benefits.

In one method of forming a structure as discussed in embodiments disclosed herein, the method includes forming an attachment out of an attachment material and a dental attachment placement structure body, connected to the attachment to hold the attachment in a particular position wherein there is a single connection area between the attachment and the attachment placement structure. In some embodiments, the dental attachment placement structure can be printed using the three-dimensional printing apparatus.

Another strategy method can include printing the dental attachment placement structure out of a second material that is different than the attachment material. Such embodiments can be beneficial in several ways. For example, the body can be made from a material that is easier to break, thereby making the separation occur on the body rather than on the attachment (which could deform the attachment in a manner that would make it unusable). The body material could also be made from a less expensive material or a non-biocompatible material (it could be compatible for the short time it is in the mouth of the patient, but may not be biocompatible over the course of a longer period, such as the treatment period).

In some embodiments, printing the attachment and dental attachment placement structure is done such that they are connected to each other at at least one point when printed. For instance, the attachment is connected by three points in FIGS. 8A-8C, one point in FIG. 9A-9C, and three points in FIGS. 10A-10C.

In another method of forming a dental attachment placement structure, the method includes receiving dental data of a patient's teeth to form a virtual dental model of a patient's dentition. From this dental data, a treatment plan for moving one or more of a patient's teeth, that includes the use of at least one attachment that is affixed to a tooth of the patient, can be created.

In this treatment planning process, the process further includes, locating a position and orientation of an attachment on the surface of a tooth of the patient. Then, a dental attachment placement structure can be designed, including a body, a number of supports, and an attachment connected to the number of supports, wherein the shape of the body is based on the virtual dental model.

In various embodiments, the attachment can be printed to include one surface of the attachment with a contour that will mate with a corresponding contour of an exterior surface of a tooth. In this manner, the attachment can be fitted closely to the surface of the tooth which may increase its ability to be secured to the surface of the tooth. In such implementations, more force may be applied to the attachment without it coming loose from the surface of the tooth, among other benefits.

Some embodiments can provide printing one surface of the dental attachment placement structure with a contour that will mate with a corresponding contour of an exterior surface of a tooth. Such embodiments may be able to more accurately place the attachment on the tooth surface due to the mating nature of the surface of the structure and the tooth surface, among other benefits.

As shown in FIG. 8C, for example, in some embodiments, the dental attachment placement structure includes printing multiple surfaces of the dental attachment placement structure having contours that will mate with corresponding contours of exterior surfaces of one or more teeth. As stated elsewhere herein, the more surfaces that can be used to align the placement structure with respect to the tooth on which the attachment is to be applied, the more accurate the placement of the attachment should be.

As can be appreciated by the discussion of these different embodiments, in can be noted that each of these types of attachment mounting structures can provide an accurate mechanism for positioning and orienting the attachment with respect to the surface of the tooth to which the attachment is to be secured, but one type may have benefits over another in some applications based on one or more characteristics (e.g., whether etching is desired, space available for placement of the attachment, number of attachments to be placed on a single tooth, type of securement that will be used, etc.).

Figure 11:
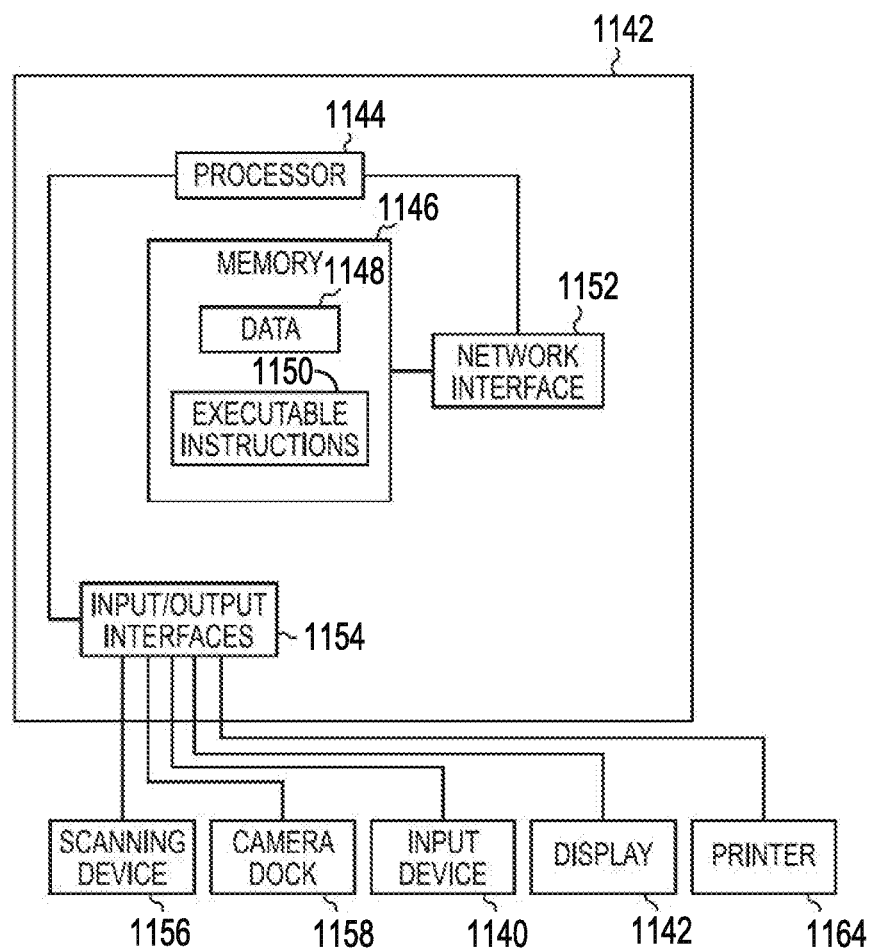
FIG. 11 illustrates a computing device that can be utilized according to one or more embodiments of the present disclosure.

FIG. 11 illustrates a computing device that can be utilized according to one or more embodiments of the present disclosure. For instance, a computing device 1142 can have a number of components coupled thereto.

The computing device 1142 can include a processor 1144 and a memory 1146. The memory 1146 can have various types of information including data 1148 and executable instructions 1150, as discussed herein.

The processor 1144 can execute instructions 1150 that are stored on an internal or external non-transitory computer device readable medium (CRM). A non-transitory CRM, as used herein, can include volatile and/or non-volatile memory.

Volatile memory can include memory that depends upon power to store information, such as various types of dynamic random access memory (DRAM), among others. Non-volatile memory can include memory that does not depend upon power to store information.

Memory 1146 and/or the processor 1144 may be located on the computing device 1142 or off of the computing device 1142, in some embodiments. As such, as illustrated in the embodiment of FIG. 11, the computing device 1142 can include a network interface 1152. Such an interface 1152 can allow for processing on another networked computing device, can be used to obtain information about the patient, and/or can be used to obtain data and/or executable instructions for use with various embodiments provided herein.

As illustrated in the embodiment of FIG. 11, the computing device 1142 can include one or more input and/or output interfaces 1154. Such interfaces 1154 can be used to connect the computing device 1142 with one or more input and/or output devices 1156, 1158, 1140, 1142, 1164.

For example, in the embodiment illustrated in FIG. 11, the input and/or output devices can include a scanning device 1156, a camera dock 1158, an input device 1140 (e.g., a mouse, a keyboard, etc.), a display device 1142 (e.g., a monitor), a printer 1164, and/or one or more other input devices. The input/output interfaces 1154 can receive executable instructions and/or data, storable in the data storage device (e.g., memory), representing a virtual dental model of a patient's dentition.

In some embodiments, the scanning device 1156 can be configured to scan one or more physical dental molds of a patient's dentition. In one or more embodiments, the scanning device 1156 can be configured to scan the patient's dentition, a dental appliance, and/or attachment placement structure directly. The scanning device 1156 can be configured to input data into the computing device 1142.

In some embodiments, the camera dock 1158 can receive an input from an imaging device (e.g., a 2D or 3D imaging device) such as a digital camera, a printed photograph scanner, and/or other suitable imaging device. The input from the imaging device can, for example, be stored in memory 1146.

The processor 1144 can execute instructions to provide a visual indication of a treatment plan, a dental appliance, and/or a one or more attachments on the display 1142. The computing device 1142 can be configured to allow a treatment professional or other user to input treatment goals. Input received can be sent to the processor 1144 as data 1148 and/or can be stored in memory 1146.

Such connectivity can allow for the input and/or output of data and/or instructions among other types of information. Some embodiments may be distributed among various computing devices within one or more networks, and such systems as illustrated in FIG. 11 can be beneficial in allowing for the capture, calculation, and/or analysis of information discussed herein.

The processor 1144, in association with the data storage device (e.g., memory 1146), can be associated with the data 1148. The processor 1144, in association with the memory 1146, can store and/or utilize data 1148 and/or execute instructions 1150 for creating and/or modeling interactions between an attachment and a tooth; interactions between an attachment and an appliance; and/or combinations of interactions between one or more attachments, one or more teeth and/or other structure in the mouth of the patient, and/or one or more appliances for moving teeth.

The processor 1144, in association with the memory 1146 can, in addition to or alternatively, store and/or utilize data 1148 and/or execute instructions 1150 for creating and/or modeling attachment placement structures and/or attachments, and/or adhesive and/or releasable materials, as well as a virtual modeling of such items with or without an appliance for moving teeth, and/or one or more teeth. The virtual model of the attachment placement structure and/or attachments to attach a dental appliance to the teeth of a patient can be used to create a physical dental appliance, attachment placement structure and/or attachments, for instance, as discussed further herein. The processor 1144 coupled to the memory 1146 can, for example, include instructions to cause the computing device 1142 to perform a method including, for example, creating a treatment plan based on a virtual model of a jaw of a patient, wherein the treatment plan includes use of an attachment.

In some embodiments, the processor 1144 coupled to the memory 1146 can cause the computing device 1142 to perform the method comprising modeling a virtual dental attachment based on the treatment plan, wherein the virtual dental attachment is constructed to provide one or more forces desired by the treatment plan.

In various embodiments, the processor 1144 coupled to the memory 1146 can cause the computing device 1142 to perform the method comprising creating a virtual dental attachment placement apparatus that includes a body having an attachment mounting structure and including a surface having a contour that is shaped to correspond with a contour of an alignment surface of a tooth such that when the contour of the body and the corresponding contour of the tooth are aligned, the dental attachment is placed in the attachment mounting structure, the dental attachment is located at a particular position with respect to an exterior surface of the tooth.

Such analysis can be accomplished one or more times for a treatment plan. For example, if a treatment plan has 30 stages, it would be possible to have different attachments for each stage or possibly more, if desired. However, in many instances the attachment type, position, and/or orientation may be changed a few times during the treatment plan.

Through use of virtual modeling, attachments can be virtually tested and the best attachment type, shape, position, and/or orientation can be selected without inconveniencing the patient with trial and error of attachments during treatment. Additionally, use of virtual modeling can also allow for custom design of attachment shapes that will be suitable for a specific patient's needs and/or a specific function within an area of a patient's mouth. From such analysis, different physical dental attachment placement apparatuses can be created from the virtual dental attachment placement apparatus data that would be utilized to create the attachments needed for the different stages.

Further, the specialized nature of the design of such attachments can also allow the attachments to be made from different materials. In this manner, attachments during a treatment plan or even during one stage can be of a different material that may provide more specialized force distribution than was possible with standard attachments.

In some embodiments, the printer 1144 can be a three dimensional or direct fabrication device that can create a dental appliance directly from instructions from the computing device 1142. Embodiments of the present disclosure utilizing such technology can be particularly beneficial for a variety of reasons. For example, such direct manufacture allows for less waste of materials due to less processing steps and increased specialization of the attachment placement structure, attachment materials, and/or other components of the appliances described herein.

In some embodiments, the attachment placement structure can be formed and one or more attachments formed with the attachment placement structure. Such technologies can be particularly useful in some such embodiments as the two can be fabricated during the same process.

The embodiments of the present disclosure can provide a number of benefits. For example, the embodiments can save time and cost in manufacture, improve the accuracy of the type of attachment material used, the preparation of the material, formation of the attachments, the positioning and/or orientation of the placement of the attachments, allow more ability to create specialized attachment sizes and shapes, and can save time and improve the experience of the patient and/or treatment professional in creating and/or securing attachments, among other benefits.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A dental attachment placement apparatus, comprising:
a body configured to position multiple attachments to a tooth of a dental arch, the body including multiple apertures, the body including a contoured surface for mating with one or more teeth of the dental arch to align each of the multiple apertures over a particular corresponding position on a surface of the tooth, wherein each of the multiple apertures has an attachment attached to at least two supports extending from the body and arranged radially with respect to the attachment to support the attachment within the aperture and align the attachment over the particular corresponding position, each attachment including one or more engagement surfaces configured to engage with an aligner dental appliance to apply a force to the one or more teeth, wherein the at least two supports for each attachment are configured to be broken from the attachment at or near locations where the at least two supports and the attachment are connected.

2. The dental attachment placement apparatus of claim 1, wherein the contoured surface of the body is shaped to conform to corresponding contours of an alignment surface of the tooth.

3. The dental attachment placement apparatus of claim 1, wherein at least one of the attachments includes an adhesive layer positioned to secure the at least one attachment to an affixing surface of the tooth.

4. The dental attachment placement apparatus of claim 3, wherein the adhesive layer is only located on a portion of the at least one attachment that will contact the tooth.

5. The dental attachment placement apparatus of claim 3, wherein a release layer is provided over the adhesive layer.

6. The dental attachment placement apparatus of claim 1, wherein the at least two supports provide the only connections between the corresponding attachment and the body.

7. The dental attachment placement apparatus of claim 1, wherein the body is shaped such that when the contoured surface is placed on the one or more teeth, each of the multiple apertures is located over the particular corresponding position such that the attachment is oriented in three dimensions with respect to the surface of the tooth.

8. The dental attachment placement apparatus of claim 1, wherein the body comprises a shell aligner.

9. The dental attachment placement apparatus of claim 1, wherein a at least one support of the at least two supports includes one or more of features to facilitate breaking away from a respective attachment selected from the group of: a narrowed section having a lesser thickness than a remaining portion of the at least one support, a section made of a different material than a remaining portion of the at least one support, one or more perforations, and a scored section.

10. The dental attachment placement apparatus of claim 1, wherein the at least two supports are configured to maintain the attachment at a predetermined position relative to the body before the body is placed on the one or more teeth.

11. The dental attachment placement apparatus of claim 1, wherein a perimeter of the attachment is smaller than the aperture to provide a space between the attachment and the body, where the at least two supports bridge the space.

12. The dental attachment placement apparatus of claim 1, wherein the at least two supports have an arched shape to provide a space between the at least two supports and the surface of the tooth when the body is placed on the one or more teeth.

13. The dental attachment placement apparatus of claim 1, wherein the tooth is a first tooth, wherein the body further comprises one or more additional apertures to position one or more additional attachments to a second tooth of the dental arch different than the first tooth.

14. A dental attachment placement apparatus, comprising:
a body having multiple apertures disposed through the body, the body including a contour surface configured to mate with a surface of a tooth and to align the multiple apertures over corresponding particular positions on the surface of the tooth, wherein each of the multiple apertures is associated with:
an attachment attached to at least two supports to support and align the attachment within the aperture over a particular position on the surface of the tooth, a perimeter of the attachment being smaller than the aperture to provide a space between the attachment and the body, wherein the at least two supports bridge the space and extend to the attachment within the aperture, wherein the at least two supports are configured to be broken from the attachment at or near locations where the at least two supports and the attachment are connected.

15. The dental attachment placement apparatus of claim 14, wherein the body includes at least a second contoured surface shaped to mate with an alignment surface of a second tooth.

16. The dental attachment placement apparatus of claim 14, wherein the body comprises a shell aligner.

17. The dental attachment placement apparatus of claim 14, wherein the attachment includes one or more engagement surfaces configured to engage with an aligner dental appliance to apply a force to one or more teeth.

18. The dental attachment placement apparatus of claim 14, wherein the tooth is a first tooth, wherein the body further comprises one or more additional apertures to position one or more additional attachments to a second tooth that is different than the first tooth.

19. A dental attachment placement apparatus, comprising:
a body comprising a shell aligner configured to be worn over a patient's teeth, the body including a first aperture and a second aperture through the body, the body including a contoured surface to mate with one or more teeth of the patient's dental arch to align the first aperture over a first position on a surface of a tooth and the second aperture over a second position on the surface of the tooth;
a first attachment attached to a first set of supports to support and align the first attachment within the first aperture over the first position, a perimeter of the first attachment being smaller than the first aperture to provide a space between the first attachment and the body, wherein the first set of supports bridge the space and extend from the body to the first attachment, wherein the first set of supports are configured to be broken from the first attachment at or near locations where the first set of supports and the first attachment are connected; and
a second attachment attached to a second set of supports to support and align the second attachment within the second aperture over the second position, a perimeter of the second attachment being smaller than the second aperture to provide a space between the second attachment and the body, wherein the second set of supports bridge the space and extend from the body to the second attachment, wherein the second set of supports are configured to be broken from the second attachment at or near locations where the second set of supports and the second attachment are connected.

20. The dental attachment placement apparatus of claim 19, wherein at least one support of the first set of supports is tapered from a first width as measured along an aperture edge of the first aperture to a second width as measured across the location where the at least one support and the first attachment are connected, the first width greater than the second width.

* * * * *